United States Patent
Schöberl

(10) Patent No.: US 11,720,229 B2
(45) Date of Patent: Aug. 8, 2023

(54) USER INTERFACES FOR BROWSING AND PRESENTING CONTENT

(71) Applicant: Apple Inc., Cupertino, CA (US)

(72) Inventor: Uli M. Schöberl, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/457,901

(22) Filed: Dec. 6, 2021

(65) Prior Publication Data
US 2022/0179526 A1    Jun. 9, 2022

Related U.S. Application Data

(60) Provisional application No. 63/122,462, filed on Dec. 7, 2020.

(51) Int. Cl.
| | |
|---|---|
| G06F 3/0482 | (2013.01) |
| H04N 21/472 | (2011.01) |
| H04N 21/466 | (2011.01) |
| G06F 3/04817 | (2022.01) |

(52) U.S. Cl.
CPC ........ G06F 3/0482 (2013.01); G06F 3/04817 (2013.01); H04N 21/4668 (2013.01); H04N 21/47202 (2013.01)

(58) Field of Classification Search
CPC .............. G06F 3/0482; G06F 3/04817; H04N 21/4668; H04N 21/47202
See application file for complete search history.

(56) References Cited

U.S. PATENT DOCUMENTS

| | | |
|---|---|---|
| 4,672,677 A | 6/1987 | Yamakawa |
| 5,029,223 A | 7/1991 | Fujisaki |
| 5,483,261 A | 1/1996 | Yasutake |
| 5,488,204 A | 1/1996 | Mead et al. |
| 5,596,373 A | 1/1997 | White et al. |
| 5,621,456 A | 4/1997 | Florin et al. |
| 5,825,352 A | 10/1998 | Bisset et al. |
| 5,835,079 A | 11/1998 | Shieh |
| 5,880,411 A | 3/1999 | Gillespie et al. |
| 5,886,690 A | 3/1999 | Pond et al. |
| 5,926,230 A | 7/1999 | Niijima et al. |
| 6,021,320 A | 2/2000 | Bickford et al. |

(Continued)

FOREIGN PATENT DOCUMENTS

| | | |
|---|---|---|
| AU | 2009255409 B2 | 7/2012 |
| AU | 2016100476 A4 | 5/2016 |

(Continued)

OTHER PUBLICATIONS

Advisory Action received for U.S. Appl. No. 15/167,801, dated Feb. 16, 2018, 4 pages.

(Continued)

*Primary Examiner* — Cao H Nguyen
(74) *Attorney, Agent, or Firm* — Kubota & Basol LLP

(57) ABSTRACT

In some embodiments, an electronic device presents user interfaces for browsing and presenting content. In some embodiments, the electronic device presents representations of recommended items of content that include representations of content items the user is entitled to access without including representations of content items the user is not entitled to access.

50 Claims, 36 Drawing Sheets

(56) References Cited

U.S. PATENT DOCUMENTS

| | | |
|---|---|---|
| 6,028,600 A | 2/2000 | Rosin et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,405,371 B1 | 6/2002 | Oosterhout et al. |
| 6,487,722 B1 | 11/2002 | Okura et al. |
| 6,570,557 B1 | 5/2003 | Westerman et al. |
| 6,628,304 B2 | 9/2003 | Mitchell et al. |
| 6,677,932 B1 | 1/2004 | Westerman |
| 6,690,387 B2 | 2/2004 | Zimmerman et al. |
| 6,745,391 B1 | 6/2004 | Macrae et al. |
| 6,909,837 B1 | 6/2005 | Unger |
| 7,015,894 B2 | 3/2006 | Morohoshi |
| 7,039,879 B2 | 5/2006 | Bergsten et al. |
| 7,103,906 B1 | 9/2006 | Katz et al. |
| 7,134,089 B2 | 11/2006 | Celik et al. |
| 7,184,064 B2 | 2/2007 | Zimmerman et al. |
| 7,213,255 B2 | 5/2007 | Markel et al. |
| 7,293,275 B1 | 11/2007 | Krieger et al. |
| 7,330,192 B2 | 2/2008 | Brunner et al. |
| 7,596,761 B2 | 9/2009 | Lemay et al. |
| 7,614,008 B2 | 11/2009 | Ording |
| 7,631,278 B2 | 12/2009 | Miksovsky et al. |
| 7,633,076 B2 | 12/2009 | Huppi et al. |
| 7,636,897 B2 | 12/2009 | Koralski et al. |
| 7,649,526 B2 | 1/2010 | Ording et al. |
| 7,650,569 B1 | 1/2010 | Allen et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,694,231 B2 | 4/2010 | Kocienda et al. |
| 7,712,051 B2 | 5/2010 | Chadzelek et al. |
| 7,783,892 B2 | 8/2010 | Russell et al. |
| 7,810,043 B2 | 10/2010 | Ostojic et al. |
| 7,814,023 B1 | 10/2010 | Rao et al. |
| 7,827,483 B2 | 11/2010 | Unbedacht et al. |
| 7,836,475 B2 | 11/2010 | Angiolillo et al. |
| 7,844,914 B2 | 11/2010 | Andre et al. |
| 7,849,487 B1 | 12/2010 | Vosseller |
| 7,856,605 B2 | 12/2010 | Ording et al. |
| 7,917,477 B2 | 3/2011 | Hutson et al. |
| 7,956,846 B2 | 6/2011 | Ording et al. |
| 7,957,762 B2 | 6/2011 | Herz et al. |
| 7,970,379 B2 | 6/2011 | White et al. |
| 8,006,002 B2 | 8/2011 | Kalayjian et al. |
| 8,026,805 B1 | 9/2011 | Rowe |
| 8,082,523 B2 | 12/2011 | Forstall et al. |
| 8,094,132 B1 | 1/2012 | Frischling et al. |
| 8,115,731 B2 | 2/2012 | Varanda |
| 8,145,617 B1 | 3/2012 | Verstak et al. |
| 8,170,931 B2 | 5/2012 | Ross et al. |
| 8,205,240 B2 | 6/2012 | Ansari et al. |
| 8,239,784 B2 | 8/2012 | Hotelling et al. |
| 8,279,180 B2 | 10/2012 | Hotelling et al. |
| 8,291,452 B1 | 10/2012 | Yong et al. |
| 8,299,889 B2 | 10/2012 | Kumar et al. |
| 8,301,484 B1 | 10/2012 | Kumar |
| 8,312,484 B1 | 11/2012 | Mccarty et al. |
| 8,312,486 B1 | 11/2012 | Briggs et al. |
| 8,325,160 B2 | 12/2012 | St. Pierre et al. |
| 8,346,798 B2 | 1/2013 | Spiegelman et al. |
| 8,370,874 B1 | 2/2013 | Chang et al. |
| 8,381,135 B2 | 2/2013 | Hotelling et al. |
| 8,386,588 B1 | 2/2013 | Cooley |
| 8,407,737 B1 | 3/2013 | Ellis |
| 8,416,217 B1 | 4/2013 | Eriksson et al. |
| 8,418,202 B2 | 4/2013 | Ahmad-taylor |
| 8,424,048 B1 | 4/2013 | Lyren et al. |
| 8,479,122 B2 | 7/2013 | Hotelling et al. |
| 8,495,499 B1 | 7/2013 | Denise |
| 8,516,063 B2 | 8/2013 | Fletcher |
| 8,516,525 B1 | 8/2013 | Jerding et al. |
| 8,560,398 B1 | 10/2013 | Few et al. |
| 8,584,165 B1 | 11/2013 | Kane et al. |
| 8,607,163 B2 | 12/2013 | Plummer |
| 8,613,015 B2 | 12/2013 | Gordon et al. |
| 8,613,023 B2 | 12/2013 | Narahara et al. |
| 8,674,958 B1 | 3/2014 | Kravets et al. |
| 8,683,362 B2 | 3/2014 | Shiplacoff et al. |
| 8,683,517 B2 | 3/2014 | Carpenter et al. |
| 8,730,190 B2 | 5/2014 | Moloney |
| 8,742,885 B2 | 6/2014 | Brodersen et al. |
| 8,754,862 B2 | 6/2014 | Zaliva |
| 8,762,852 B2 | 6/2014 | Davis et al. |
| 8,769,408 B2 | 7/2014 | Madden et al. |
| 8,782,706 B2 | 7/2014 | Ellis |
| 8,850,471 B2 | 9/2014 | Kilar et al. |
| 8,850,490 B1 | 9/2014 | Thomas et al. |
| 8,869,207 B1 | 10/2014 | Earle |
| 8,887,202 B2 | 11/2014 | Hunter et al. |
| 8,930,839 B2 | 1/2015 | He et al. |
| 8,952,987 B2 | 2/2015 | Momeyer et al. |
| 8,963,847 B2 | 2/2015 | Hunt |
| 8,983,950 B2 | 3/2015 | Askey et al. |
| 8,988,356 B2 | 3/2015 | Tseng |
| 8,990,857 B2 | 3/2015 | Yong et al. |
| 9,007,322 B1 | 4/2015 | Young |
| 9,066,146 B2 | 6/2015 | Suh et al. |
| 9,081,421 B1 | 7/2015 | Lai et al. |
| 9,092,057 B2 | 7/2015 | Varela et al. |
| 9,116,569 B2 | 8/2015 | Stacy et al. |
| 9,118,967 B2 | 8/2015 | Sirpal et al. |
| 9,129,656 B2 | 9/2015 | Prather et al. |
| 9,141,200 B2 | 9/2015 | Bernstein et al. |
| 9,196,309 B2 | 11/2015 | Schultz et al. |
| 9,214,290 B2 | 12/2015 | Xie et al. |
| 9,215,273 B2 | 12/2015 | Jonnala et al. |
| 9,219,634 B1 | 12/2015 | Morse et al. |
| 9,235,317 B2 | 1/2016 | Matas et al. |
| 9,241,121 B2 | 1/2016 | Rudolph |
| 9,244,600 B2 | 1/2016 | Mcintosh et al. |
| 9,247,014 B1 | 1/2016 | Rao |
| 9,247,174 B2 | 1/2016 | Sirpal et al. |
| 9,285,977 B1 | 3/2016 | Greenberg et al. |
| 9,319,727 B2 | 4/2016 | Phipps et al. |
| 9,348,458 B2 | 5/2016 | Hotelling et al. |
| 9,357,250 B1 | 5/2016 | Newman et al. |
| 9,380,343 B2 | 6/2016 | Webster et al. |
| 9,414,108 B2 | 8/2016 | Sirpal et al. |
| 9,454,288 B2 | 9/2016 | Raffle et al. |
| 9,532,111 B1 | 12/2016 | Christie et al. |
| 9,538,310 B2 | 1/2017 | Fjeldsoe-nielsen et al. |
| 9,542,060 B1 | 1/2017 | Brenner et al. |
| 9,560,399 B2 | 1/2017 | Kaya et al. |
| 9,575,944 B2 | 2/2017 | Neil et al. |
| 9,591,339 B1 | 3/2017 | Christie et al. |
| 9,602,566 B1 | 3/2017 | Lewis et al. |
| 9,639,241 B2 | 5/2017 | Penha et al. |
| 9,652,448 B2 | 5/2017 | Pasquero et al. |
| 9,658,740 B2 | 5/2017 | Chaudhri |
| 9,774,917 B1 | 9/2017 | Christie et al. |
| 9,792,018 B2 | 10/2017 | Van Os et al. |
| 9,807,462 B2 | 10/2017 | Wood |
| 9,864,508 B2 | 1/2018 | Dixon et al. |
| 9,864,509 B2 | 1/2018 | Howard et al. |
| 9,871,905 B1 | 1/2018 | Habiger et al. |
| 9,913,142 B2 | 3/2018 | Folse et al. |
| 9,933,937 B2 | 4/2018 | Lemay et al. |
| 9,973,800 B2 | 5/2018 | Yellin et al. |
| 10,019,142 B2 | 7/2018 | Van Os et al. |
| 10,025,499 B2 | 7/2018 | Howard et al. |
| 10,079,872 B1 | 9/2018 | Thomas et al. |
| 10,091,558 B2 | 10/2018 | Christie et al. |
| 10,116,996 B1 | 10/2018 | Christie et al. |
| 10,126,904 B2 | 11/2018 | Agnetta et al. |
| 10,168,871 B2 | 1/2019 | Wallters et al. |
| 10,200,761 B1 | 2/2019 | Christie et al. |
| 10,205,985 B2 | 2/2019 | Lue-sang et al. |
| 10,209,866 B2 | 2/2019 | Johnston et al. |
| 10,237,599 B1 | 3/2019 | Gravino et al. |
| 10,275,148 B2 | 4/2019 | Matas et al. |
| 10,282,088 B2 | 5/2019 | Kim et al. |
| 10,303,422 B1 | 5/2019 | Woo et al. |
| 10,405,015 B2 | 9/2019 | Kite et al. |

(56) References Cited

U.S. PATENT DOCUMENTS

| | | |
|---|---|---|
| 10,521,188 B1 | 12/2019 | Christie et al. |
| 10,552,470 B2 | 2/2020 | Todd et al. |
| 10,564,823 B1 | 2/2020 | Dennis et al. |
| 10,601,808 B1 | 3/2020 | Nijim et al. |
| 10,606,539 B2 | 3/2020 | Bernstein et al. |
| 10,631,042 B2 | 4/2020 | Zerr et al. |
| 10,795,490 B2 | 10/2020 | Chaudhri et al. |
| 10,827,007 B2 | 11/2020 | Kode et al. |
| 11,062,358 B1 | 7/2021 | Lewis et al. |
| 2002/0015024 A1 | 2/2002 | Westerman et al. |
| 2002/0026637 A1 | 2/2002 | Markel et al. |
| 2002/0042920 A1 | 4/2002 | Thomas et al. |
| 2002/0060750 A1 | 5/2002 | Istvan et al. |
| 2002/0085045 A1 | 7/2002 | Vong et al. |
| 2002/0112239 A1 | 8/2002 | Goldman |
| 2002/0113816 A1 | 8/2002 | Mitchell et al. |
| 2002/0144269 A1 | 10/2002 | Connelly |
| 2002/0171686 A1 | 11/2002 | Kamen et al. |
| 2003/0001907 A1 | 1/2003 | Bergsten et al. |
| 2003/0005445 A1 | 1/2003 | Schein et al. |
| 2003/0009757 A1 | 1/2003 | Kikinis |
| 2003/0011641 A1 | 1/2003 | Totman et al. |
| 2003/0013483 A1 | 1/2003 | Ausems et al. |
| 2003/0088872 A1 | 5/2003 | Maissel et al. |
| 2003/0093790 A1 | 5/2003 | Logan et al. |
| 2003/0126600 A1 | 7/2003 | Heuvelman |
| 2003/0149628 A1 | 8/2003 | Abbosh et al. |
| 2003/0167471 A1 | 9/2003 | Roth et al. |
| 2003/0177075 A1 | 9/2003 | Burke |
| 2003/0177498 A1 | 9/2003 | Ellis et al. |
| 2003/0221191 A1 | 11/2003 | Khusheim |
| 2003/0234804 A1 | 12/2003 | Parker et al. |
| 2004/0070573 A1 | 4/2004 | Graham |
| 2004/0090463 A1 | 5/2004 | Celik et al. |
| 2004/0139401 A1 | 7/2004 | Unbedacht et al. |
| 2004/0161151 A1 | 8/2004 | Iwayama et al. |
| 2004/0168184 A1 | 8/2004 | Steenkamp et al. |
| 2004/0193421 A1 | 9/2004 | Blass |
| 2004/0252120 A1 | 12/2004 | Hunleth et al. |
| 2004/0254883 A1 | 12/2004 | Kondrk et al. |
| 2004/0254958 A1 | 12/2004 | Volk |
| 2004/0267715 A1 | 12/2004 | Polson et al. |
| 2005/0012599 A1 | 1/2005 | Dematteo |
| 2005/0071761 A1 | 3/2005 | Kontio |
| 2005/0071785 A1 | 3/2005 | Chadzelek et al. |
| 2005/0091254 A1 | 4/2005 | Stabb et al. |
| 2005/0091597 A1 | 4/2005 | Ackley |
| 2005/0162398 A1 | 7/2005 | Eliasson et al. |
| 2005/0162402 A1 | 7/2005 | Watanachote |
| 2005/0186988 A1 | 8/2005 | Lim et al. |
| 2005/0190059 A1 | 9/2005 | Wehrenberg |
| 2005/0223335 A1 | 10/2005 | Ichikawa |
| 2005/0235316 A1 | 10/2005 | Ahmad-taylor |
| 2005/0257166 A1 | 11/2005 | Tu |
| 2005/0283358 A1 | 12/2005 | Stephanick et al. |
| 2006/0017692 A1 | 1/2006 | Wehrenberg et al. |
| 2006/0020904 A1 | 1/2006 | Aaltonen et al. |
| 2006/0026521 A1 | 2/2006 | Hotelling et al. |
| 2006/0029374 A1 | 2/2006 | Park |
| 2006/0031872 A1 | 2/2006 | Hsiao et al. |
| 2006/0033724 A1 | 2/2006 | Chaudhri et al. |
| 2006/0053449 A1 | 3/2006 | Gutta |
| 2006/0071905 A1 | 4/2006 | Varanda |
| 2006/0080352 A1 | 4/2006 | Boubez et al. |
| 2006/0097991 A1 | 5/2006 | Hotelling et al. |
| 2006/0107304 A1 | 5/2006 | Cleron et al. |
| 2006/0112346 A1 | 5/2006 | Miksovsky et al. |
| 2006/0112352 A1 | 5/2006 | Tseng et al. |
| 2006/0117267 A1 | 6/2006 | Koralski et al. |
| 2006/0195479 A1 | 8/2006 | Spiegelman et al. |
| 2006/0195512 A1 | 8/2006 | Rogers et al. |
| 2006/0197753 A1 | 9/2006 | Hotelling |
| 2006/0224987 A1 | 10/2006 | Caffarelli |
| 2006/0271968 A1 | 11/2006 | Zellner |
| 2006/0282856 A1 | 12/2006 | Errico et al. |
| 2006/0294545 A1 | 12/2006 | Morris et al. |
| 2007/0005569 A1 | 1/2007 | Hurst-hiller et al. |
| 2007/0009229 A1 | 1/2007 | Liu |
| 2007/0028267 A1 | 2/2007 | Ostojic et al. |
| 2007/0038957 A1 | 2/2007 | White |
| 2007/0073596 A1 | 3/2007 | Alexander et al. |
| 2007/0092204 A1 | 4/2007 | Wagner et al. |
| 2007/0150802 A1 | 6/2007 | Wan et al. |
| 2007/0154163 A1 | 7/2007 | Cordray |
| 2007/0157220 A1 | 7/2007 | Cordray et al. |
| 2007/0157249 A1 | 7/2007 | Cordray et al. |
| 2007/0186254 A1 | 8/2007 | Tsutsui et al. |
| 2007/0199035 A1 | 8/2007 | Schwartz et al. |
| 2007/0204057 A1 | 8/2007 | Shaver et al. |
| 2007/0229465 A1 | 10/2007 | Sakai et al. |
| 2007/0233880 A1 | 10/2007 | Nieh et al. |
| 2007/0244902 A1 | 10/2007 | Seide et al. |
| 2008/0046928 A1 | 2/2008 | Poling et al. |
| 2008/0059884 A1 | 3/2008 | Ellis et al. |
| 2008/0065989 A1 | 3/2008 | Conroy et al. |
| 2008/0066010 A1 | 3/2008 | Brodersen et al. |
| 2008/0077562 A1 | 3/2008 | Schleppe |
| 2008/0092168 A1 | 4/2008 | Logan et al. |
| 2008/0092173 A1 | 4/2008 | Shannon et al. |
| 2008/0111822 A1 | 5/2008 | Horowitz et al. |
| 2008/0120668 A1 | 5/2008 | Yau |
| 2008/0155475 A1 | 6/2008 | Duhig |
| 2008/0189740 A1 | 8/2008 | Carpenter et al. |
| 2008/0189742 A1 | 8/2008 | Ellis et al. |
| 2008/0216020 A1 | 9/2008 | Plummer |
| 2008/0222677 A1 | 9/2008 | Woo et al. |
| 2008/0235588 A1 | 9/2008 | Gonze et al. |
| 2008/0243817 A1 | 10/2008 | Chan et al. |
| 2008/0250312 A1* | 10/2008 | Curtis .................. G06Q 10/00 715/700 |
| 2008/0260252 A1 | 10/2008 | Borgaonkar et al. |
| 2008/0270886 A1 | 10/2008 | Gossweiler et al. |
| 2008/0276279 A1 | 11/2008 | Gossweiler et al. |
| 2008/0301579 A1 | 12/2008 | Jonasson et al. |
| 2008/0301734 A1 | 12/2008 | Goldeen et al. |
| 2008/0307343 A1 | 12/2008 | Robert et al. |
| 2008/0307458 A1 | 12/2008 | Kim et al. |
| 2008/0307459 A1 | 12/2008 | Migos |
| 2008/0320391 A1 | 12/2008 | Lemay et al. |
| 2008/0320532 A1 | 12/2008 | Lee |
| 2009/0055385 A1 | 2/2009 | Jeon et al. |
| 2009/0063975 A1 | 3/2009 | Rottler et al. |
| 2009/0089837 A1 | 4/2009 | Momosaki |
| 2009/0094662 A1 | 4/2009 | Chang et al. |
| 2009/0119754 A1 | 5/2009 | Schubert |
| 2009/0158325 A1 | 6/2009 | Johnson |
| 2009/0158326 A1 | 6/2009 | Hunt et al. |
| 2009/0161868 A1 | 6/2009 | Chaudhry |
| 2009/0165054 A1 | 6/2009 | Rudolph |
| 2009/0174679 A1 | 7/2009 | Westerman |
| 2009/0177989 A1 | 7/2009 | Ma et al. |
| 2009/0178083 A1 | 7/2009 | Carr et al. |
| 2009/0228491 A1 | 9/2009 | Malik |
| 2009/0239587 A1 | 9/2009 | Negron et al. |
| 2009/0256807 A1 | 10/2009 | Nurmi |
| 2009/0259957 A1 | 10/2009 | Slocum et al. |
| 2009/0288079 A1 | 11/2009 | Zuber et al. |
| 2009/0313100 A1 | 12/2009 | Ingleshwar |
| 2009/0322962 A1 | 12/2009 | Weeks |
| 2009/0327952 A1 | 12/2009 | Karas et al. |
| 2010/0009629 A1 | 1/2010 | Jung et al. |
| 2010/0031162 A1 | 2/2010 | Wiser et al. |
| 2010/0053220 A1 | 3/2010 | Ozawa et al. |
| 2010/0053432 A1 | 3/2010 | Cheng et al. |
| 2010/0057696 A1 | 3/2010 | Miyazawa et al. |
| 2010/0064313 A1 | 3/2010 | Beyabani |
| 2010/0080163 A1 | 4/2010 | Krishnamoorthi et al. |
| 2010/0095240 A1 | 4/2010 | Shiplacoff et al. |
| 2010/0100899 A1 | 4/2010 | Bradbury et al. |
| 2010/0104269 A1 | 4/2010 | Prestenback et al. |
| 2010/0115592 A1 | 5/2010 | Belz et al. |
| 2010/0121714 A1 | 5/2010 | Bryant et al. |
| 2010/0146442 A1 | 6/2010 | Nagasaka et al. |
| 2010/0153999 A1 | 6/2010 | Yates |

(56) References Cited

U.S. PATENT DOCUMENTS

| | | |
|---|---|---|
| 2010/0159898 A1 | 6/2010 | Krzyzanowski et al. |
| 2010/0162172 A1 | 6/2010 | Aroner |
| 2010/0194998 A1 | 8/2010 | Lee et al. |
| 2010/0198822 A1 | 8/2010 | Glennon et al. |
| 2010/0205628 A1 | 8/2010 | Davis et al. |
| 2010/0211636 A1 | 8/2010 | Starkenburg et al. |
| 2010/0223646 A1 | 9/2010 | Goldeen et al. |
| 2010/0229194 A1 | 9/2010 | Blanchard et al. |
| 2010/0235744 A1 | 9/2010 | Schultz et al. |
| 2010/0251304 A1 | 9/2010 | Donoghue et al. |
| 2010/0269145 A1 | 10/2010 | Ingrassia et al. |
| 2010/0275143 A1 | 10/2010 | Fu et al. |
| 2010/0277337 A1 | 11/2010 | Brodersen et al. |
| 2010/0293190 A1 | 11/2010 | Kaiser et al. |
| 2010/0293586 A1 | 11/2010 | Simoes et al. |
| 2010/0312824 A1 | 12/2010 | Smith et al. |
| 2010/0325660 A1 | 12/2010 | Holden |
| 2010/0333142 A1 | 12/2010 | Busse et al. |
| 2010/0333143 A1 | 12/2010 | Civanlar et al. |
| 2011/0004831 A1 | 1/2011 | Steinberg et al. |
| 2011/0047513 A1 | 2/2011 | Onogi et al. |
| 2011/0052146 A1 | 3/2011 | Murthy et al. |
| 2011/0054649 A1 | 3/2011 | Sarkis et al. |
| 2011/0055870 A1 | 3/2011 | Yum et al. |
| 2011/0071977 A1 | 3/2011 | Nakajima et al. |
| 2011/0078739 A1 | 3/2011 | Grad |
| 2011/0080935 A1 | 4/2011 | Kim et al. |
| 2011/0087992 A1 | 4/2011 | Wang et al. |
| 2011/0090402 A1 | 4/2011 | Huntington et al. |
| 2011/0093415 A1 | 4/2011 | Rhee et al. |
| 2011/0119715 A1 | 5/2011 | Chang et al. |
| 2011/0131607 A1 | 6/2011 | Thomas et al. |
| 2011/0154194 A1 | 6/2011 | Mathai et al. |
| 2011/0154305 A1 | 6/2011 | Leroux et al. |
| 2011/0157029 A1 | 6/2011 | Tseng |
| 2011/0162022 A1 | 6/2011 | Xia |
| 2011/0163971 A1 | 7/2011 | Wagner et al. |
| 2011/0167339 A1 | 7/2011 | Lemay |
| 2011/0175930 A1 | 7/2011 | Hwang et al. |
| 2011/0179388 A1 | 7/2011 | Fleizach et al. |
| 2011/0179453 A1 | 7/2011 | Poniatowski |
| 2011/0197153 A1 | 8/2011 | King et al. |
| 2011/0209177 A1 | 8/2011 | Sela et al. |
| 2011/0218948 A1 | 9/2011 | De et al. |
| 2011/0231280 A1 | 9/2011 | Farah |
| 2011/0231823 A1 | 9/2011 | Frye et al. |
| 2011/0231872 A1 | 9/2011 | Gharachorloo et al. |
| 2011/0231878 A1 | 9/2011 | Hunter et al. |
| 2011/0246332 A1 | 10/2011 | Alcodray et al. |
| 2011/0281517 A1 | 11/2011 | Ukkadam |
| 2011/0283304 A1 | 11/2011 | Roberts et al. |
| 2011/0283333 A1 | 11/2011 | Ukkadam |
| 2011/0289064 A1 | 11/2011 | Lebeau et al. |
| 2011/0289317 A1 | 11/2011 | Darapu et al. |
| 2011/0289419 A1 | 11/2011 | Yu et al. |
| 2011/0289421 A1 | 11/2011 | Jordan et al. |
| 2011/0289452 A1 | 11/2011 | Jordan et al. |
| 2011/0289531 A1 | 11/2011 | Moonka et al. |
| 2011/0289534 A1 | 11/2011 | Jordan et al. |
| 2011/0296351 A1 | 12/2011 | Ewing et al. |
| 2011/0302532 A1 | 12/2011 | Missig |
| 2011/0312278 A1 | 12/2011 | Matsushita et al. |
| 2011/0321072 A1 | 12/2011 | Patterson et al. |
| 2012/0019674 A1 | 1/2012 | Ohnishi et al. |
| 2012/0036552 A1 | 2/2012 | Dare et al. |
| 2012/0042245 A1 | 2/2012 | Askey et al. |
| 2012/0042343 A1 | 2/2012 | Laligand et al. |
| 2012/0053887 A1 | 3/2012 | Nurmi |
| 2012/0054178 A1 | 3/2012 | Tran et al. |
| 2012/0054642 A1 | 3/2012 | Balsiger et al. |
| 2012/0054797 A1 | 3/2012 | Skog et al. |
| 2012/0059910 A1 | 3/2012 | Cassidy |
| 2012/0060092 A1 | 3/2012 | Hill et al. |
| 2012/0064204 A1 | 3/2012 | Davila et al. |
| 2012/0084136 A1 | 4/2012 | Seth et al. |
| 2012/0102573 A1 | 4/2012 | Spooner et al. |
| 2012/0105367 A1 | 5/2012 | Son et al. |
| 2012/0110616 A1 | 5/2012 | Kilar et al. |
| 2012/0110621 A1 | 5/2012 | Gossweiler, III |
| 2012/0114303 A1 | 5/2012 | Chung et al. |
| 2012/0117584 A1 | 5/2012 | Gordon |
| 2012/0139938 A1 | 6/2012 | Khedouri et al. |
| 2012/0144003 A1 | 6/2012 | Rosenbaum et al. |
| 2012/0158524 A1 | 6/2012 | Hintz et al. |
| 2012/0173991 A1 | 7/2012 | Roberts et al. |
| 2012/0174157 A1 | 7/2012 | Stinson et al. |
| 2012/0198020 A1 | 8/2012 | Parker et al. |
| 2012/0198336 A1 | 8/2012 | Novotny et al. |
| 2012/0210366 A1 | 8/2012 | Wong et al. |
| 2012/0216113 A1 | 8/2012 | Li |
| 2012/0216117 A1 | 8/2012 | Arriola et al. |
| 2012/0216296 A1 | 8/2012 | Kidron |
| 2012/0221498 A1 | 8/2012 | Kaszynski et al. |
| 2012/0222056 A1 | 8/2012 | Donoghue et al. |
| 2012/0233640 A1 | 9/2012 | Odryna et al. |
| 2012/0260291 A1 | 10/2012 | Wood |
| 2012/0260293 A1 | 10/2012 | Young et al. |
| 2012/0262371 A1 | 10/2012 | Lee et al. |
| 2012/0262407 A1 | 10/2012 | Hinckley et al. |
| 2012/0266069 A1 | 10/2012 | Moshiri et al. |
| 2012/0272261 A1 | 10/2012 | Reynolds et al. |
| 2012/0284753 A1 | 11/2012 | Roberts et al. |
| 2012/0290933 A1 | 11/2012 | Rajaraman et al. |
| 2012/0291079 A1 | 11/2012 | Gordon et al. |
| 2012/0308143 A1 | 12/2012 | Bellegarda et al. |
| 2012/0311443 A1 | 12/2012 | Chaudhri et al. |
| 2012/0311638 A1 | 12/2012 | Reyna et al. |
| 2012/0317482 A1 | 12/2012 | Barraclough et al. |
| 2012/0323938 A1 | 12/2012 | Skeen et al. |
| 2012/0324504 A1 | 12/2012 | Archer et al. |
| 2012/0327125 A1 | 12/2012 | Kutliroff et al. |
| 2013/0014150 A1 | 1/2013 | Seo et al. |
| 2013/0014159 A1 | 1/2013 | Wiser et al. |
| 2013/0021288 A1 | 1/2013 | Kaerkkaeinen et al. |
| 2013/0024895 A1 | 1/2013 | Yong et al. |
| 2013/0031585 A1 | 1/2013 | Itagaki et al. |
| 2013/0033643 A1 | 2/2013 | Kim et al. |
| 2013/0042271 A1 | 2/2013 | Yellin et al. |
| 2013/0061234 A1 | 3/2013 | Piira et al. |
| 2013/0061267 A1 | 3/2013 | Cansino et al. |
| 2013/0067366 A1 | 3/2013 | Almosnino |
| 2013/0073403 A1 | 3/2013 | Tuchman et al. |
| 2013/0083076 A1 | 4/2013 | Liu et al. |
| 2013/0097009 A1 | 4/2013 | Akadiri |
| 2013/0110978 A1 | 5/2013 | Gordon et al. |
| 2013/0124998 A1 | 5/2013 | Pendergast et al. |
| 2013/0132874 A1 | 5/2013 | He et al. |
| 2013/0132966 A1 | 5/2013 | Chanda et al. |
| 2013/0151300 A1 | 6/2013 | Le et al. |
| 2013/0174193 A1 | 7/2013 | Yu et al. |
| 2013/0179812 A1 | 7/2013 | Bianrosa et al. |
| 2013/0179995 A1 | 7/2013 | Basile et al. |
| 2013/0205312 A1 | 8/2013 | Huang |
| 2013/0247105 A1 | 9/2013 | Jovanovski et al. |
| 2013/0262431 A1 | 10/2013 | Garner et al. |
| 2013/0262558 A1 | 10/2013 | Wood et al. |
| 2013/0262619 A1 | 10/2013 | Goodwin et al. |
| 2013/0262633 A1 | 10/2013 | Goodwin et al. |
| 2013/0263189 A1 | 10/2013 | Garner |
| 2013/0283154 A1 | 10/2013 | Sasakura |
| 2013/0283168 A1 | 10/2013 | Brown et al. |
| 2013/0283317 A1 | 10/2013 | Guntupalli et al. |
| 2013/0283318 A1 | 10/2013 | Wannamaker |
| 2013/0285937 A1 | 10/2013 | Billings et al. |
| 2013/0290233 A1 | 10/2013 | Ferren et al. |
| 2013/0290848 A1 | 10/2013 | Billings et al. |
| 2013/0291018 A1 | 10/2013 | Billings et al. |
| 2013/0291037 A1 | 10/2013 | Im et al. |
| 2013/0294755 A1 | 11/2013 | Arme et al. |
| 2013/0312044 A1 | 11/2013 | Itagaki |
| 2013/0326499 A1 | 12/2013 | Mowatt et al. |
| 2013/0326554 A1 | 12/2013 | Shkedi |
| 2013/0326561 A1 | 12/2013 | Pandey |
| 2013/0332838 A1 | 12/2013 | Naggar et al. |

(56) References Cited

U.S. PATENT DOCUMENTS

| | | |
|---|---|---|
| 2013/0332960 A1 | 12/2013 | Young et al. |
| 2013/0340006 A1 | 12/2013 | Kwan |
| 2013/0346564 A1 | 12/2013 | Warrick et al. |
| 2013/0347044 A1 | 12/2013 | Lee et al. |
| 2014/0006635 A1 | 1/2014 | Braness et al. |
| 2014/0006795 A1 | 1/2014 | Han et al. |
| 2014/0006951 A1 | 1/2014 | Hunter |
| 2014/0012859 A1 | 1/2014 | Heilprin et al. |
| 2014/0013283 A1 | 1/2014 | Matas et al. |
| 2014/0024341 A1 | 1/2014 | Johan |
| 2014/0033245 A1 | 1/2014 | Barton et al. |
| 2014/0049692 A1 | 2/2014 | Sirpal et al. |
| 2014/0052683 A1 | 2/2014 | Kirkham et al. |
| 2014/0053116 A1 | 2/2014 | Smith et al. |
| 2014/0053195 A1 | 2/2014 | Sirpal et al. |
| 2014/0059605 A1 | 2/2014 | Sirpal et al. |
| 2014/0059615 A1 | 2/2014 | Sirpal et al. |
| 2014/0059635 A1 | 2/2014 | Sirpal et al. |
| 2014/0071068 A1 | 3/2014 | Shih et al. |
| 2014/0074454 A1 | 3/2014 | Brown et al. |
| 2014/0075313 A1 | 3/2014 | Bachman et al. |
| 2014/0075316 A1 | 3/2014 | Li |
| 2014/0075394 A1 | 3/2014 | Nawle et al. |
| 2014/0075574 A1 | 3/2014 | Zheng et al. |
| 2014/0082497 A1 | 3/2014 | Chalouhi et al. |
| 2014/0088952 A1 | 3/2014 | Fife et al. |
| 2014/0089816 A1 | 3/2014 | Dipersia et al. |
| 2014/0098102 A1 | 4/2014 | Raffle et al. |
| 2014/0104646 A1 | 4/2014 | Nishiyama |
| 2014/0109204 A1 | 4/2014 | Papillon et al. |
| 2014/0111416 A1 | 4/2014 | Sugiura |
| 2014/0115636 A1 | 4/2014 | Stuckman |
| 2014/0123006 A1 | 5/2014 | Chen et al. |
| 2014/0129232 A1 | 5/2014 | Jones et al. |
| 2014/0130097 A1 | 5/2014 | Londero |
| 2014/0136946 A1 | 5/2014 | Matas |
| 2014/0137030 A1 | 5/2014 | Matas |
| 2014/0143683 A1 | 5/2014 | Underwood et al. |
| 2014/0156792 A1 | 6/2014 | Roberts et al. |
| 2014/0157204 A1 | 6/2014 | Roberts et al. |
| 2014/0164966 A1 | 6/2014 | Kim et al. |
| 2014/0168071 A1 | 6/2014 | Ahmed et al. |
| 2014/0171153 A1 | 6/2014 | Kienzle et al. |
| 2014/0172953 A1 | 6/2014 | Blanksteen |
| 2014/0173660 A1 | 6/2014 | Correa et al. |
| 2014/0184471 A1 | 7/2014 | Martynov et al. |
| 2014/0189523 A1 | 7/2014 | Shuttleworth et al. |
| 2014/0189574 A1 | 7/2014 | Stallings et al. |
| 2014/0189606 A1 | 7/2014 | Shuttleworth et al. |
| 2014/0196064 A1 | 7/2014 | Kennedy et al. |
| 2014/0208268 A1 | 7/2014 | Jimenez |
| 2014/0208360 A1 | 7/2014 | Kardatzke |
| 2014/0219637 A1 | 8/2014 | Mcintosh et al. |
| 2014/0224867 A1 | 8/2014 | Werner et al. |
| 2014/0244751 A1 | 8/2014 | Tseng |
| 2014/0245148 A1 | 8/2014 | Silva et al. |
| 2014/0245186 A1 | 8/2014 | Tseng |
| 2014/0245222 A1 | 8/2014 | Kovacevic et al. |
| 2014/0250465 A1 | 9/2014 | Mulholland et al. |
| 2014/0250479 A1 | 9/2014 | Lee et al. |
| 2014/0253463 A1 | 9/2014 | Hicks |
| 2014/0259074 A1 | 9/2014 | Ansari et al. |
| 2014/0278072 A1 | 9/2014 | Fino et al. |
| 2014/0278940 A1 | 9/2014 | Wade |
| 2014/0282208 A1 | 9/2014 | Chaudhri |
| 2014/0282636 A1 | 9/2014 | Petander et al. |
| 2014/0282677 A1 | 9/2014 | Mantell et al. |
| 2014/0289226 A1 | 9/2014 | English et al. |
| 2014/0289751 A1 | 9/2014 | Hsu et al. |
| 2014/0310742 A1 | 10/2014 | Kim |
| 2014/0333530 A1 | 11/2014 | Agnetta et al. |
| 2014/0337607 A1 | 11/2014 | Peterson et al. |
| 2014/0340358 A1 | 11/2014 | Martinoli |
| 2014/0341109 A1 | 11/2014 | Cartmell et al. |
| 2014/0344247 A1 | 11/2014 | Procopio et al. |
| 2014/0344291 A9 | 11/2014 | Simonson et al. |
| 2014/0344294 A1 | 11/2014 | Skeen et al. |
| 2014/0351691 A1 | 11/2014 | Neil et al. |
| 2014/0359598 A1 | 12/2014 | Oliver et al. |
| 2014/0365479 A1 | 12/2014 | Lyons et al. |
| 2014/0365481 A1 | 12/2014 | Novosel et al. |
| 2014/0365919 A1 | 12/2014 | Shaw et al. |
| 2014/0366040 A1 | 12/2014 | Parker et al. |
| 2014/0366047 A1 | 12/2014 | Thomas et al. |
| 2015/0020127 A1 | 1/2015 | Doshi et al. |
| 2015/0039685 A1 | 2/2015 | Lewis et al. |
| 2015/0067582 A1 | 3/2015 | Donnelly et al. |
| 2015/0067724 A1 | 3/2015 | Johnson et al. |
| 2015/0074552 A1 | 3/2015 | Chai et al. |
| 2015/0074603 A1 | 3/2015 | Abe et al. |
| 2015/0082187 A1 | 3/2015 | Wallters et al. |
| 2015/0095460 A1 | 4/2015 | Berger et al. |
| 2015/0095845 A1 | 4/2015 | Chun et al. |
| 2015/0113429 A1 | 4/2015 | Edwards et al. |
| 2015/0134653 A1 | 5/2015 | Bayer et al. |
| 2015/0150049 A1 | 5/2015 | White |
| 2015/0150066 A1 | 5/2015 | Park et al. |
| 2015/0153571 A1 | 6/2015 | Ballard et al. |
| 2015/0169705 A1 | 6/2015 | Korbecki et al. |
| 2015/0169975 A1 | 6/2015 | Kienzle et al. |
| 2015/0186002 A1 | 7/2015 | Suzuki et al. |
| 2015/0189347 A1 | 7/2015 | Oztaskent et al. |
| 2015/0195624 A1 | 7/2015 | Gossweiler, III |
| 2015/0205591 A1 | 7/2015 | Jitkoff et al. |
| 2015/0237389 A1 | 8/2015 | Grout et al. |
| 2015/0296072 A1 | 10/2015 | Zhou et al. |
| 2015/0301729 A1 | 10/2015 | Wang et al. |
| 2015/0309670 A1 | 10/2015 | Wheeler et al. |
| 2015/0312603 A1 | 10/2015 | Singh et al. |
| 2015/0317343 A1 | 11/2015 | Cselle et al. |
| 2015/0334464 A1 | 11/2015 | Shin |
| 2015/0346975 A1 | 12/2015 | Lee et al. |
| 2015/0350741 A1 | 12/2015 | Rajaraman et al. |
| 2015/0355816 A1 | 12/2015 | Shim |
| 2015/0363035 A1 | 12/2015 | Hinckley et al. |
| 2015/0365729 A1 | 12/2015 | Kaya et al. |
| 2015/0370435 A1 | 12/2015 | Kirmse et al. |
| 2015/0370455 A1 | 12/2015 | Van Os et al. |
| 2015/0370920 A1 | 12/2015 | Van Os et al. |
| 2015/0373107 A1 | 12/2015 | Chan et al. |
| 2015/0382047 A1 | 12/2015 | Van Os et al. |
| 2016/0004773 A1 | 1/2016 | Jannink et al. |
| 2016/0005013 A1 | 1/2016 | Perry |
| 2016/0014461 A1 | 1/2016 | Leech et al. |
| 2016/0021412 A1 | 1/2016 | Zito, Jr. |
| 2016/0035119 A1 | 2/2016 | Lee et al. |
| 2016/0036897 A1 | 2/2016 | Kim et al. |
| 2016/0041702 A1 | 2/2016 | Wang |
| 2016/0043962 A1 | 2/2016 | Kim et al. |
| 2016/0066004 A1 | 3/2016 | Lieu et al. |
| 2016/0066021 A1 | 3/2016 | Thomas et al. |
| 2016/0066040 A1 | 3/2016 | Webster et al. |
| 2016/0066049 A1 | 3/2016 | Mountain |
| 2016/0078526 A1 | 3/2016 | Nations et al. |
| 2016/0080815 A1 | 3/2016 | Ruffini et al. |
| 2016/0092042 A1 | 3/2016 | Yenigalla et al. |
| 2016/0092559 A1 | 3/2016 | Lind et al. |
| 2016/0096113 A1 | 4/2016 | Decoufle |
| 2016/0099991 A1 | 4/2016 | Lonkar et al. |
| 2016/0105540 A1 | 4/2016 | Kwon et al. |
| 2016/0110064 A1 | 4/2016 | Shapira |
| 2016/0127783 A1 | 5/2016 | Garcia Navarro |
| 2016/0127789 A1 | 5/2016 | Roberts et al. |
| 2016/0133230 A1 | 5/2016 | Daniels et al. |
| 2016/0142783 A1 | 5/2016 | Bagga et al. |
| 2016/0165307 A1 | 6/2016 | Lavender et al. |
| 2016/0188902 A1 | 6/2016 | Jin |
| 2016/0191639 A1 | 6/2016 | Dai et al. |
| 2016/0192017 A1 | 6/2016 | Tirpak |
| 2016/0231885 A1 | 8/2016 | Lee et al. |
| 2016/0249105 A1 | 8/2016 | Carney Landow |
| 2016/0255379 A1 | 9/2016 | Langan et al. |
| 2016/0277785 A1 | 9/2016 | Newman et al. |
| 2016/0345070 A1 | 11/2016 | Beeson et al. |

(56) References Cited

U.S. PATENT DOCUMENTS

| | | |
|---|---|---|
| 2016/0357352 A1 | 12/2016 | Matas et al. |
| 2016/0357366 A1 | 12/2016 | Migos et al. |
| 2016/0370982 A1 | 12/2016 | Penha et al. |
| 2017/0010846 A1 | 1/2017 | Bernstein et al. |
| 2017/0010847 A1 | 1/2017 | Bernstein et al. |
| 2017/0013295 A1 | 1/2017 | Wertheimer et al. |
| 2017/0046339 A1 | 2/2017 | Bhat et al. |
| 2017/0068402 A1 | 3/2017 | Lochhead et al. |
| 2017/0068511 A1 | 3/2017 | Brown et al. |
| 2017/0094360 A1 | 3/2017 | Keighran et al. |
| 2017/0097969 A1 | 4/2017 | Stein et al. |
| 2017/0115867 A1 | 4/2017 | Bargmann |
| 2017/0124594 A1 | 5/2017 | Naiga et al. |
| 2017/0132659 A1 | 5/2017 | Dirks et al. |
| 2017/0132829 A1 | 5/2017 | Blas et al. |
| 2017/0134778 A1 | 5/2017 | Christie et al. |
| 2017/0188116 A1 | 6/2017 | Major et al. |
| 2017/0192642 A1 | 7/2017 | Fishman et al. |
| 2017/0195736 A1 | 7/2017 | Chai et al. |
| 2017/0201850 A1 | 7/2017 | Raleigh et al. |
| 2017/0214975 A1 | 7/2017 | Schmidt et al. |
| 2017/0242913 A1 | 8/2017 | Tijssen et al. |
| 2017/0245017 A1 | 8/2017 | Chaudhri et al. |
| 2017/0251257 A1 | 8/2017 | Obrien |
| 2017/0300151 A1 | 10/2017 | Lue-sang et al. |
| 2017/0339443 A1 | 11/2017 | Lue-sang et al. |
| 2017/0344553 A1* | 11/2017 | Evnine .................. G06Q 50/01 |
| 2017/0353603 A1 | 12/2017 | Grunewald et al. |
| 2017/0357387 A1 | 12/2017 | Clarke |
| 2017/0359722 A1 | 12/2017 | Folse et al. |
| 2017/0364246 A1 | 12/2017 | Van Os et al. |
| 2018/0011580 A1 | 1/2018 | Lebowitz et al. |
| 2018/0041814 A1 | 2/2018 | Christie et al. |
| 2018/0063591 A1 | 3/2018 | Newman et al. |
| 2018/0070121 A1 | 3/2018 | Zimmerman et al. |
| 2018/0070138 A1 | 3/2018 | Chai et al. |
| 2018/0107353 A1 | 4/2018 | Lee |
| 2018/0113579 A1* | 4/2018 | Johnston ............ H04N 21/4826 |
| 2018/0130097 A1 | 5/2018 | Tran et al. |
| 2018/0136800 A1 | 5/2018 | Johnston et al. |
| 2018/0146377 A1 | 5/2018 | Folse et al. |
| 2018/0189076 A1 | 7/2018 | Liston et al. |
| 2018/0253900 A1 | 9/2018 | Finding et al. |
| 2018/0275855 A1 | 9/2018 | Van Os et al. |
| 2018/0293771 A1 | 10/2018 | Piemonte et al. |
| 2018/0295403 A1 | 10/2018 | Christie et al. |
| 2018/0302680 A1 | 10/2018 | Cormican |
| 2018/0343497 A1 | 11/2018 | Brown et al. |
| 2018/0367834 A1 | 12/2018 | Carpenter et al. |
| 2019/0012048 A1 | 1/2019 | Johnston et al. |
| 2019/0020925 A1 | 1/2019 | Christie et al. |
| 2019/0028769 A1 | 1/2019 | Jeon et al. |
| 2019/0045271 A1 | 2/2019 | Christie et al. |
| 2019/0058921 A1 | 2/2019 | Christie et al. |
| 2019/0129588 A1 | 5/2019 | Johnston et al. |
| 2019/0138163 A1 | 5/2019 | Howland et al. |
| 2019/0141399 A1 | 5/2019 | Auxer et al. |
| 2019/0258373 A1 | 8/2019 | Davydov et al. |
| 2019/0272853 A1 | 9/2019 | Moore |
| 2019/0342616 A1* | 11/2019 | Domm ............... H04N 21/4668 |
| 2019/0354264 A1 | 11/2019 | Van Os et al. |
| 2019/0373320 A1 | 12/2019 | Balsamo |
| 2020/0068274 A1 | 2/2020 | Aher et al. |
| 2020/0084488 A1 | 3/2020 | Christie et al. |
| 2020/0099985 A1 | 3/2020 | Keighran et al. |
| 2020/0133631 A1 | 4/2020 | Christie et al. |
| 2020/0137175 A1 | 4/2020 | Ganci et al. |
| 2020/0257415 A1 | 8/2020 | Clarke |
| 2020/0272666 A1 | 8/2020 | Van Os et al. |
| 2020/0301567 A1 | 9/2020 | Park et al. |
| 2020/0301575 A1 | 9/2020 | Lindholm et al. |
| 2020/0304863 A1 | 9/2020 | Domm et al. |
| 2020/0304876 A1 | 9/2020 | Cielak et al. |
| 2020/0304879 A1 | 9/2020 | Ellingford |
| 2020/0304880 A1 | 9/2020 | Diaz Delgado et al. |
| 2020/0363934 A1 | 11/2020 | Van Os et al. |
| 2020/0380029 A1 | 12/2020 | Chen |
| 2020/0382845 A1 | 12/2020 | Payne |
| 2020/0396507 A1 | 12/2020 | Balsamo |
| 2021/0021903 A1 | 1/2021 | Christie et al. |
| 2021/0168424 A1 | 6/2021 | Sharma |
| 2021/0181901 A1 | 6/2021 | Johnston et al. |
| 2021/0306711 A1 | 9/2021 | Ellingford et al. |
| 2021/0337280 A1 | 10/2021 | Diaz Delgado et al. |
| 2021/0345004 A1 | 11/2021 | Christie et al. |
| 2021/0365134 A1 | 11/2021 | Beaumier et al. |
| 2021/0397306 A1 | 12/2021 | Rajam et al. |
| 2022/0244824 A1 | 8/2022 | Cielak |
| 2022/0321940 A1 | 10/2022 | Christie et al. |
| 2022/0329891 A1 | 10/2022 | Christie et al. |
| 2022/0337914 A1 | 10/2022 | Christie et al. |
| 2022/0360858 A1 | 11/2022 | Christie et al. |
| 2022/0413796 A1 | 12/2022 | Christie et al. |
| 2023/0022781 A1 | 1/2023 | Lindholm et al. |
| 2023/0033604 A1 | 2/2023 | Diaz et al. |

FOREIGN PATENT DOCUMENTS

| | | |
|---|---|---|
| AU | 2017101431 A4 | 11/2017 |
| AU | 2018100810 A4 | 7/2018 |
| CN | 1295419 A | 5/2001 |
| CN | 101436110 A | 5/2009 |
| CN | 101465993 A | 6/2009 |
| CN | 101719125 A | 6/2010 |
| CN | 101860447 A | 10/2010 |
| CN | 102098537 A | 6/2011 |
| CN | 102265586 A | 11/2011 |
| CN | 102325144 A | 1/2012 |
| CN | 102819715 A | 12/2012 |
| CN | 102890615 A | 1/2013 |
| CN | 103037265 A | 4/2013 |
| CN | 103177738 A | 6/2013 |
| CN | 103399967 A | 11/2013 |
| CN | 103516933 A | 1/2014 |
| CN | 103546816 A | 1/2014 |
| CN | 103562848 A | 2/2014 |
| CN | 103620531 A | 3/2014 |
| CN | 103620541 A | 3/2014 |
| CN | 103686418 A | 3/2014 |
| CN | 103985045 A | 8/2014 |
| CN | 104508618 A | 4/2015 |
| CN | 104822098 A | 8/2015 |
| CN | 105264479 A | 1/2016 |
| CN | 105303372 A | 2/2016 |
| CN | 105308634 A | 2/2016 |
| CN | 105308923 A | 2/2016 |
| CN | 105657554 A | 6/2016 |
| CN | 105812849 A | 7/2016 |
| CN | 105828098 A | 8/2016 |
| CN | 105955520 A | 9/2016 |
| CN | 105955607 A | 9/2016 |
| CN | 105989085 A | 10/2016 |
| CN | 105992068 A | 10/2016 |
| CN | 106101982 A | 11/2016 |
| DE | 202016003233 U1 | 8/2016 |
| EP | 0608708 A2 | 8/1994 |
| EP | 0624853 A2 | 11/1994 |
| EP | 2386984 A2 | 11/2011 |
| EP | 2453667 A1 | 5/2012 |
| EP | 2535844 A2 | 12/2012 |
| EP | 2574089 A1 | 3/2013 |
| EP | 2605203 A1 | 6/2013 |
| EP | 2642402 A2 | 9/2013 |
| EP | 2672703 A1 | 12/2013 |
| EP | 2704032 A2 | 3/2014 |
| EP | 2725531 A1 | 4/2014 |
| EP | 2879398 A1 | 6/2015 |
| JP | 2000-112977 A | 4/2000 |
| JP | 2000-163031 A | 6/2000 |
| JP | 2001-197445 A | 7/2001 |
| JP | 2002-27381 A | 1/2002 |
| JP | 2002-342033 A | 11/2002 |
| JP | 2003-99452 A | 4/2003 |
| JP | 2003-534737 A | 11/2003 |

(56) References Cited

FOREIGN PATENT DOCUMENTS

| | | |
|---|---|---|
| JP | 2004-62237 A | 2/2004 |
| JP | 2006-31219 A | 2/2006 |
| JP | 2007-512640 A | 5/2007 |
| JP | 2007-140910 A | 6/2007 |
| JP | 2007-294068 A | 11/2007 |
| JP | 2008-71112 A | 3/2008 |
| JP | 2008-135911 A | 6/2008 |
| JP | 2009-60328 A | 3/2009 |
| JP | 2009-260947 A | 11/2009 |
| JP | 2010-28437 A | 2/2010 |
| JP | 2010-56595 A | 3/2010 |
| JP | 2010-509684 A | 3/2010 |
| JP | 2010-114733 A | 5/2010 |
| JP | 2011-512701 A | 4/2011 |
| JP | 2011-154455 A | 8/2011 |
| JP | 2011-205562 A | 10/2011 |
| JP | 2011-257930 A | 12/2011 |
| JP | 2012-95123 A | 5/2012 |
| JP | 2012-123685 A | 6/2012 |
| JP | 2012-208622 A | 10/2012 |
| JP | 2013-8369 A | 1/2013 |
| JP | 2013-223150 A | 10/2013 |
| JP | 2014-81740 A | 5/2014 |
| JP | 2014-102660 A | 6/2014 |
| JP | 2015-50655 A | 3/2015 |
| KR | 2001-0005939 A | 1/2001 |
| KR | 2001-0035356 A | 5/2001 |
| KR | 10-2009-0106104 A | 10/2009 |
| KR | 10-2010-0039194 A | 4/2010 |
| KR | 10-2011-0036408 A | 4/2011 |
| KR | 10-2011-0061811 A | 6/2011 |
| KR | 10-2012-0076682 A | 7/2012 |
| KR | 10-2012-0124445 A | 11/2012 |
| KR | 10-2013-0058034 A | 6/2013 |
| KR | 10-2013-0137969 A | 12/2013 |
| KR | 10-2014-0041939 A | 4/2014 |
| KR | 10-2019-0033658 A | 3/2019 |
| KR | 10-2022-0041231 A | 3/2022 |
| TW | 200622893 A | 7/2006 |
| TW | 200719204 A | 5/2007 |
| TW | 201337717 A | 9/2013 |
| TW | 201349049 A | 12/2013 |
| TW | 201351261 A | 12/2013 |
| WO | 1994/009438 A2 | 4/1994 |
| WO | 1999/040728 A1 | 8/1999 |
| WO | 2004/063862 A2 | 7/2004 |
| WO | 2005/050652 A1 | 6/2005 |
| WO | 2007/078623 A2 | 7/2007 |
| WO | 2008/005135 A1 | 1/2008 |
| WO | 2008/060486 A2 | 5/2008 |
| WO | 2009/016607 A2 | 2/2009 |
| WO | 2009/039786 A1 | 4/2009 |
| WO | 2009/148781 A1 | 12/2009 |
| WO | 2010/022570 A1 | 3/2010 |
| WO | 2010/025168 A1 | 3/2010 |
| WO | 2010/118690 A1 | 10/2010 |
| WO | 2011/095693 A1 | 8/2011 |
| WO | 2012/012446 A2 | 1/2012 |
| WO | 2012/061760 A2 | 5/2012 |
| WO | 2012/088665 A1 | 7/2012 |
| WO | 2013/000741 A1 | 1/2013 |
| WO | 2013/149128 A2 | 10/2013 |
| WO | 2013/169849 A2 | 11/2013 |
| WO | 2013/169877 A2 | 11/2013 |
| WO | 2013/149128 A3 | 2/2014 |
| WO | 2014/105276 A1 | 7/2014 |
| WO | 2014/144908 A1 | 9/2014 |
| WO | 2014/177929 A2 | 11/2014 |
| WO | 2014/200730 A1 | 12/2014 |
| WO | 2015/200227 A1 | 12/2015 |
| WO | 2015/200228 A1 | 12/2015 |
| WO | 2015/200537 A2 | 12/2015 |
| WO | 2016/048308 A1 | 3/2016 |
| WO | 2016/048310 A1 | 3/2016 |
| WO | 2016/111065 A1 | 7/2016 |
| WO | 2017/008079 A1 | 1/2017 |
| WO | 2017/124116 A1 | 7/2017 |
| WO | 2017/200923 A1 | 11/2017 |
| WO | 2017/218104 A1 | 12/2017 |
| WO | 2018/081157 A1 | 5/2018 |

OTHER PUBLICATIONS

Applicant Initiated Interview Summary received for U.S. Appl. No. 15/167,801, dated Apr. 23, 2018, 3 pages.
Applicant Initiated Interview Summary received for U.S. Appl. No. 15/167,801, dated Jul. 29, 2019, 3 pages.
Applicant Initiated Interview Summary received for U.S. Appl. No. 17/210,352, dated Feb. 28, 2022, 4 pages.
Corrected Notice of Allowability received for U.S. Appl. No. 16/108,519, dated Dec. 22, 2021, 3 pages.
Corrected Notice of Allowance received for U.S. Appl. No. 14/242,575, dated Dec. 15, 2016, 7 pages.
Corrected Notice of Allowance received for U.S. Appl. No. 14/242,575, dated Nov. 16, 2016, 7 pages.
Corrected Notice of Allowance received for U.S. Appl. No. 14/255,664, dated Aug. 29, 2017, 4 pages.
Corrected Notice of Allowance received for U.S. Appl. No. 14/267,671, dated Nov. 29, 2018, 3 pages.
Corrected Notice of Allowance received for U.S. Appl. No. 14/749,288, dated Sep. 21, 2017, 5 pages.
Corrected Notice of Allowance received for U.S. Appl. No. 15/276,633, dated Sep. 10, 2019, 7 pages.
Corrected Notice of Allowance received for U.S. Appl. No. 15/695,880, dated Jun. 11, 2018, 6 pages.
Corrected Notice of Allowance received for U.S. Appl. No. 15/714,904, dated Sep. 7, 2018, 5 pages.
Corrected Notice of Allowance received for U.S. Appl. No. 15/876,715, dated Apr. 11, 2022, 4 Pages.
Corrected Notice of Allowance received for U.S. Appl. No. 15/876,715, dated Apr. 19, 2022, 4 Pages.
Corrected Notice of Allowance received for U.S. Appl. No. 15/876,715, dated Oct. 20, 2021, 2 pages.
Corrected Notice of Allowance received for U.S. Appl. No. 16/010,280, dated Aug. 6, 2019, 2 pages.
Corrected Notice of Allowance received for U.S. Appl. No. 16/036,810, dated Nov. 19, 2018, 6 pages.
Corrected Notice of Allowance received for U.S. Appl. No. 16/142,635, dated Mar. 10, 2022, 2 Pages.
Corrected Notice of Allowance received for U.S. Appl. No. 16/233,990, dated Mar. 8, 2022, 4 pages.
Corrected Notice of Allowance received for U.S. Appl. No. 16/827,931, dated Dec. 6, 2021, 4 pages.
Corrected Notice of Allowance received for U.S. Appl. No. 16/872,274, dated Aug. 12, 2022, 5 pages.
Corrected Notice of Allowance received for U.S. Appl. No. 17/000,112, dated Jun. 17, 2022, 2 pages.
Corrected Notice of Allowance received for U.S. Appl. No. 17/065,387, dated Mar. 30, 2022, 2 Pages.
Cover Flow—Wikipedia, Available online at: <https://en.wikipedia.org/w/index.php?t%20itle=Cover%20Flow&oldid=879285208>, Jan. 20, 2019, 3 pages.
Examiner Initiated Interview Summary received for U.S. Appl. No. 15/390,377, dated Oct. 30, 2017, 2 pages.
Examiner's Answer to Appeal Brief received for U.S. Appl. No. 15/876,715, mailed on Aug. 18, 2020, 16 pages.
Extended European Search Report received for European Patent Application No. 17813728.7, dated Feb. 11, 2019, 8 pages.
Extended European Search Report received for European Patent Application No. 20190698.9, dated Oct. 30, 2020, 6 pages.
Extended European Search Report received for European Patent Application No. 20199219.5, dated Apr. 22, 2021, 8 pages.
Extended European Search Report received for European Patent Application No. 22167405.4, dated Jul. 4, 2022, 11 Pages.
Final Office Action received for U.S. Appl. No. 14/255,664, dated Oct. 17, 2016, 16 pages.

(56) References Cited

OTHER PUBLICATIONS

Final Office Action received for U.S. Appl. No. 14/267,671, dated May 23, 2018, 17 pages.
Final Office Action received for U.S. Appl. No. 14/267,671, dated Oct. 26, 2016, 21 pages.
Final Office Action received for U.S. Appl. No. 14/271,179, dated Dec. 15, 2016, 10 pages.
Final Office Action received for U.S. Appl. No. 14/271,179, dated Jun. 20, 2019, 15 pages.
Final Office Action received for U.S. Appl. No. 14/271,179, dated Jun. 21, 2018, 14 pages.
Final Office Action received for U.S. Appl. No. 14/746,095, dated Jul. 16, 2018, 33 pages.
Final Office Action received for U.S. Appl. No. 14/746,662, dated Apr. 24, 2017, 8 pages.
Final Office Action received for U.S. Appl. No. 14/746,662, dated Jun. 27, 2017, 9 pages.
Final Office Action received for U.S. Appl. No. 15/167,801, dated Apr. 5, 2019, 18 pages.
Final Office Action received for U.S. Appl. No. 15/167,801, dated May 28, 2020, 17 pages.
Final Office Action received for U.S. Appl. No. 15/167,801, dated Nov. 29, 2017, 12 pages.
Final Office Action received for U.S. Appl. No. 15/235,000, dated Dec. 19, 2018, 33 pages.
Final Office Action received for U.S. Appl. No. 15/235,000, dated Mar. 13, 2018, 31 pages.
Final Office Action received for U.S. Appl. No. 15/272,393, dated Mar. 25, 2019, 54 pages.
Final Office Action received for U.S. Appl. No. 15/272,397, dated Mar. 7, 2017, 23 pages.
Final Office Action received for U.S. Appl. No. 15/276,633, dated Jul. 26, 2017, 15 pages.
Final Office Action received for U.S. Appl. No. 15/276,633, dated Oct. 29, 2018, 12 pages.
Final Office Action received for U.S. Appl. No. 15/390,377, dated Nov. 9, 2017, 18 pages.
Final Office Action received for U.S. Appl. No. 15/507,229, dated Jul. 15, 2020, 20 pages.
Final Office Action received for U.S. Appl. No. 15/507,229, dated Sep. 18, 2019, 15 pages.
Final Office Action received for U.S. Appl. No. 15/719,404, dated Aug. 8, 2019, 19 pages.
Final Office Action received for U.S. Appl. No. 15/719,404, dated Mar. 30, 2021, 19 pages.
Final Office Action received for U.S. Appl. No. 15/876,715, dated Nov. 5, 2018, 15 pages.
Final Office Action received for U.S. Appl. No. 16/108,519, dated Dec. 12, 2019, 10 pages.
Final Office Action received for U.S. Appl. No. 16/108,519, dated Nov. 25, 2020, 12 pages.
Final Office Action received for U.S. Appl. No. 16/126,962, dated Apr. 8, 2020, 20 pages.
Final Office Action received for U.S. Appl. No. 16/136,005, dated Mar. 9, 2020, 9 pages.
Final Office Action received for U.S. Appl. No. 16/142,635, dated Feb. 3, 2021, 23 pages.
Final Office Action received for U.S. Appl. No. 16/144,077, dated Jul. 12, 2019, 22 pages.
Final Office Action received for U.S. Appl. No. 16/175,565, dated May 27, 2022, 33 pages.
Final Office Action received for U.S. Appl. No. 16/175,565, dated Nov. 12, 2020, 40 pages.
Final Office Action received for U.S. Appl. No. 16/233,990, dated Jan. 11, 2021, 17 pages.
Final Office Action received for U.S. Appl. No. 16/584,790, dated Jun. 14, 2022, 37 pages.
Final Office Action received for U.S. Appl. No. 16/584,790, dated Jun. 15, 2021, 30 pages.
Final Office Action received for U.S. Appl. No. 16/584,790, dated May 27, 2020, 27 pages.
Final Office Action received for U.S. Appl. No. 16/682,443, dated Mar. 9, 2021, 9 pages.
Final Office Action received for U.S. Appl. No. 16/697,090, dated Feb. 23, 2022, 25 pages.
Final Office Action received for U.S. Appl. No. 16/697,090, dated Jan. 27, 2021, 18 pages.
Final Office Action received for U.S. Appl. No. 16/827,910, dated Feb. 28, 2022, 17 pages.
Final Office Action received for U.S. Appl. No. 16/827,918, dated Jul. 8, 2021, 31 pages.
Final Office Action received for U.S. Appl. No. 16/827,926, dated Mar. 17, 2021, 44 pages.
Final Office Action received for U.S. Appl. No. 16/865,172, dated Feb. 12, 2021, 29 pages.
Final Office Action received for U.S. Appl. No. 16/872,274, dated Dec. 23, 2021, 20 pages.
Final Office Action received for U.S. Appl. No. 16/888,453, dated Apr. 8, 2022, 39 pages.
Final Office Action received for U.S. Appl. No. 16/888,478, dated Nov. 15, 2021, 27 pages.
Final Office Action received for U.S. Appl. No. 17/133,550, dated Feb. 11, 2022, 18 pages.
Final Office Action received for U.S. Appl. No. 17/210,352, dated Jun. 3, 2022, 21 pages.
Final Office Action received for U.S. Appl. No. 17/353,527, dated May 11, 2022, 17 Pages.
International Search Report received for PCT Patent Application No. PCT/US2014/057272, dated May 28, 2015, 4 pages.
International Search Report received for PCT Patent Application No. PCT/US2014/057280, dated May 27, 2015, 4 pages.
International Search Report received for PCT Patent Application No. PCT/US2015/037027, dated Sep. 28, 2015, 3 pages.
International Search Report received for PCT Patent Application No. PCT/US2015/037030, dated Dec. 10, 2015, 7 pages.
International Search Report received for PCT Patent Application No. PCT/US2015/037520, dated Mar. 7, 2016, 6 pages.
International Search Report received for PCT Patent Application No. PCT/US2017/029448, dated Jul. 13, 2017, 3 pages.
International Search Report received for PCT Patent Application No. PCT/US2017/031764, dated Aug. 7, 2017, 2 pages.
International Search Report received for PCT Patent Application No. PCT/US2017/058132, dated Mar. 27, 2018, 6 pages.
International Search Report received for PCT Patent Application No. PCT/US2019/034921, dated Nov. 19, 2019, 5 pages.
International Search Report received for PCT Patent Application No. PCT/US2020/024452, dated Aug. 6, 2020, 6 pages.
International Search Report received for PCT Patent Application No. PCT/US2020/024485, dated Aug. 3, 2020, 6 pages.
International Search Report received for PCT Patent Application No. PCT/US2020/024486, dated Aug. 11, 2020, 6 pages.
International Search Report received for PCT Patent Application No. PCT/US2020/024492, dated Aug. 10, 2020, 6 pages.
International Search Report received for PCT Patent Application No. PCT/US2020/035423, dated Oct. 13, 2020, 4 pages.
Non-Final Office Action received for U.S. Appl. No. 14/208,099, dated Jun. 25, 2015, 12 pages.
Non-Final Office Action received for U.S. Appl. No. 14/242,575, dated Mar. 21, 2016, 12 pages.
Non-Final Office Action received for U.S. Appl. No. 14/255,664, dated Apr. 1, 2016, 15 pages.
Non-Final Office Action received for U.S. Appl. No. 14/262,435, dated Feb. 22, 2016, 22 pages.
Non-Final Office Action received for U.S. Appl. No. 14/267,671, dated Apr. 1, 2016, 16 pages.
Non-Final Office Action received for U.S. Appl. No. 14/267,671, dated Dec. 1, 2017, 18 pages.
Non-Final Office Action received for U.S. Appl. No. 14/267,671, dated May 26, 2017, 18 pages.
Non-Final Office Action received for U.S. Appl. No. 14/271,179, dated May 29, 2015, 25 pages.

(56) References Cited

OTHER PUBLICATIONS

Non-Final Office Action received for U.S. Appl. No. 14/271,179, dated Oct. 5, 2018, 15 pages.
Non-Final Office Action received for U.S. Appl. No. 14/271,179, dated Sep. 21, 2017, 12 pages.
Non-Final Office Action received for U.S. Appl. No. 14/746,095, dated Dec. 1, 2017, 34 pages.
Non-Final Office Action received for U.S. Appl. No. 14/746,095, dated Jul. 25, 2019, 33 pages.
Non-Final Office Action received for U.S. Appl. No. 14/746,620, dated Jan. 11, 2017, 16 pages.
Non-Final Office Action received for U.S. Appl. No. 14/746,662, dated Aug. 9, 2016, 8 pages.
Non-Final Office Action received for U.S. Appl. No. 14/749,288, dated Oct. 12, 2016, 11 pages.
Non-Final Office Action received for U.S. Appl. No. 15/167,801 dated Mar. 24, 2017, 12 Pages.
Non-Final Office Action received for U.S. Appl. No. 15/167,801, dated Aug. 30, 2018, 15 pages.
Non-Final Office Action received for U.S. Appl. No. 15/167,801, dated Dec. 11, 2020, 18 pages.
Non-Final Office Action received for U.S. Appl. No. 15/167,801, dated May 18, 2022, 17 Pages.
Non-Final Office Action received for U.S. Appl. No. 15/167,801, dated Sep. 3, 2021, 17 pages.
Non-Final Office Action received for U.S. Appl. No. 15/167,801, dated Sep. 26, 2019, 18 pages.
Non-Final Office Action received for U.S. Appl. No. 15/224,370, dated Oct. 3, 2017, 14 pages.
Non-Final Office Action received for U.S. Appl. No. 15/235,000, dated Jul. 14, 2017, 31 pages.
Non-Final Office Action received for U.S. Appl. No. 15/235,000, dated Jul. 25, 2018, 31 pages.
Non-Final Office Action received for U.S. Appl. No. 15/235,000, dated Jun. 26, 2019, 31 pages.
Non-Final Office Action received for U.S. Appl. No. 15/272,393, dated Oct. 2, 2018, 52 pages.
Non-Final Office Action received for U.S. Appl. No. 15/272,397, dated Nov. 22, 2016, 20 pages.
Non-Final Office Action received for U.S. Appl. No. 15/276,633, dated Feb. 23, 2018, 12 pages.
Non-Final Office Action received for U.S. Appl. No. 15/276,633, dated Mar. 5, 2019, 16 pages.
Non-Final Office Action received for U.S. Appl. No. 15/276,633, dated Nov. 17, 2016, 12 pages.
Non-Final Office Action received for U.S. Appl. No. 15/390,377, dated Apr. 5, 2017, 17 pages.
Non-Final Office Action received for U.S. Appl. No. 15/414,493, dated Oct. 6, 2017, 15 pages.
Non-Final Office Action received for U.S. Appl. No. 15/507,229, dated Feb. 27, 2020, 16 pages.
Non-Final Office Action received for U.S. Appl. No. 15/507,229, dated Jun. 3, 2019, 14 pages.
Non-Final Office Action received for U.S. Appl. No. 15/674,992, dated May 11, 2018, 8 pages.
Non-Final Office Action received for U.S. Appl. No. 15/719,404, dated Dec. 14, 2018, 14 pages.
Non-Final Office Action received for U.S. Appl. No. 15/719,404, dated Nov. 26, 2021, 19 pages.
Non-Final Office Action received for U.S. Appl. No. 15/719,404, dated Oct. 16, 2020, 18 pages.
Non-Final Office Action received for U.S. Appl. No. 15/798,092, dated Dec. 20, 2017, 20 pages.
Non-Final Office Action received for U.S. Appl. No. 15/876,715, dated Jun. 4, 2018, 12 pages.
Non-Final Office Action received for U.S. Appl. No. 15/876,715, dated Sep. 10, 2019, 13 pages.
Non-Final Office Action received for U.S. Appl. No. 15/990,327, dated Jul. 31, 2018, 8 pages.
Non-Final Office Action received for U.S. Appl. No. 16/010,280, dated Mar. 7, 2019, 5 pages.
Non-Final Office Action received for U.S. Appl. No. 16/108,519, dated Apr. 5, 2021, 13 pages.
Non-Final Office Action received for U.S. Appl. No. 16/108,519, dated Aug. 2, 2019, 10 pages.
Non-Final Office Action received for U.S. Appl. No. 16/108,519, dated May 8, 2020, 11 pages.
Non-Final Office Action received for U.S. Appl. No. 16/126,962, dated Aug. 25, 2020, 22 pages.
Non-Final Office Action received for U.S. Appl. No. 16/126,962, dated Sep. 3, 2019, 16 pages.
Non-Final Office Action received for U.S. Appl. No. 16/136,005, dated Sep. 9, 2020, 10 pages.
Non-Final Office Action received for U.S. Appl. No. 16/136,005, dated Sep. 18, 2019, 9 pages.
Non-Final Office Action received for U.S. Appl. No. 16/142,635, dated Jun. 8, 2020, 19 pages.
Non-Final Office Action received for U.S. Appl. No. 16/142,635, dated Jun. 11, 2021, 23 pages.
Non-Final Office Action received for U.S. Appl. No. 16/144,077, dated Feb. 19, 2019, 24 pages.
Non-Final Office Action received for U.S. Appl. No. 16/144,077, dated Nov. 27, 2019, 40 pages.
Non-Final Office Action received for U.S. Appl. No. 16/175,565, dated Sep. 20, 2021, 33 pages.
Non-Final Office Action received for U.S. Appl. No. 16/233,990, dated Jul. 9, 2021, 18 pages.
Non-Final Office Action received for U.S. Appl. No. 16/233,990, dated Jun. 18, 2020, 17 pages.
Non-Final Office Action received for U.S. Appl. No. 16/392,467, dated Sep. 27, 2019, 5 pages.
Non-Final Office Action received for U.S. Appl. No. 16/584,790, dated Dec. 23, 2020, 30 pages.
Non-Final Office Action received for U.S. Appl. No. 16/584,790, dated Dec. 26, 2019, 24 pages.
Non-Final Office Action received for U.S. Appl. No. 16/584,790, dated Feb. 1, 2022, 33 pages.
Non-Final Office Action received for U.S. Appl. No. 16/682,443, dated Sep. 23, 2020, 10 pages.
Non-Final Office Action received for U.S. Appl. No. 16/697,090, dated Aug. 3, 2021, 16 pages.
Non-Final Office Action received for U.S. Appl. No. 16/697,090, dated Jul. 6, 2020, 14 pages.
Non-Final Office Action received for U.S. Appl. No. 16/697,090, dated Jul. 7, 2022, 25 pages.
Non-Final Office Action received for U.S. Appl. No. 16/827,910, dated Jun. 17, 2021, 16 pages.
Non-Final Office Action received for U.S. Appl. No. 16/827,918, dated Dec. 10, 2020, 28 pages.
Non-Final Office Action received for U.S. Appl. No. 16/827,926, dated Apr. 25, 2022, 27 pages.
Non-Final Office Action received for U.S. Appl. No. 16/827,926, dated Oct. 29, 2020, 45 pages.
Non-Final Office Action received for U.S. Appl. No. 16/827,931, dated Mar. 3, 2021, 24 pages.
Non-Final Office Action received for U.S. Appl. No. 16/865,172 dated Jun. 29, 2021, 29 pages.
Non-Final Office Action received for U.S. Appl. No. 16/865,172, dated Aug. 20, 2020, 19 pages.
Non-Final Office Action received for U.S. Appl. No. 16/872,274, dated Jul. 9, 2021, 19 pages.
Non-Final Office Action received for U.S. Appl. No. 16/888,453, dated Jun. 4, 2021, 37 pages.
Non-Final Office Action received for U.S. Appl. No. 16/888,478, dated Feb. 8, 2021, 24 pages.
Non-Final Office Action received for U.S. Appl. No. 16/888,478, dated May 2, 2022, 29 pages.
Non-Final Office Action received for U.S. Appl. No. 16/945,724, dated Jul. 19, 2021, 8 pages.
Non-Final Office Action received for U.S. Appl. No. 17/000,112, dated Dec. 7, 2021, 15 pages.

(56) References Cited

OTHER PUBLICATIONS

Non-Final Office Action received for U.S. Appl. No. 17/065,387, dated Jan. 28, 2021, 28 pages.
Non-Final Office Action received for U.S. Appl. No. 17/065,387, dated Jun. 1, 2021, 25 pages.
Non-Final Office Action received for U.S. Appl. No. 17/133,550, dated Jun. 8, 2021, 23 pages.
Non-Final Office Action received for U.S. Appl. No. 17/210,352, dated Oct. 18, 2021, 18 pages.
Non-Final Office Action received for U.S. Appl. No. 17/353,527, dated Oct. 5, 2021, 14 pages.
Non-Final Office Action received for U.S. Appl. No. 17/379,785, dated Mar. 30, 2022, 18 Pages.
Non-Final Office Action received for U.S. Appl. No. 16/175,565, dated Mar. 4, 2020, 36 pages.
Notice of Allowance received for U.S. Appl. No. 14/208,099, dated Feb. 3, 2016, 10 pages.
Notice of Allowance received for U.S. Appl. No. 14/242,575, dated Oct. 27, 2016, 11 pages.
Notice of Allowance received for U.S. Appl. No. 14/255,664, dated May 5, 2017, 7 pages.
Notice of Allowance received for U.S. Appl. No. 14/262,435, dated Aug. 16, 2016, 6 pages.
Notice of Allowance received for U.S. Appl. No. 14/267,671, dated Sep. 19, 2018, 8 pages.
Notice of Allowance received for U.S. Appl. No. 14/746,095, dated Dec. 31, 2019, 8 pages.
Notice of Allowance received for U.S. Appl. No. 14/746,620, dated Sep. 25, 2017, 8 pages.
Notice of Allowance received for U.S. Appl. No. 14/746,662, dated Sep. 25, 2017, 7 pages.
Notice of Allowance received for U.S. Appl. No. 14/749,288, dated May 25, 2017, 8 pages.
Notice of Allowance received for U.S. Appl. No. 15/272,393, dated Jan. 15, 2020, 7 pages.
Notice of Allowance received for U.S. Appl. No. 15/272,393, dated Sep. 18, 2019, 10 pages.
Notice of Allowance received for U.S. Appl. No. 15/272,397, dated Oct. 18, 2017, 8 pages.
Notice of Allowance received for U.S. Appl. No. 15/276,633, dated Aug. 26, 2019, 8 pages.
Notice of Allowance received for U.S. Appl. No. 15/390,377, dated Jul. 2, 2018, 9 pages.
Notice of Allowance received for U.S. Appl. No. 15/414,493, dated Mar. 14, 2018, 7 pages.
Notice of Allowance received for U.S. Appl. No. 15/674,992, dated Oct. 1, 2018, 7 pages.
Notice of Allowance received for U.S. Appl. No. 15/695,880, dated Feb. 28, 2018, 10 pages.
Notice of Allowance received for U.S. Appl. No. 15/695,880, dated Oct. 18, 2017, 9 pages.
Notice of Allowance received for U.S. Appl. No. 15/714,904, dated May 22, 2018, 8 pages.
Notice of Allowance received for U.S. Appl. No. 15/719,404, dated Jul. 13, 2022, 8 Pages.
Notice of Allowance received for U.S. Appl. No. 15/798,092, dated Jun. 7, 2018, 9 pages.
Notice of Allowance received for U.S. Appl. No. 15/798,092, dated Oct. 9, 2018, 5 pages.
Notice of Allowance received for U.S. Appl. No. 15/833,618, dated Mar. 14, 2018, 9 pages.
Notice of Allowance received for U.S. Appl. No. 15/876,715, dated Apr. 4, 2022, 7 pages.
Notice of Allowance received for U.S. Appl. No. 15/876,715, dated Aug. 3, 2022, 7 Pages.
Notice of Allowance received for U.S. Appl. No. 15/876,715, dated Oct. 14, 2021, 7 pages.
Notice of Allowance received for U.S. Appl. No. 15/990,327, dated Jan. 11, 2019, 7 pages.
Notice of Allowance received for U.S. Appl. No. 16/010,280, dated Jul. 29, 2019, 7 pages.
Notice of Allowance received for U.S. Appl. No. 16/036,810, dated Oct. 31, 2018, 9 pages.
Notice of Allowance received for U.S. Appl. No. 16/108,519, dated Sep. 21, 2021, 8 pages.
Notice of Allowance received for U.S. Appl. No. 16/136,005, dated Feb. 24, 2021, 8 pages.
Notice of Allowance received for U.S. Appl. No. 16/136,005, dated Jun. 9, 2021, 7 pages.
Notice of Allowance received for U.S. Appl. No. 16/142,635, dated Nov. 10, 2021, 8 pages.
Notice of Allowance received for U.S. Appl. No. 16/144,077, dated May 8, 2020, 15 pages.
Notice of Allowance received for U.S. Appl. No. 16/233,990, dated Feb. 22, 2022, 8 pages.
Notice of Allowance received for U.S. Appl. No. 16/233,990, dated May 26, 2022, 5 pages.
Notice of Allowance received for U.S. Appl. No. 16/392,467, dated Mar. 23, 2020, 9 pages.
Notice of Allowance received for U.S. Appl. No. 16/682,443, dated Aug. 20, 2021, 7 pages.
Notice of Allowance received for U.S. Appl. No. 16/682,443, dated Nov. 17, 2021, 8 pages.
Notice of Allowance received for U.S. Appl. No. 16/726,179, dated Jun. 17, 2021, 9 pages.
Notice of Allowance received for U.S. Appl. No. 16/726,179, dated Sep. 30, 2021, 8 pages.
Notice of Allowance received for U.S. Appl. No. 16/827,918, dated Feb. 7, 2022, 9 pages.
Notice of Allowance received for U.S. Appl. No. 16/827,918, dated Jun. 8, 2022, 9 Pages.
Notice of Allowance received for U.S. Appl. No. 16/827,926, dated Nov. 1, 2021, 35 pages.
Notice of Allowance received for U.S. Appl. No. 16/827,931, dated Apr. 19, 2022, 7 Pages.
Notice of Allowance received for U.S. Appl. No. 16/827,931, dated Jan. 5, 2022, 7 pages.
Notice of Allowance received for U.S. Appl. No. 16/827,931, dated Sep. 15, 2021, 11 pages.
Notice of Allowance received for U.S. Appl. No. 16/827,942, dated Apr. 28, 2021, 5 pages.
Notice of Allowance received for U.S. Appl. No. 16/827,942, dated Jan. 22, 2021, 5 pages.
Notice of Allowance received for U.S. Appl. No. 16/827,942, dated Oct. 5, 2020, 10 pages.
Notice of Allowance received for U.S. Appl. No. 16/865,172, dated Apr. 13, 2022, 8 pages.
Notice of Allowance received for U.S. Appl. No. 16/865,172, dated Aug. 25, 2022, 8 Pages.
Notice of Allowance received for U.S. Appl. No. 16/865,172, dated Dec. 16, 2021, 10 pages.
Notice of Allowance received for U.S. Appl. No. 16/872,274, dated Apr. 19, 2022, 10 Pages.
Notice of Allowance received for U.S. Appl. No. 16/945,724, dated Apr. 4, 2022, 8 Pages.
Notice of Allowance received for U.S. Appl. No. 16/945,724, dated Dec. 20, 2021, 7 pages.
Notice of Allowance received for U.S. Appl. No. 16/945,724, dated Jul. 20, 2022, 8 Pages.
Notice of Allowance received for U.S. Appl. No. 17/000,112, dated Jun. 3, 2022, 14 pages.
Notice of Allowance received for U.S. Appl. No. 17/065,387, dated Dec. 1, 2021, 10 pages.
Patent Board Decision received for U.S. Appl. No. 15/876,715, mailed on Aug. 3, 2021, 8 pages.
Restriction Requirement received for U.S. Appl. No. 14/208,099, dated Feb. 24, 2015, 5 pages.
Search Report received for Chinese Patent Application No. 201580028382.1, dated Oct. 12, 2018, 5 pages (2 pages of English Translation & 3 pages of Official copy).

(56) References Cited

OTHER PUBLICATIONS

Search Report received for Chinese Patent Application No. 201680050096.X, dated Jan. 10, 2022, 4 pages (2 pages of English Translation and 2 pages of Official Copy).
Search Report received for Chinese Patent Application No. 201780033590.X, dated Mar. 24, 2021, 4 pages (2 page of English Translation and 2 pages of Official Copy).
Search Report received for Chinese Patent Application No. 201910469185.3, dated Feb. 23, 2021, 6 pages (3 page of English Translation and 3 page of Official Copy).
Search Report received for Chinese Patent Application No. 201910587972.8, dated Jan. 4, 2022, 4 pages (2 pages of English Translation and 2 pages of Official Copy).
Search Report received for Danish Patent Application No. PA 201670581, dated Apr. 4, 2017, 2 pages.
Search Report received for Danish Patent Application No. PA 201670581, dated Feb. 5, 2018, 1 page.
Search Report received for Danish Patent Application No. PA 201670581, dated Nov. 3, 2016, 1 page.
Search Report received for Danish Patent Application No. PA 201870354, dated Sep. 26, 2018, 4 pages.
Search Report received for Danish Patent Application No. PA201670582, dated Feb. 9, 2017, 1 pages.
Search Report received for Danish Patent Application No. PA201670582, dated Mar. 6, 2018, 2 pages.
Search Report received for Danish Patent Application No. PA201670582, dated Oct. 28, 2016, 4 pages.
Search Report received for Danish Patent Application No. PA201770200, Completed on Jul. 12, 2017, 4 pages.
Search Report received for Taiwanese Patent Application No. 104120369, dated Aug. 8, 2016, 2 Pages (1 page of official copy & 1 page of English translation).
Search Report received for Taiwanese Patent Application No. 104120385, dated Nov. 25, 2016, 2 Pages (1 page of official copy & 1 page of English translation).
Supplemental Notice of Allowability received for U.S. Appl. No. 16/827,942, dated Nov. 4, 2020, 3 pages.
Supplemental Notice of Allowance received for U.S. Appl. No. 15/798,092, dated Jan. 9, 2019, 2 pages.
Akhtar Iyaz, "Movies Anywhere: Everything You Need to Know", Available online at: <https://www.cnet.com/how-to/movies-anywhere-ultraviolet-movies-locker-streaming-redeem-faq/>, 2017, 8 pages.
Alvarez Edgar, "Sling TV Redesign Makes It Easy to Find Your Favorite Content", Engadget, Available online at: <https://www.engadget.com/2016/01/05/sling-tv-major-redesign/>, May 1, 2016, pp. 1-12.
Bishop Bryan, "Netflix Introduces One Unified TV Interface to Rule them All", The Verge, Available online at: <https://www.theverge.com/2013/11/13/5098224/netflix-introduces-one-unified-tv-interface-to-rule-them-all>, Nov. 13, 2013, 3 pages.
Bohn Dieter, "Rebooting WebOS: How LG Rethought the Smart TV", The Verge, Available online at: <http://www.theverge.com/2014/1/6/5279220/rebooting-webos-how-lg-rethought-the-smart-tv>, Jan. 6, 2014, 5 pages.
Cheredar Tom, "Verizon's Viewdini Lets You Watch Netflix, Comcast, & Hulu Videos from a Single App", Available online at: <venturebeat.com>, May 22, 2012, 6 pages.
episodecalendar.com, "Keep track of your favorite TV shows!—TV Episode Calendar", Available Online At: <https://web.archive.org/web/20140517060612/https://episodecalendar.com/>, May 17, 2014, 6 pages.
Fingas Roger, "Walmart's Vudu to get Native Apple TV", AppleInsider, 2017, pp. 1-4.
Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
International Standard—ISO, "Ergonomic Requirements for Office Work with Visual Display Terminals (VDTs)", Part 13: User Guidance, Zurich, CH, vol. 9241-13, XP001525163, Section 10, Jul. 15, 1998, 40 pages.
Kaijser Martijn, "Mimic Skin for Kodi 15.x: Installation and Showcase", Time 2:23-2:28, Available online at: <https://www.youtube.com/watch?v=RGfpbUWVkgQ&t=143s>, Aug. 3, 2015, 1 page.
Lee et al., "A Multi-Touch Three Dimensional Touch-Sensitive Tablet", CHI'85 Proceedings, Apr. 1985, pp. 21-25.
Li Xiaoshan, "CNTV, Hulu, BBC iPlayer Comparative Study on User Interface of Three Network TV Stations", Modern Communication (Journal of Communication University of China), Issue 11, Nov. 5, 2010, pp. 156-158. See attached Communication 37 CFR § 1.98(a) (3).
Ng Gary, "New Netflix User Interface Coming This Month, First Redesign in Four Years", iPhone in Canada, Available online at: <https://www.iphoneincanada.ca/news/new-netflix-user-interface/>, Jun. 1, 2015, 3 pages.
Panzarino Matthew, "Apple Announces Voice Activated Siri Assistant Feature for iOS 5, Integrates Wolfram Alpha and Wikipedia", Available online at: <www.thenextweb.com>, Oct. 4, 2011, pp. 1-6.
Pierce David, "Got Hulu and Netflix? You Need an App to Search It All", Wired, Available online at: <https://www.wired.com/2016/03/got-hulu-netflix-need-app-search/>, Mar. 10, 2016, pp. 1-4.
Rubine Dean, "Combining Gestures and Direct Manipulation", CHI'92, May 3-7, 1992, pp. 659-660.
Rubine Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Corrected Notice of Allowance received for U.S. Appl. No. 16/233,990, dated Oct. 20, 2022, 2 pages.
Corrected Notice of Allowance received for U.S. Appl. No. 16/945,724, dated Aug. 31, 2022, 2 pages.
Final Office Action received for U.S. Appl. No. 16/697,090, dated Dec. 14, 2022, 28 pages.
Final Office Action received for U.S. Appl. No. 17/379,785, dated Oct. 28, 2022, 14 pages.
Non-Final Office Action received for U.S. Appl. No. 16/827,910, dated Sep. 14, 2022, 18 pages.
Non-Final Office Action received for U.S. Appl. No. 17/133,550, dated Sep. 9, 2022, 23 pages.
Non-Final Office Action received for U.S. Appl. No. 17/353,527, dated Dec. 8, 2022, 17 pages.
Non-Final Office Action received for U.S. Appl. No. 17/586,625, dated Sep. 1, 2022, 13 pages.
Non-Final Office Action received for U.S. Appl. No. 17/656,610, dated Feb. 6, 2023, 10 pages.
Non-Final Office Action received for U.S. Appl. No. 17/660,622, dated Dec. 20, 2022, 17 pages.
Notice of Allowance received for U.S. Appl. No. 15/719,404, dated Nov. 9, 2022, 7 pages.
Notice of Allowance received for U.S. Appl. No. 16/233,990, dated Jan. 31, 2023, 5 pages.
Notice of Allowance received for U.S. Appl. No. 16/233,990, dated Oct. 5, 2022, 5 pages.
Notice of Allowance received for U.S. Appl. No. 16/584,790, dated Feb. 3, 2023, 9 pages.
Notice of Allowance received for U.S. Appl. No. 17/000,112, dated Oct. 18, 2022, 10 pages.
Notice of Allowance received for U.S. Appl. No. 17/210,352, dated Dec. 5, 2022, 9 pages.
Notice of Allowance received for U.S. Appl. No. 17/654,578, dated Oct. 25, 2022, 8 pages.
Search Report received for Chinese Patent Application No. 201780066823.6, dated Nov. 1, 2022, 4 pages (2 pages of English Translation and 2 pages of Official Copy).

(56) References Cited

OTHER PUBLICATIONS

Search Report received for Chinese Patent Application No. 201811143102.3, dated Nov. 22, 2022, 5 pages (2 pages of English Translation and 3 pages of Official Copy).
Search Report received for Chinese Patent Application No. 201911313497.1, dated Dec. 14, 2022, 3 pages (1 pages of English Translation and 2 pages of Official Copy).
Search Report received for Chinese Patent Application No. 202010011436.6, dated Dec. 15, 2022, 9 pages (4 pages of English Translation and 5 pages of Official Copy).
Apple, "The control is all yours", Available online at: <https://www.apple.com.cn/privacy/control/>, [Retrieved Dec. 29, 2022], Nov. 30, 2022, 12 pages. See attached Communication 37 CFR § 1.98(a)(3).
Drews et al., "Virtual Jukebox—Reviving a Classic", Proceedings of the 35th Hawaii International Conference on System Sciences, 2022, 7 pages.
Jin et al., "Pricing Sponsored Content in Wireless Networks with Multiple Content Providers", The Fourth IEEE Workshop on Smart Data Pricing 2015, 2015, pp. 668-673.
Kimbler, Kristofer, "App Store Strategies for Service Providers", 2010 4th International Conference on ntelligence in Next Generation Networks, Nov. 18, 2010, 5 pages.
Wang et al., "Authorization Management Mechanism of Web Application System", Network and Information Technology, vol. 25, No. 11, 2006, 3 pages. See attached Communication 37 CFR § 1.98(a)(3).
Meng et al., "Role Authorization Based Web Service Access Control Model", Journal of Lanzhou University (Natural Science Edition), vol. 42, No. 2, 2007, p. 84 88. See attached Communication 37 CFR § 1.98(a)(3).
Non-Final Office Action received for U.S. Appl. No. 15/167,801, dated Feb. 8, 2023, 23 pages.

\* cited by examiner

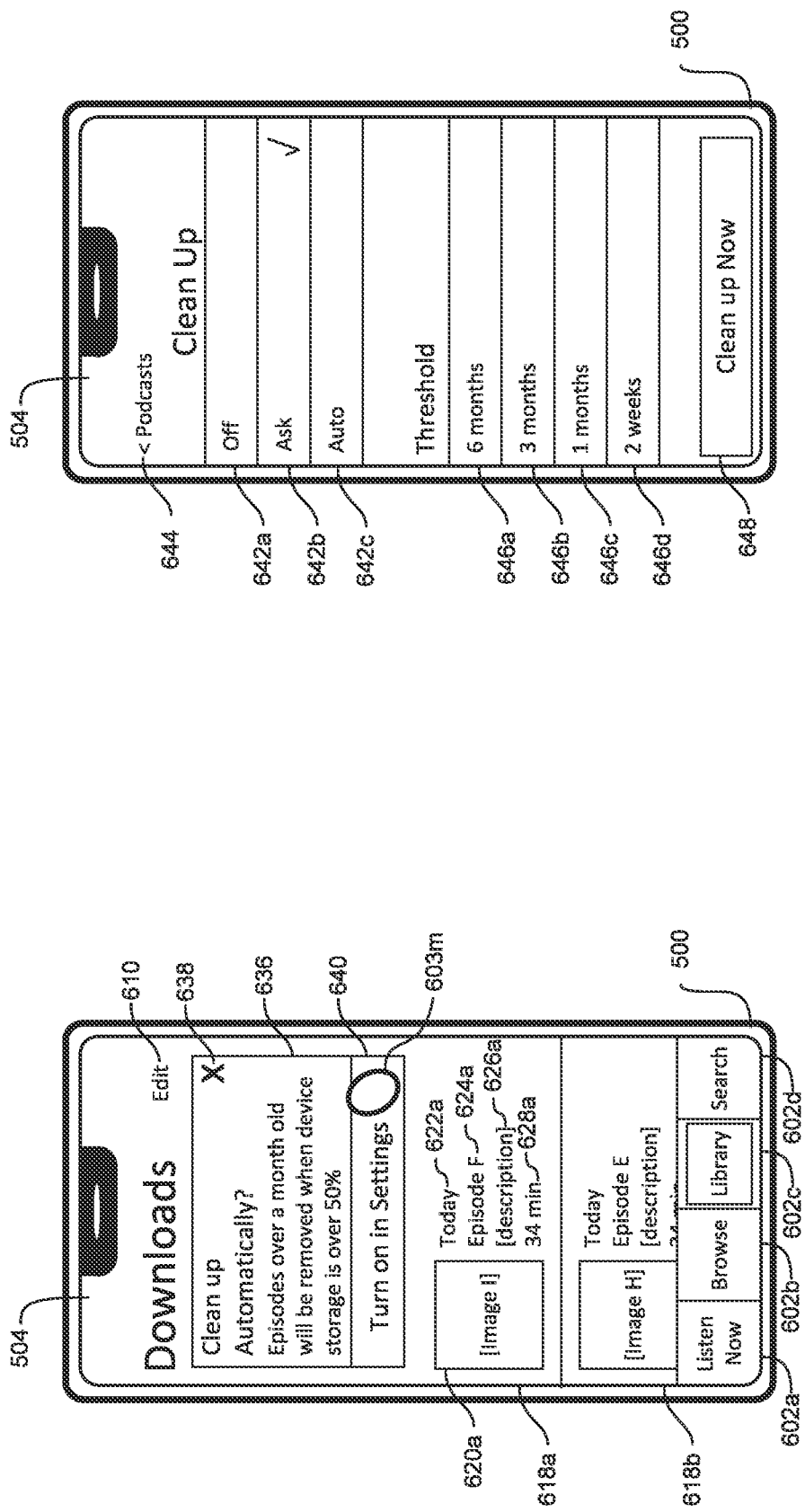

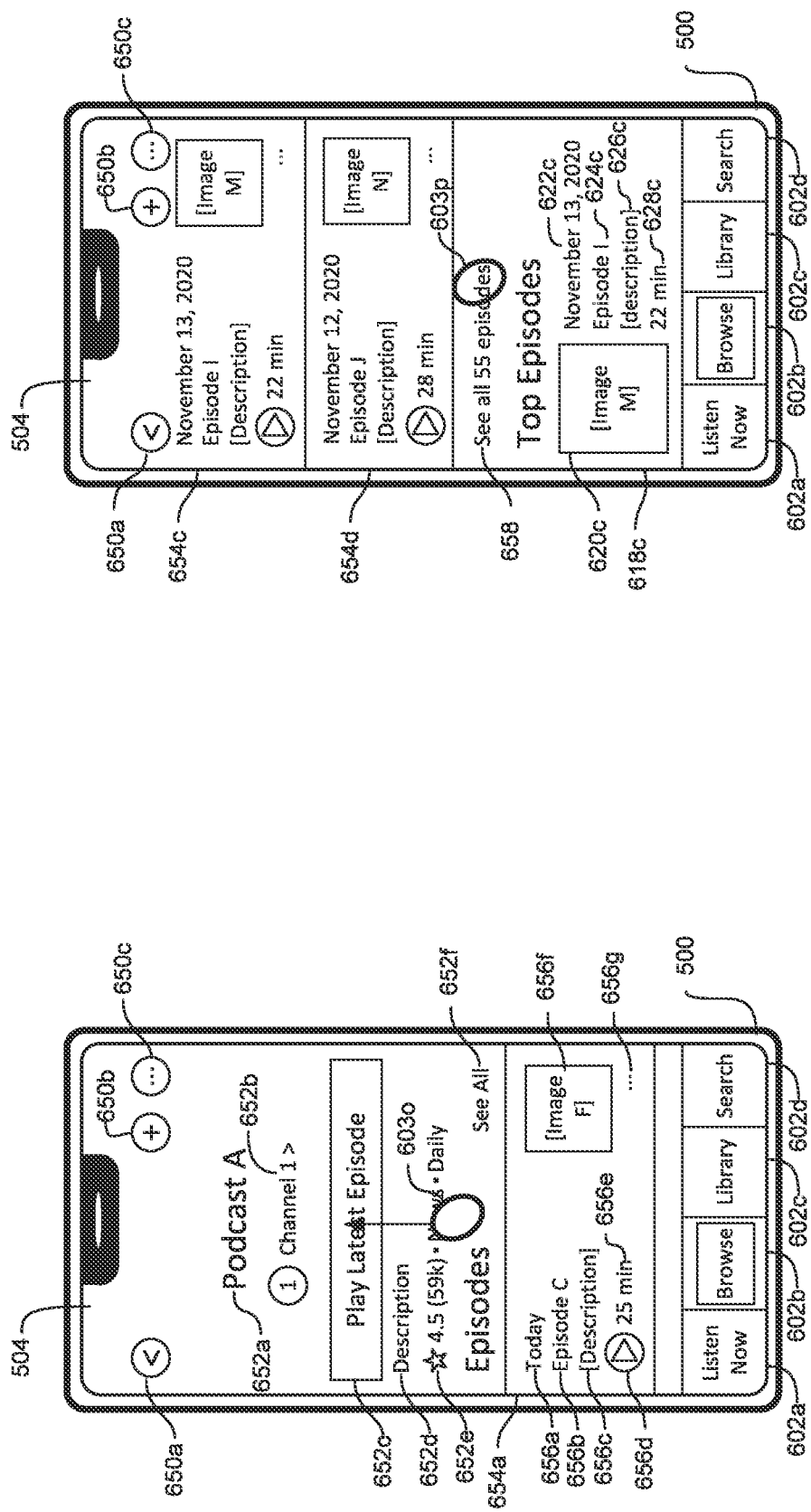

USER INTERFACES FOR BROWSING AND PRESENTING CONTENT

CROSS-REFERENCE TO RELATED APPLICATIONS

This application claims the benefit of U.S. Provisional Application No. 63/122,462, filed Dec. 7, 2020, the content of which is incorporated herein by reference in its entirety for all purposes.

FIELD OF THE DISCLOSURE

This specification relates generally to electronic devices that present content and representations of content, and user interactions with such devices.

BACKGROUND

User interaction with electronic devices has increased significantly in recent years. These devices can be devices such as computers, tablet computers, televisions, multimedia devices, mobile devices, and the like. In some circumstances, users wish to use electronic devices to browse and present content.

SUMMARY

Some embodiments described in this disclosure are directed to ways of presenting representations of items of content by an electronic device. Enhancing these interactions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Description of Embodiments

Figure 1A:
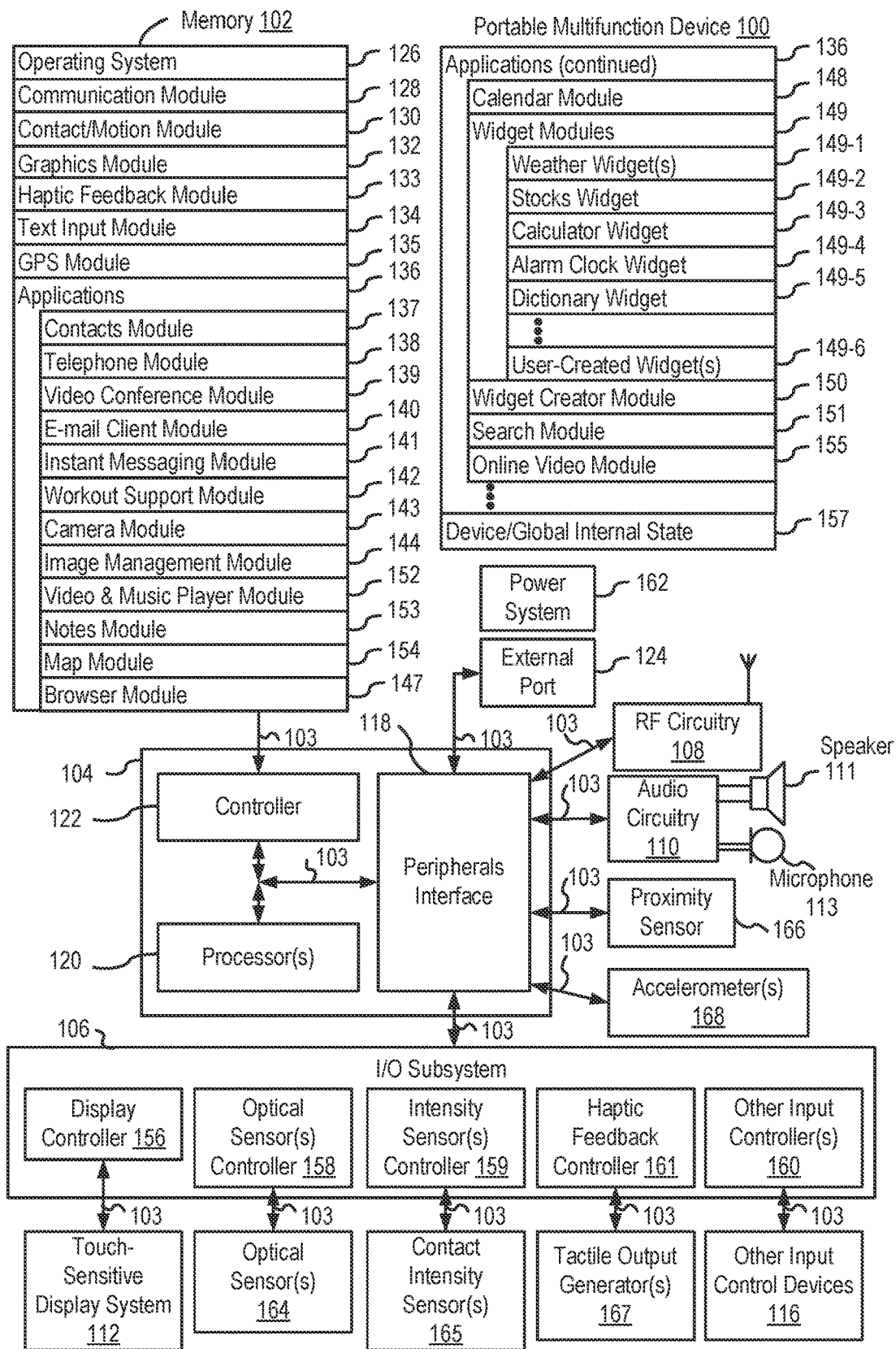
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

In some implementations, an example electronic device presents representations of content and content itself. In some implementations, an example electronic device provides efficient ways of presenting recommended content items that the user is entitled to access. In some embodiments, some content items are available to the user without a paid subscription and some items of content may require a paid subscription to access. The electronic device optionally presents representations of recommended content items to the user that include representations of content items to which the user is entitled to access (e.g., free content items and content items accessible via a paid subscription in which the user is enrolled) without including representations of content items to which the user is not entitled to access in the representations of recommended content items. In some embodiments, the electronic device can download one or more content items to device storage. The electronic device optionally presents an indication to remove one or more content items from device storage when one or more criteria are satisfied (e.g., device storage is a threshold percentage full, the one or more content items for deletion have been stored on the device or have been released for a threshold period of time) or optionally automatically deletes the one or more content items from device storage when the one or more criteria are satisfied. Such techniques can reduce the cognitive burden on a user who uses an example electronic device. Further, these techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
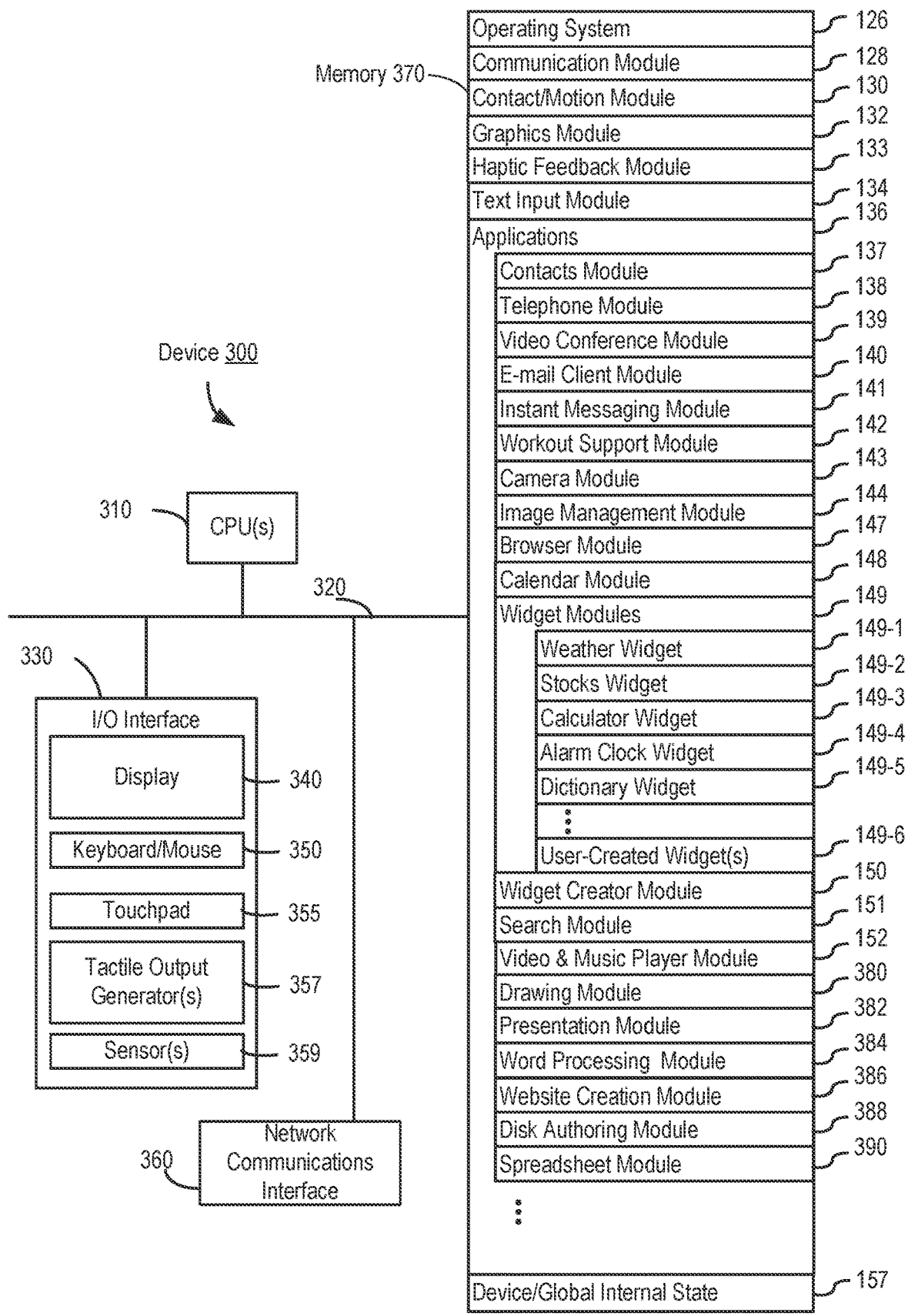
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
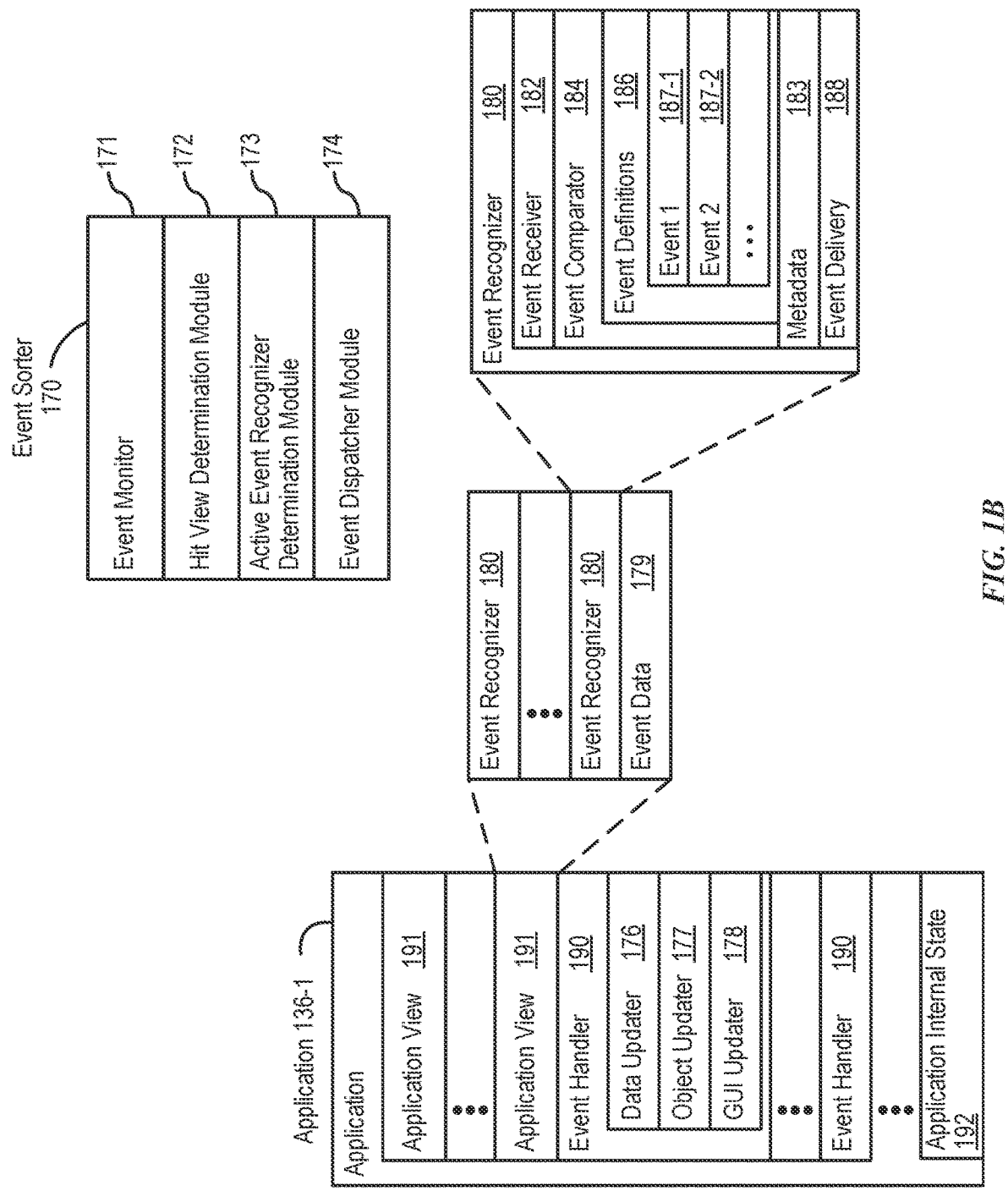
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
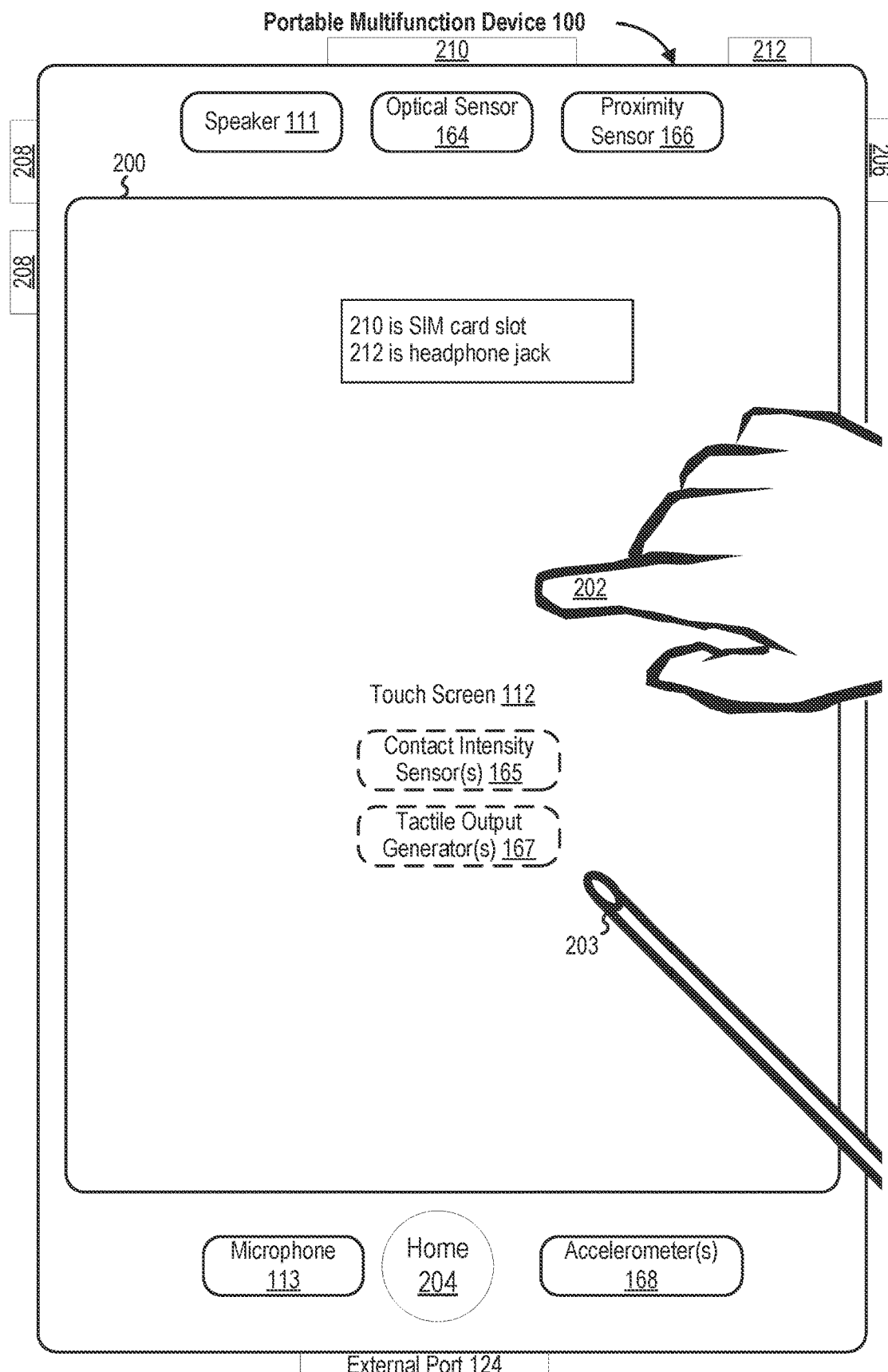
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
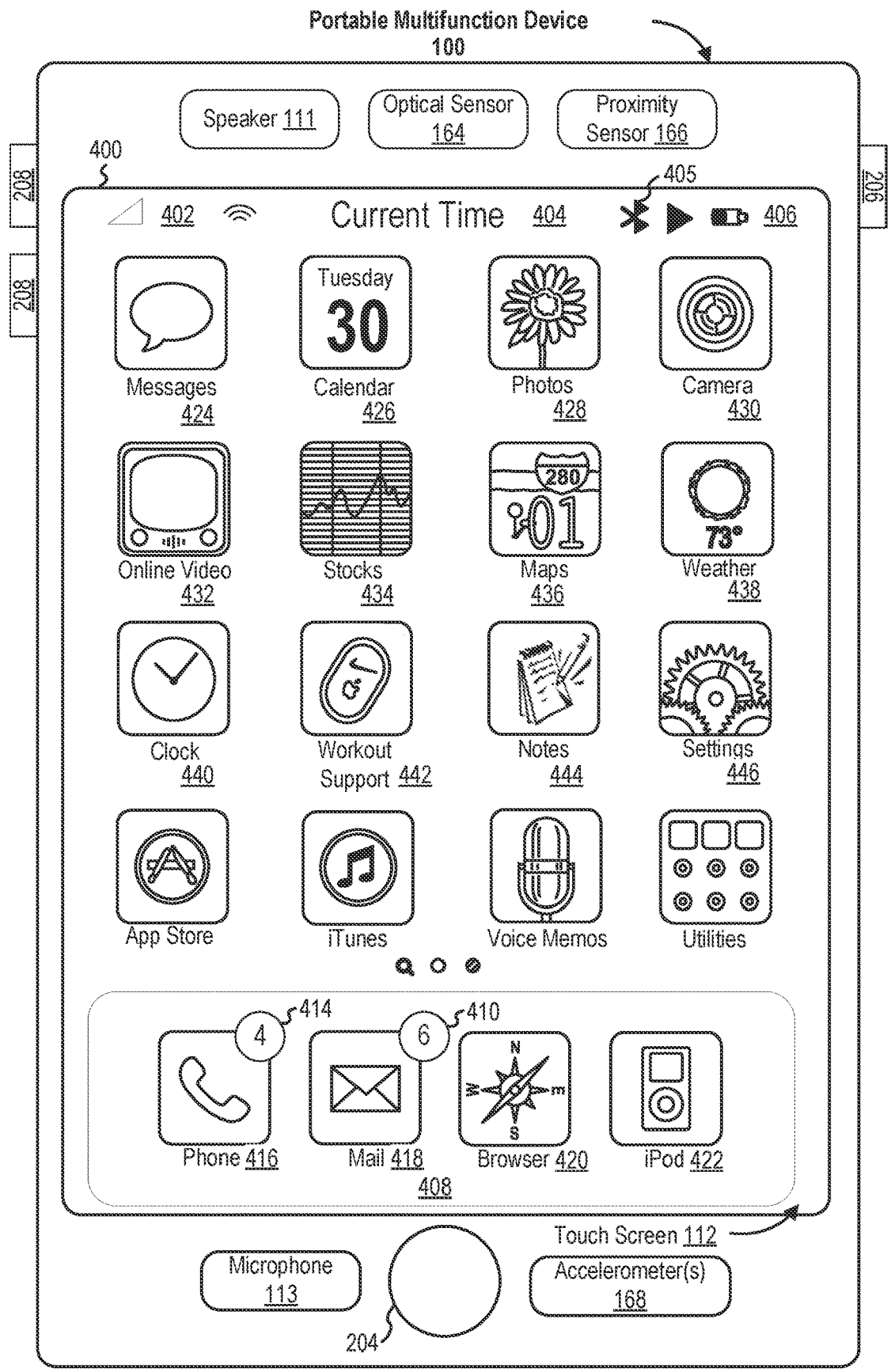
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
Icon 422 for video and music player module 152, also referred to as iPod (trademark of Apple Inc.) module 152, labeled "iPod;" and
Icons for other applications, such as:
Icon 424 for IM module 141, labeled "Messages;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
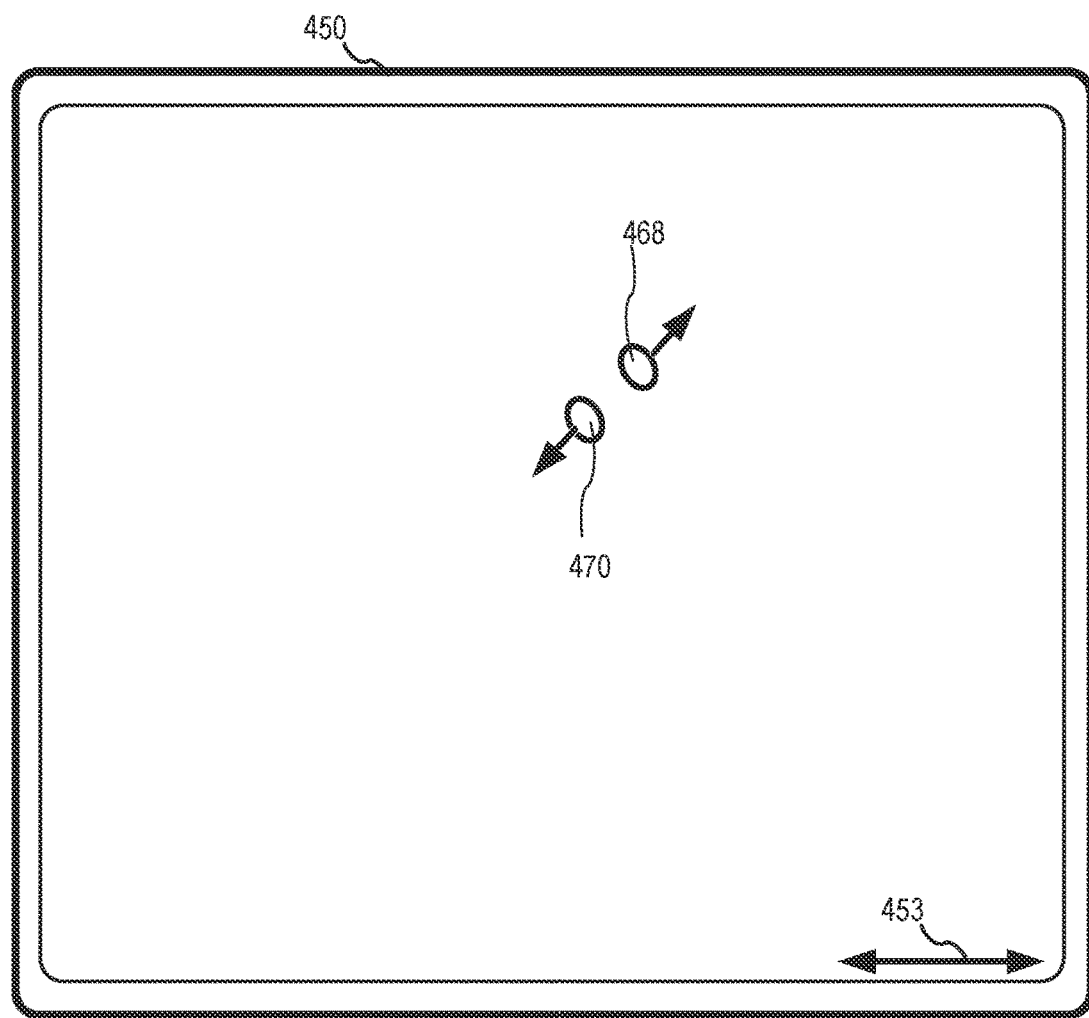
FIG. 4B illustrates an exemplary user interface for a multifunction device with a touch-sensitive surface that is separate from the display in accordance with some embodiments.
Figure 4B:
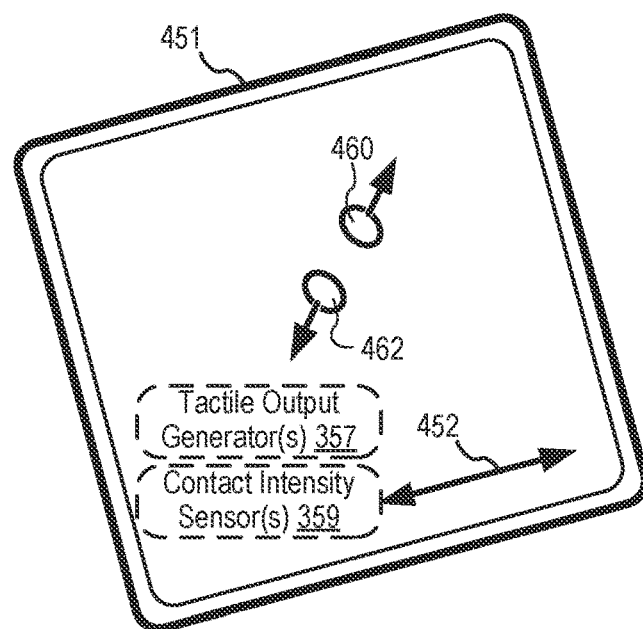

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
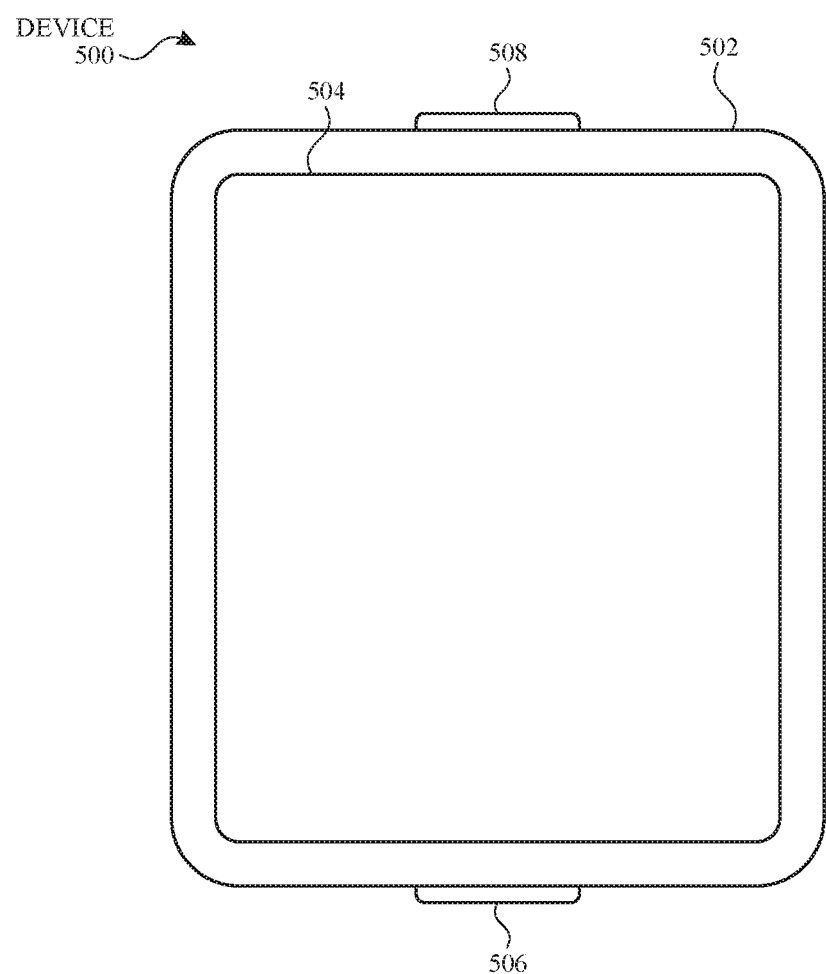
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
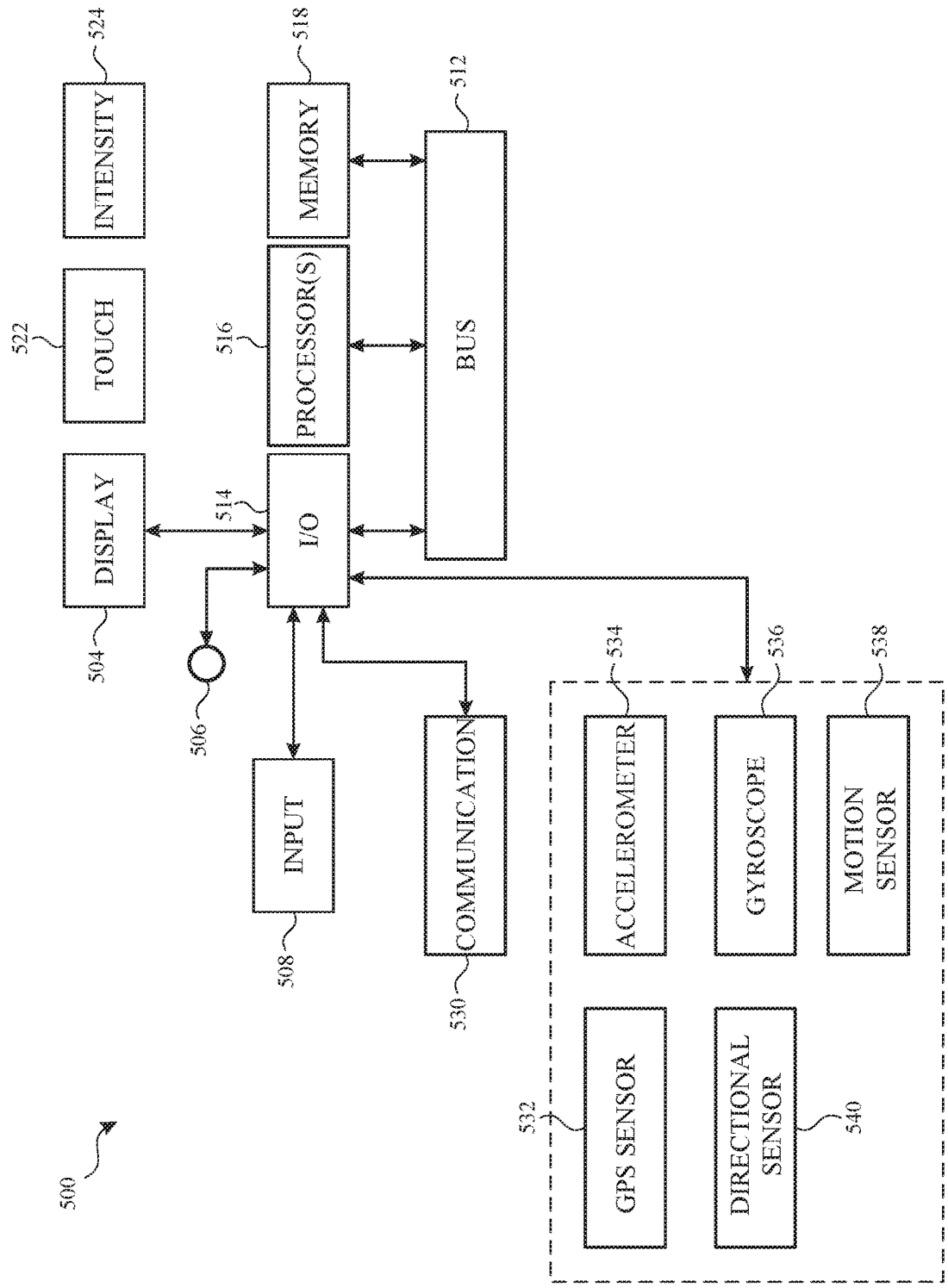
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Figure 7:
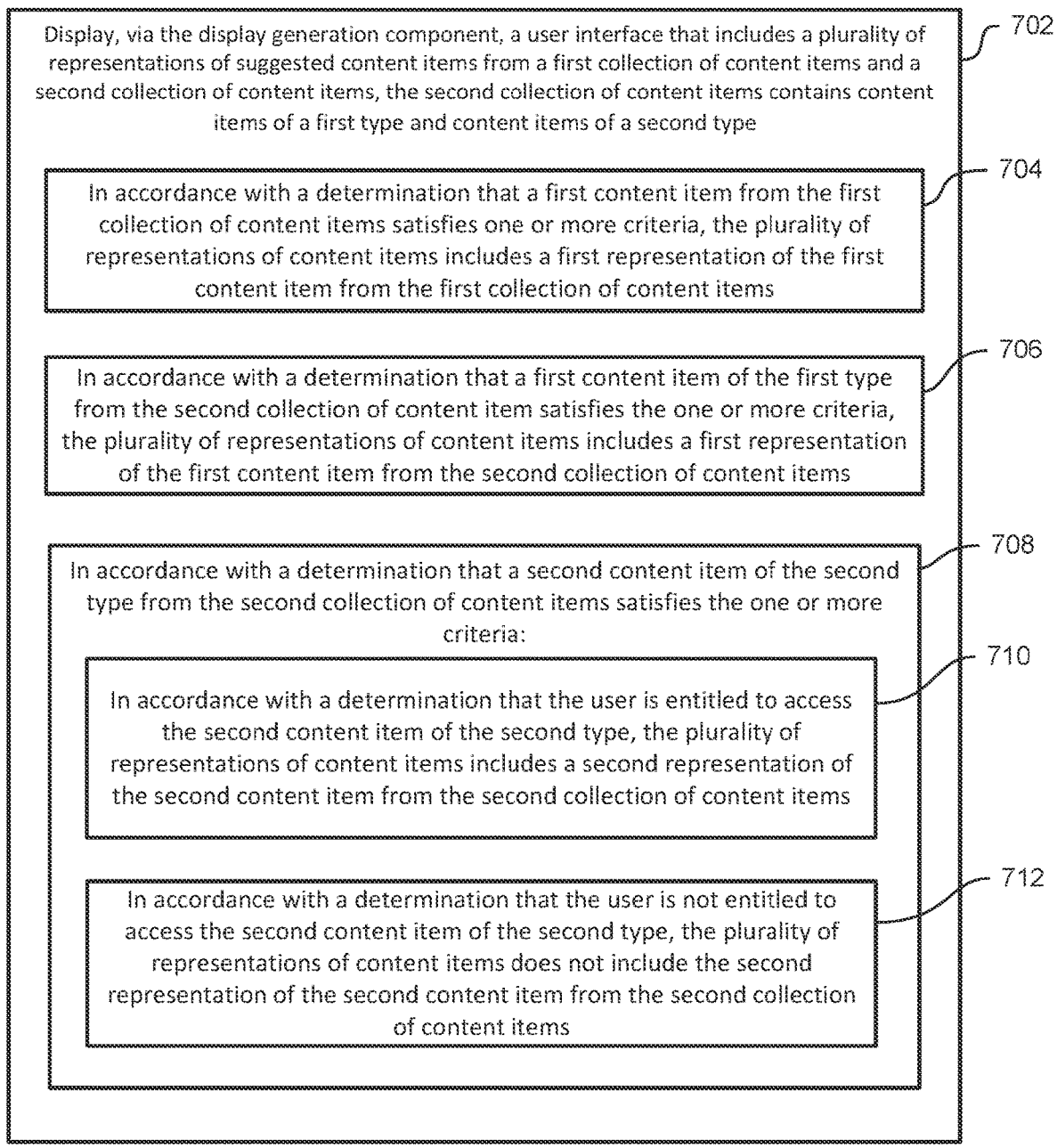
FIG. 7 is a flow diagram illustrating a method of presenting representations of content and providing access to content in accordance with some embodiments of the disclosure.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
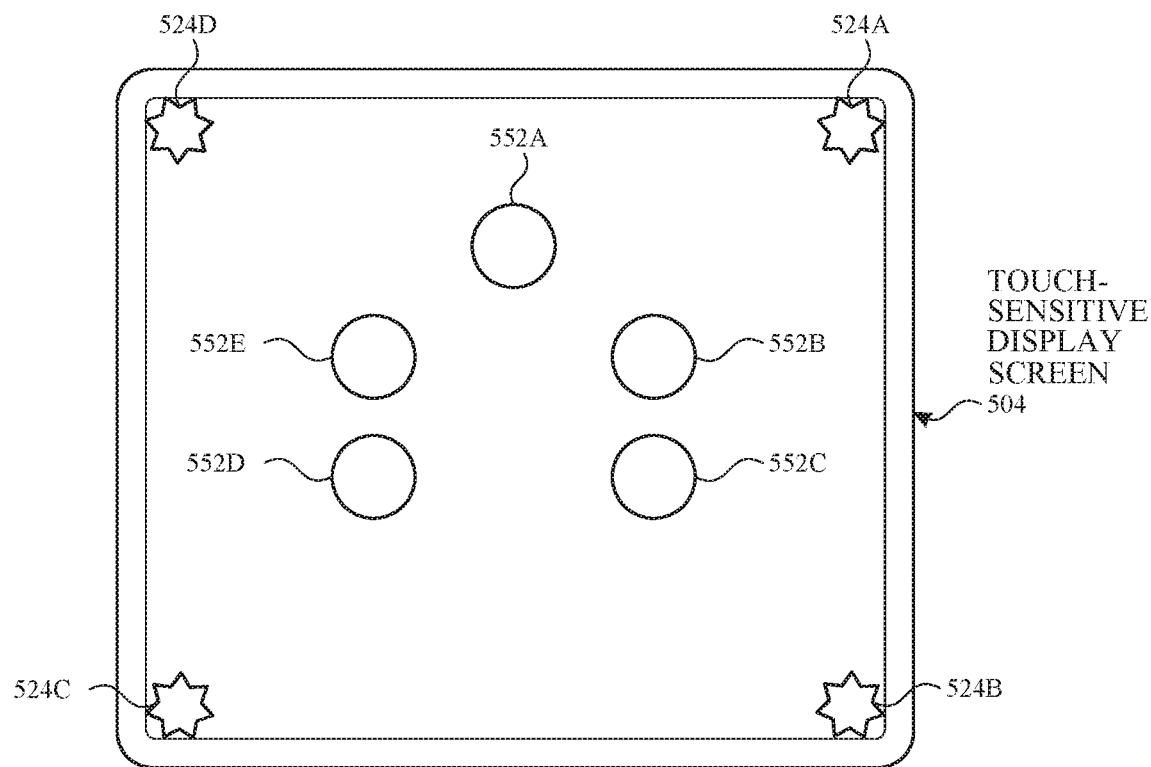
FIGS. 5C-5D illustrate exemplary components of a personal electronic device having a touch-sensitive display and intensity sensors in accordance with some embodiments.
Figure 5C:
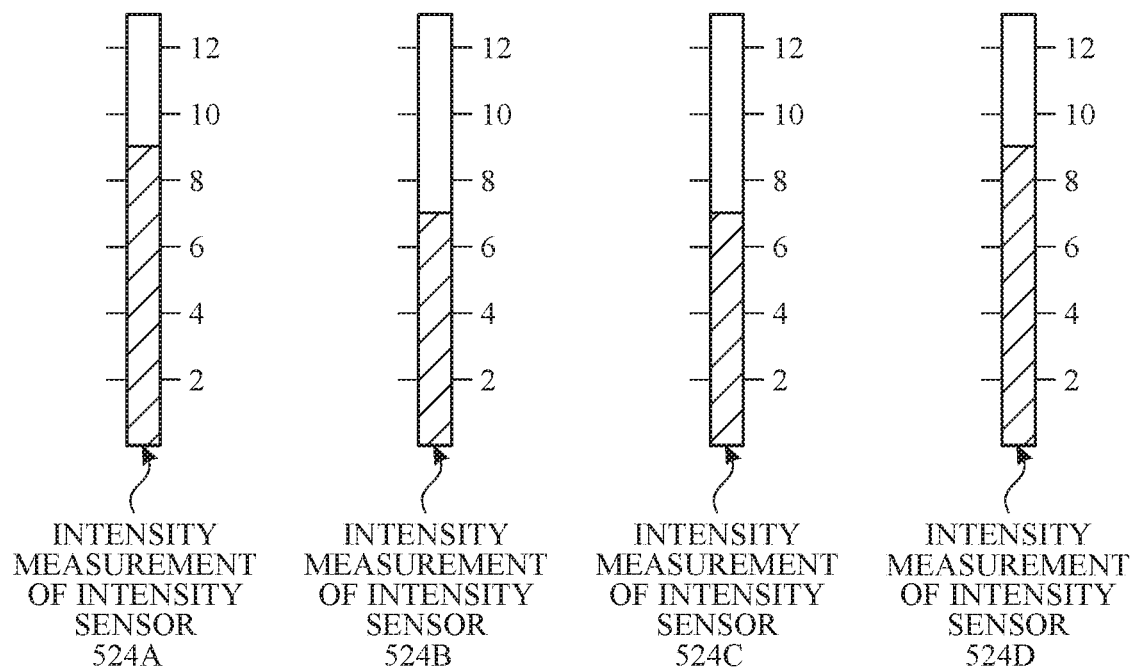
Figure 5D:
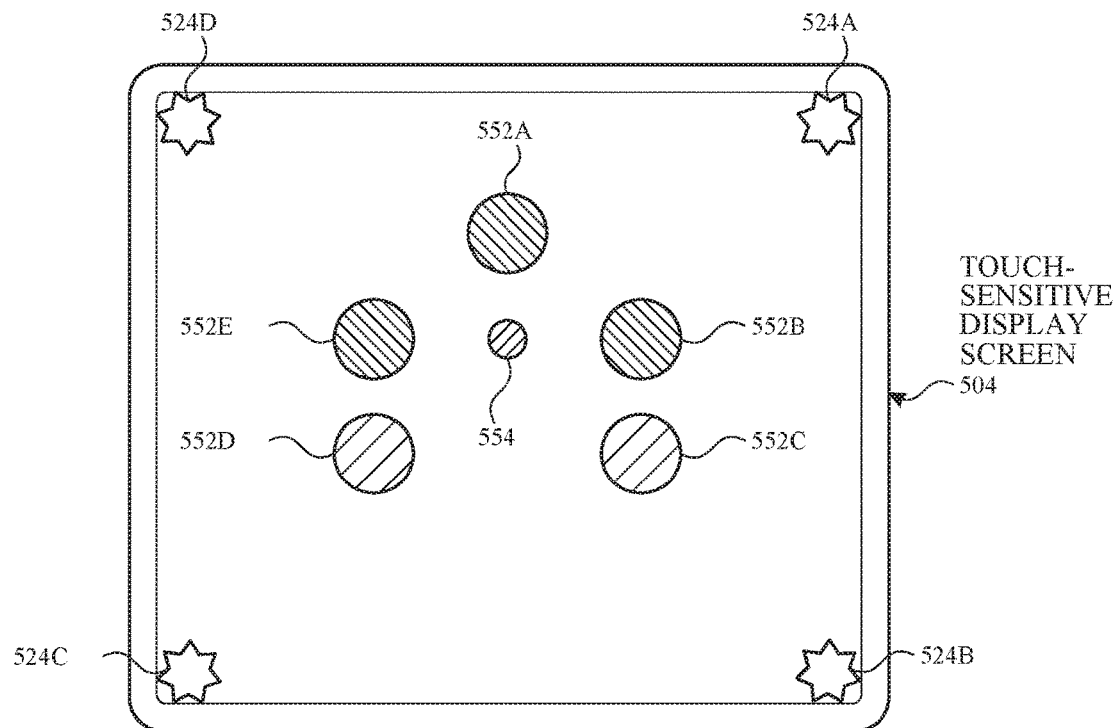
Figure 5D:
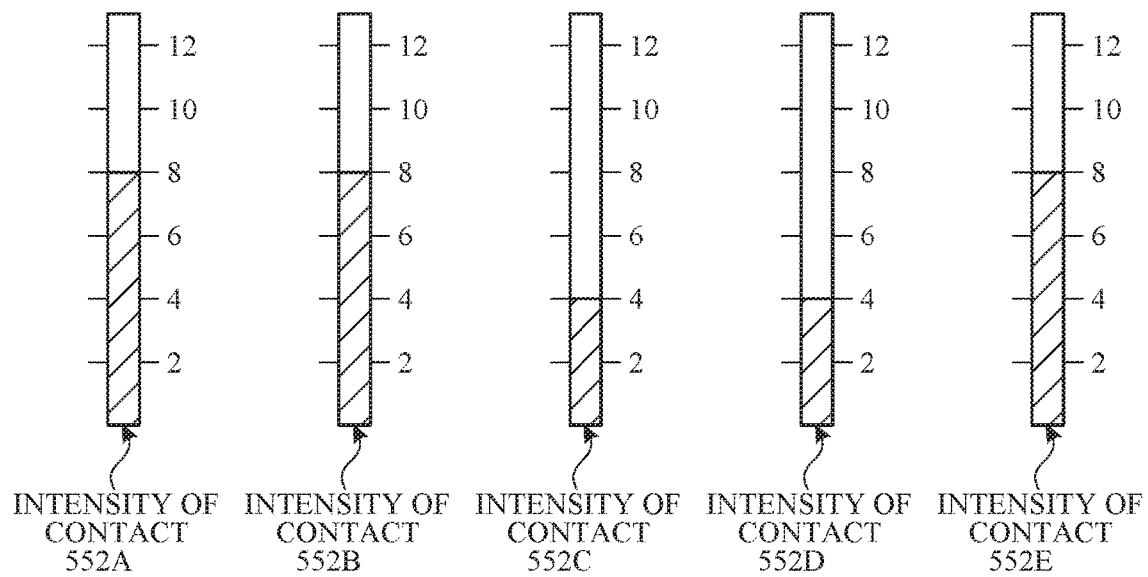

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
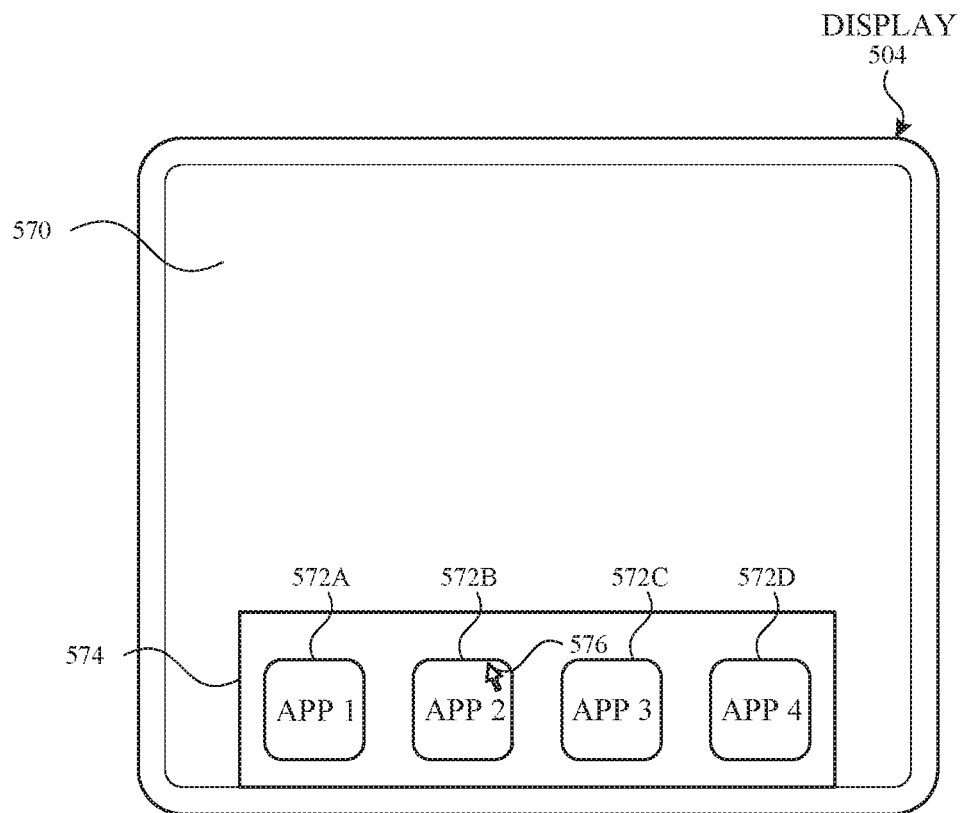
FIGS. 5E-5H illustrate exemplary components and user interfaces of a personal electronic device in accordance with some embodiments.
Figure 5E:
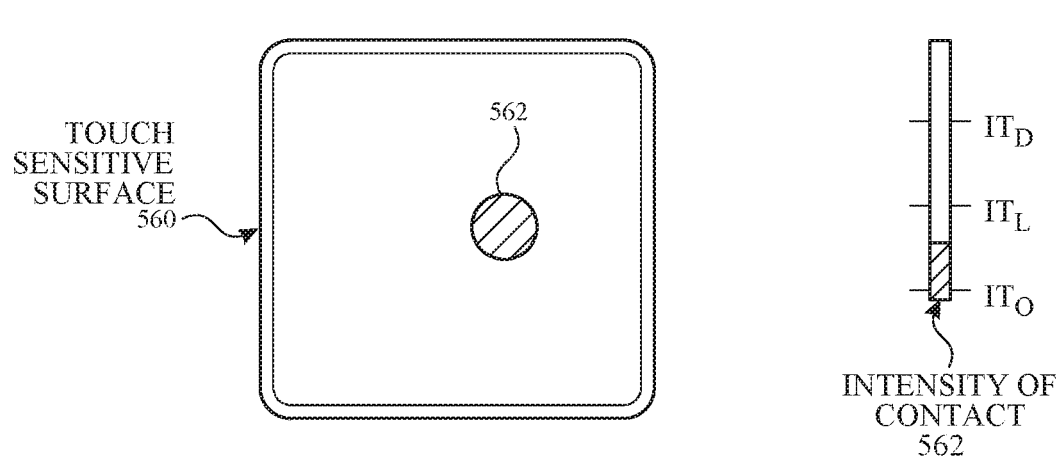
Figure 5F:
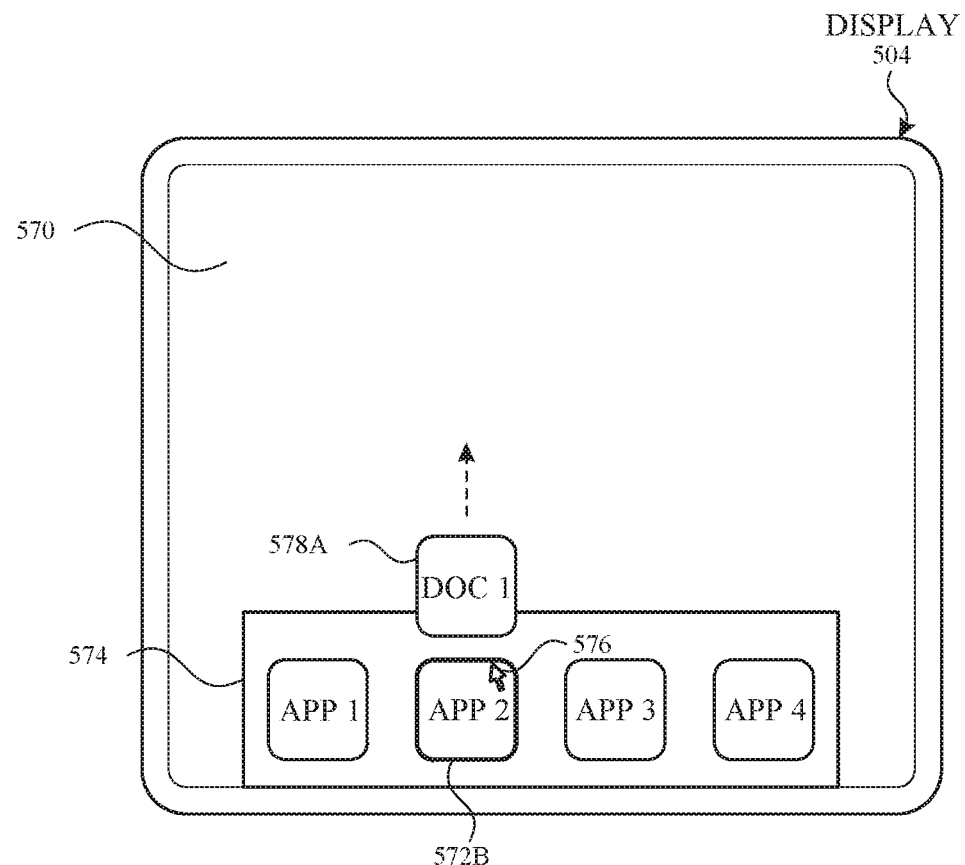
Figure 5F:
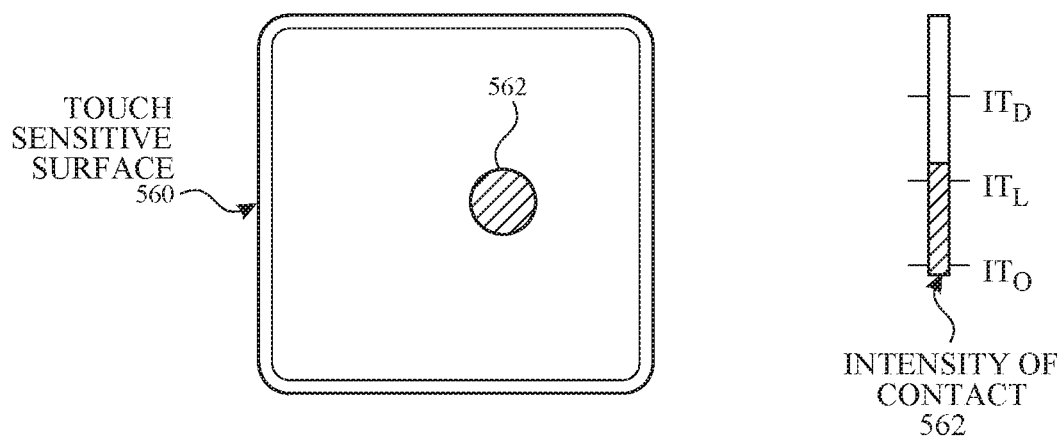
Figure 5G:
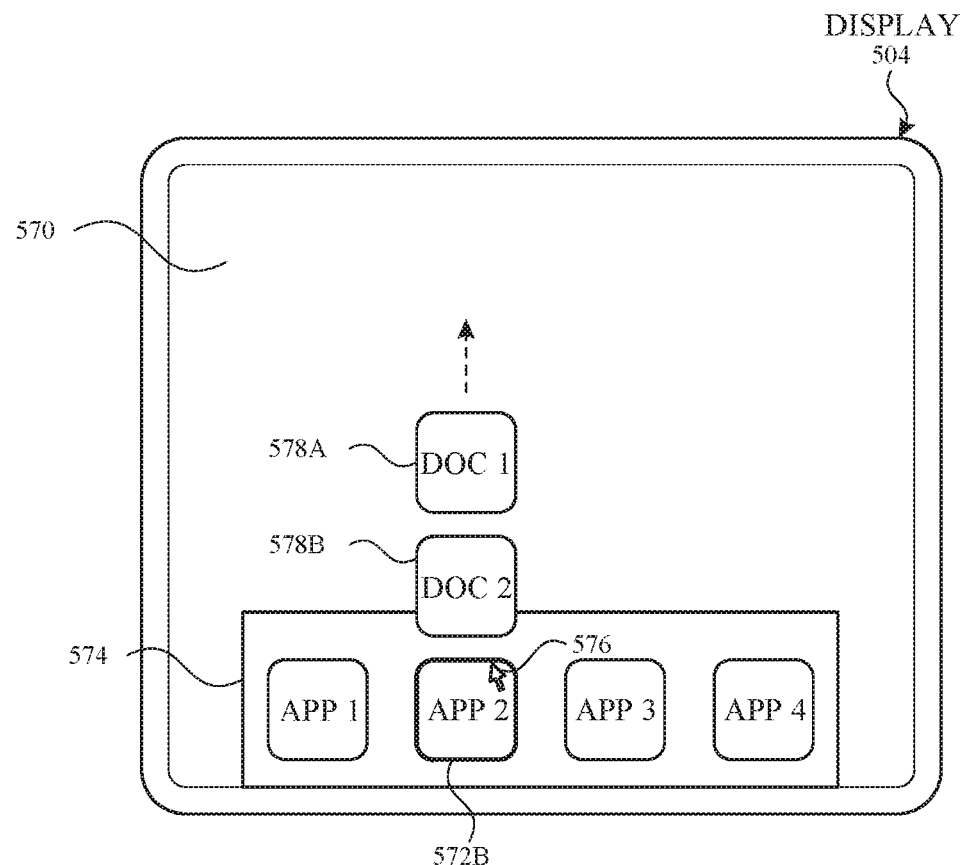
Figure 5G:
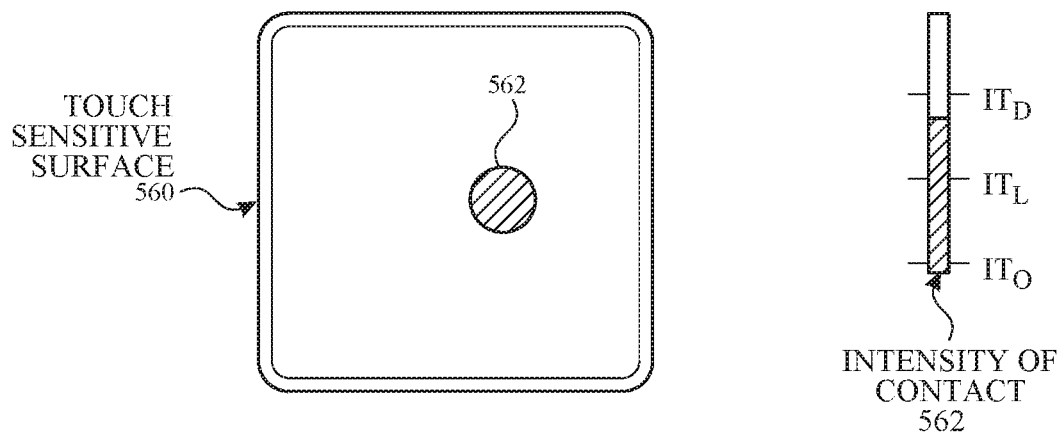
Figure 5H:
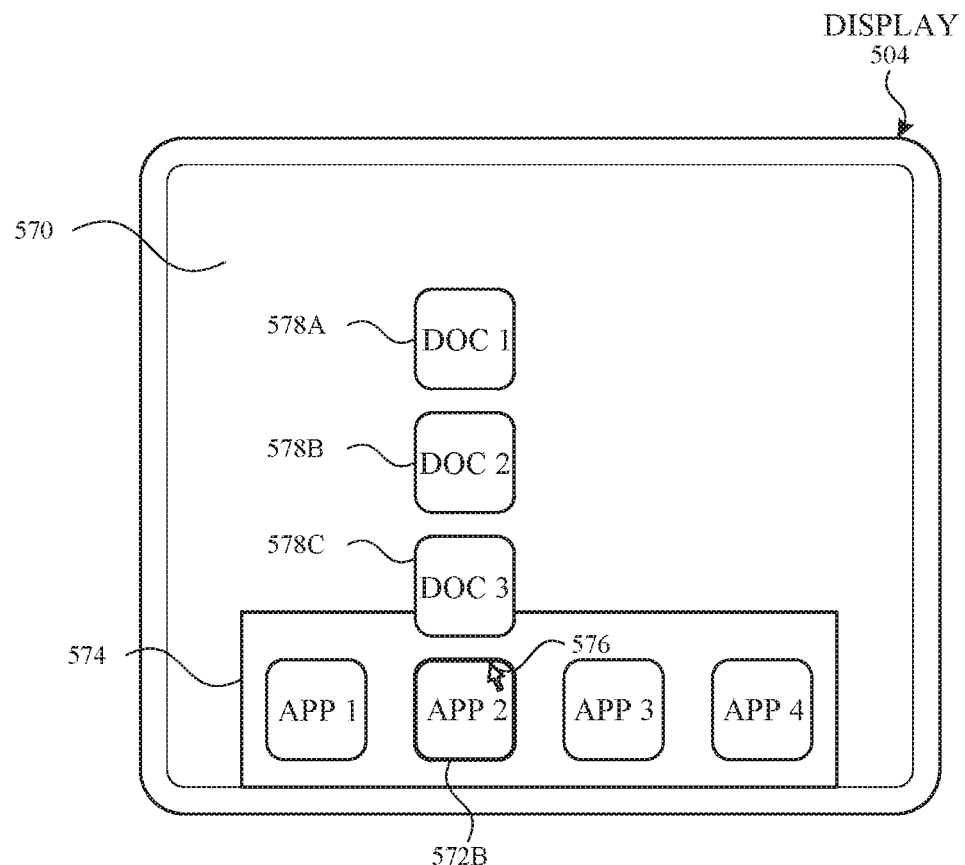

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

USER INTERFACES AND ASSOCIATED PROCESSES

User Interfaces for Browsing and Presenting Content

Users interact with electronic devices in many different manners, including using devices for browsing and presenting content. In some embodiments, some content items presented by the electronic device are available to the user without a paid subscription and some items of content may require a paid subscription to access. The electronic device optionally presents representations of recommended content items to the user that include representations of content items to which the user is entitled to access (e.g., free content items and content items accessible via a paid subscription in which the user is enrolled) without including representations of content items to which the user is not entitled to access in the representations of recommended content items. In some embodiments, the electronic device can download one or more content items to device storage. The electronic device optionally presents an indication to remove one or more content items from device storage when one or more criteria are satisfied (e.g., device storage is a threshold percentage full, the one or more content items for deletion have been stored on the device or have been released for a threshold period of time) or optionally automatically deletes the one or more content items from device storage when the one or more criteria are satisfied. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6B:
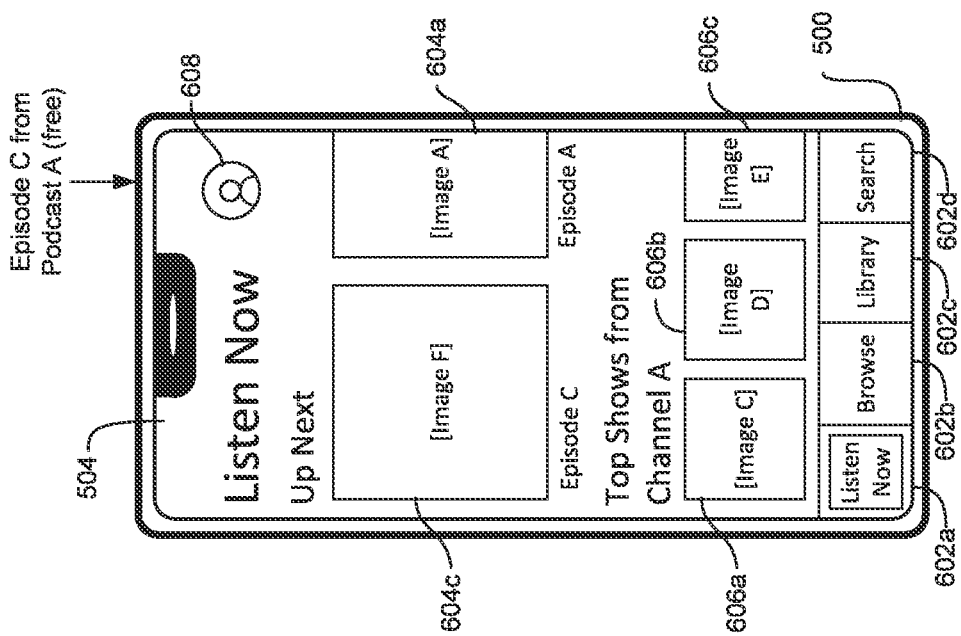
FIGS. 6A-6OO illustrate exemplary ways in which an electronic device presents representations of content and provides access to content according to some embodiments.
Figure 6A:
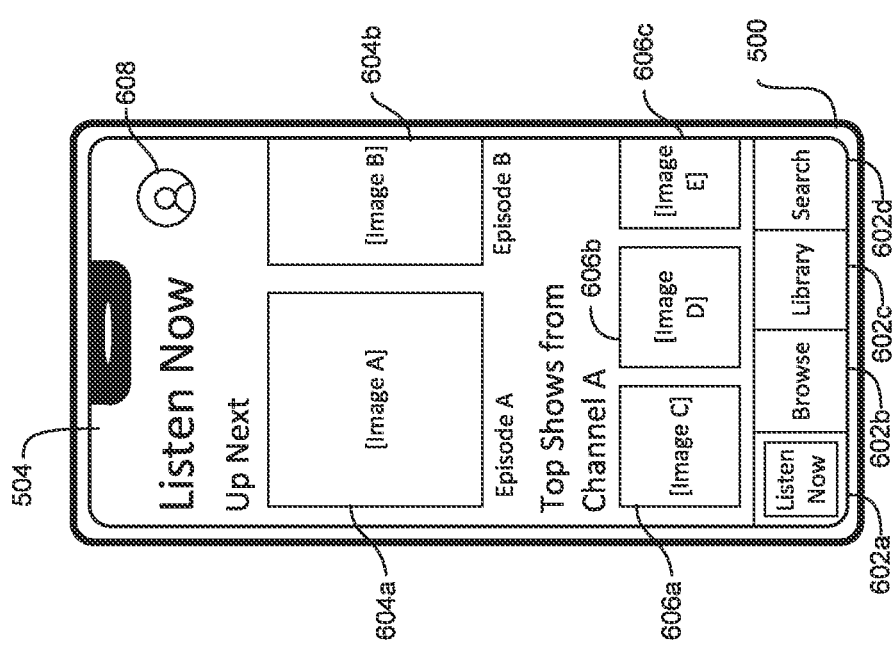
Figure 6C:
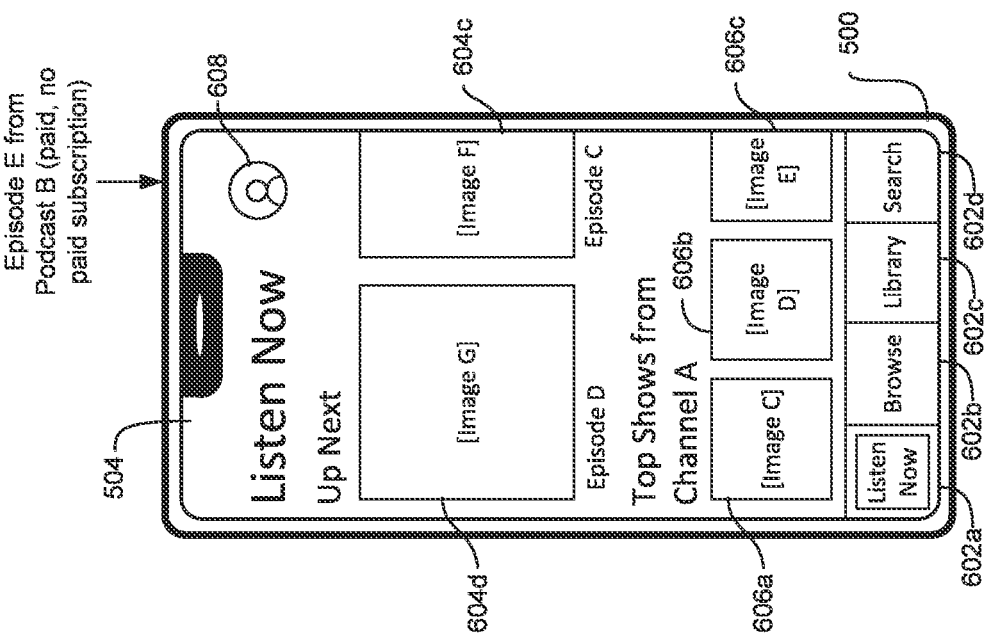
Figure 6D:
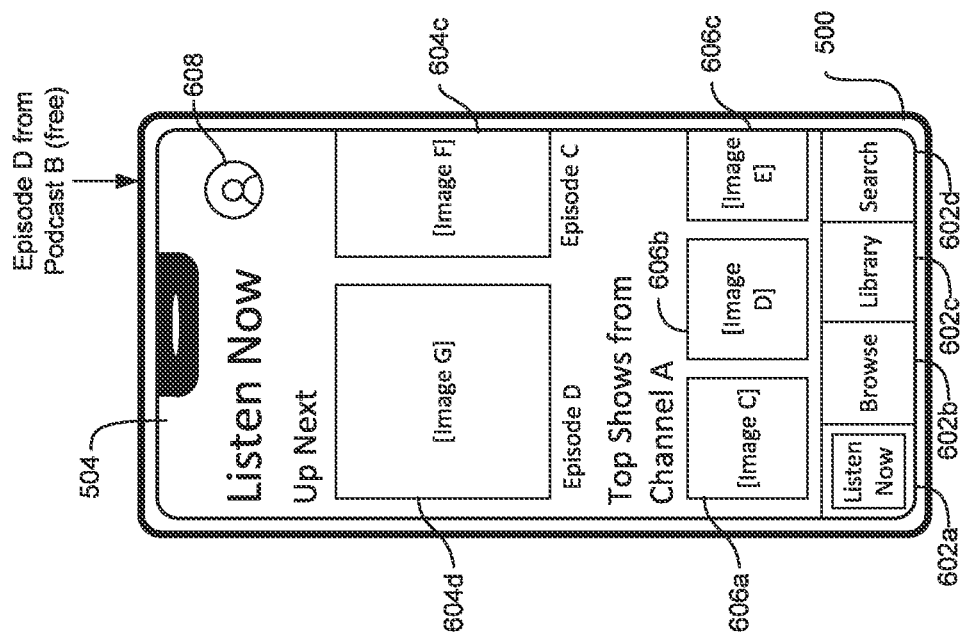
Figure 6F:
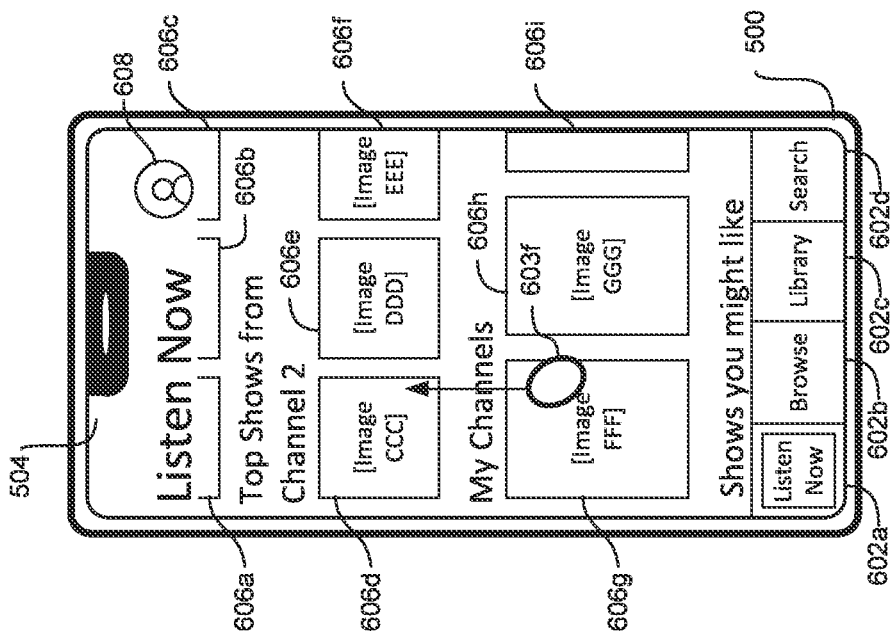
Figure 6E:
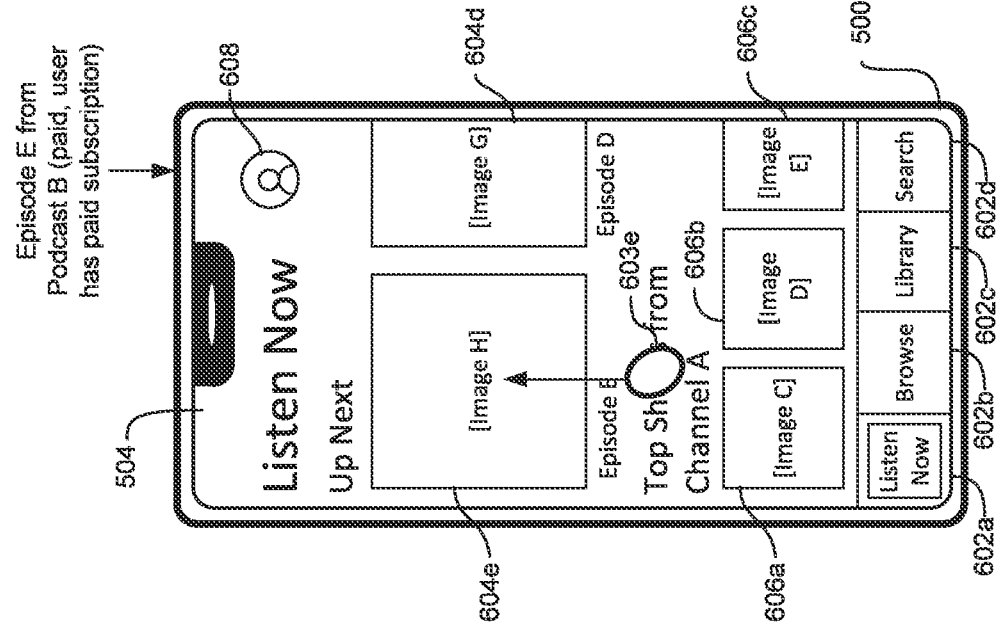
Figure 6H:
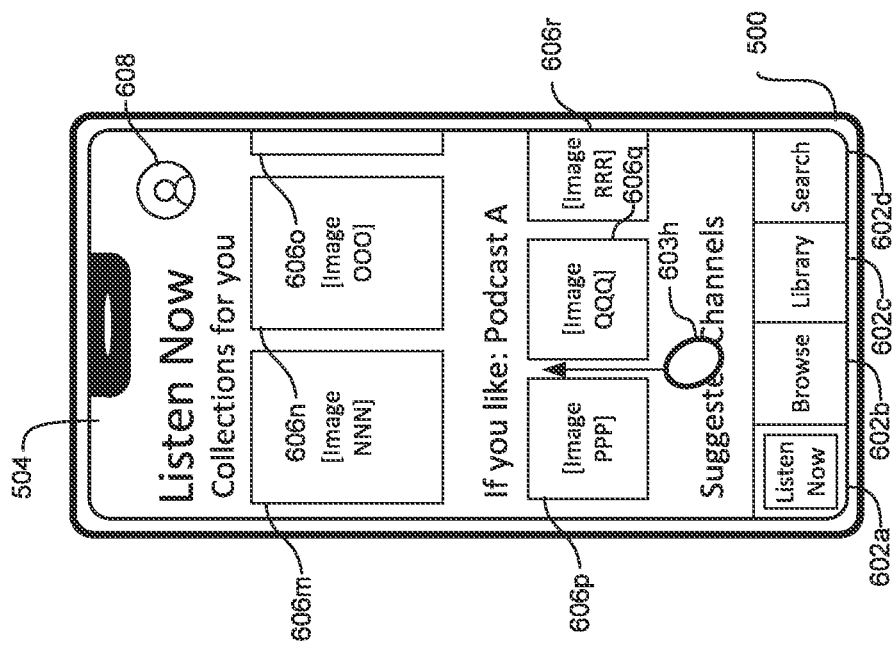
Figure 6G:
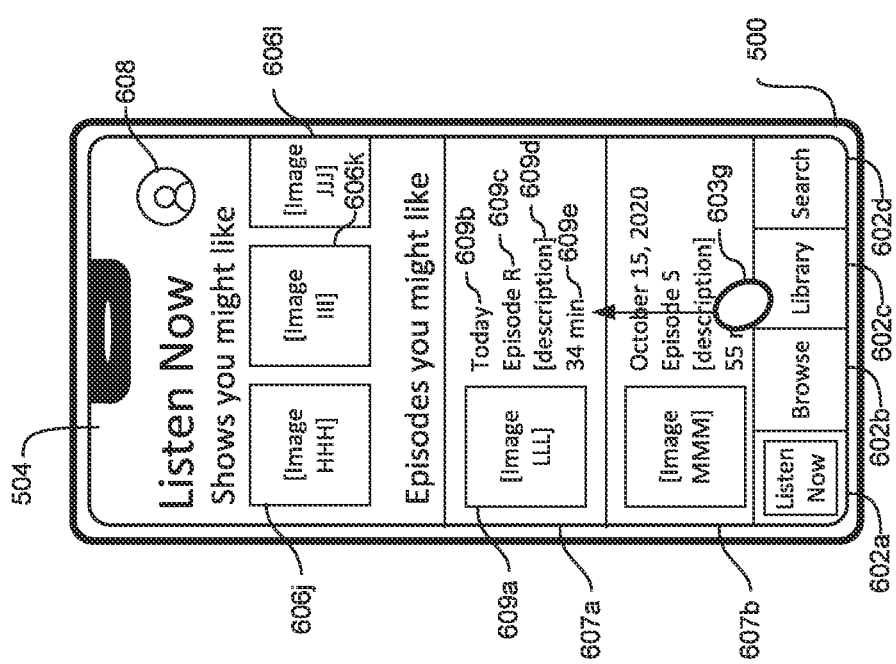
Figure 6J:
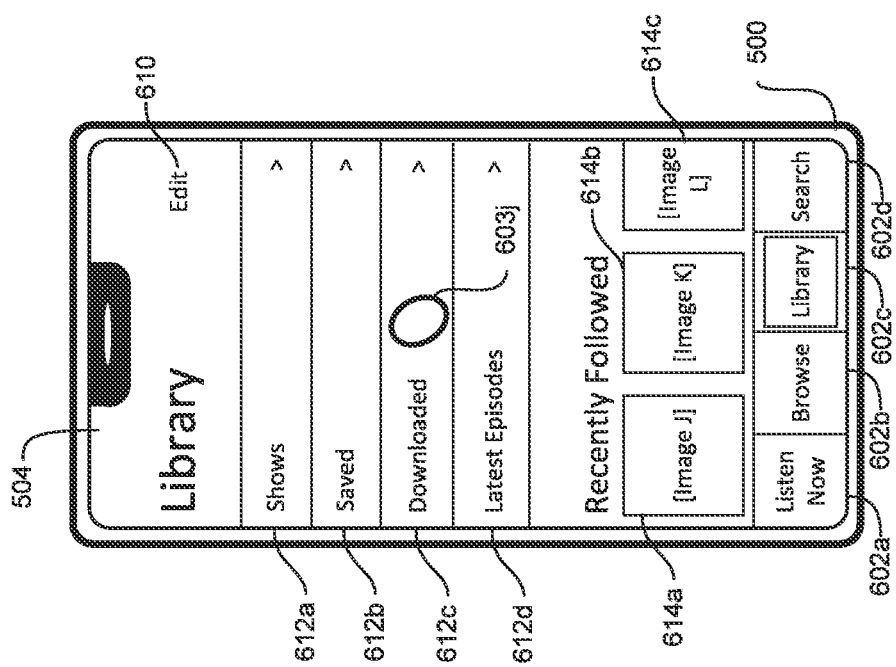
Figure 6I:
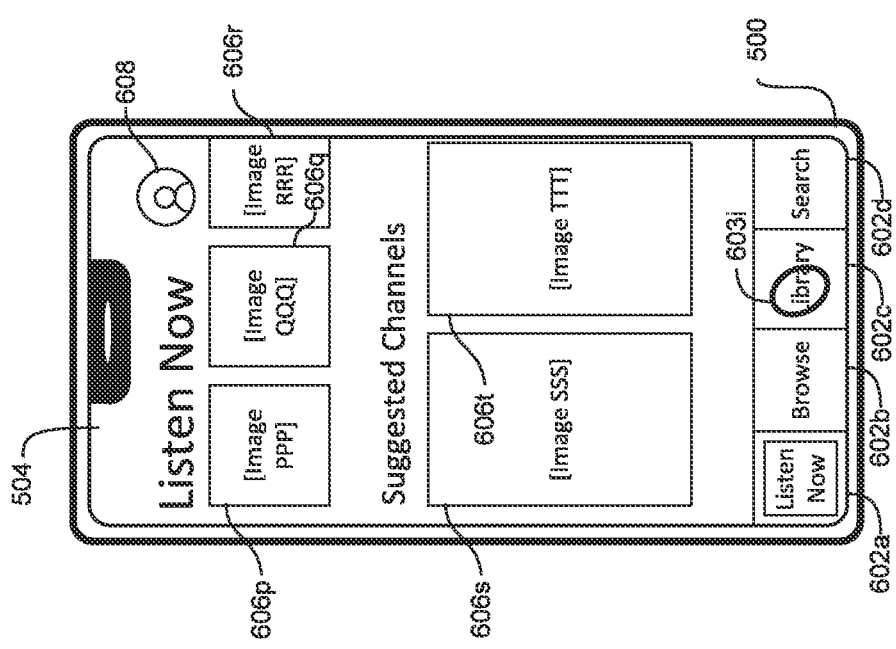
Figure 6L:
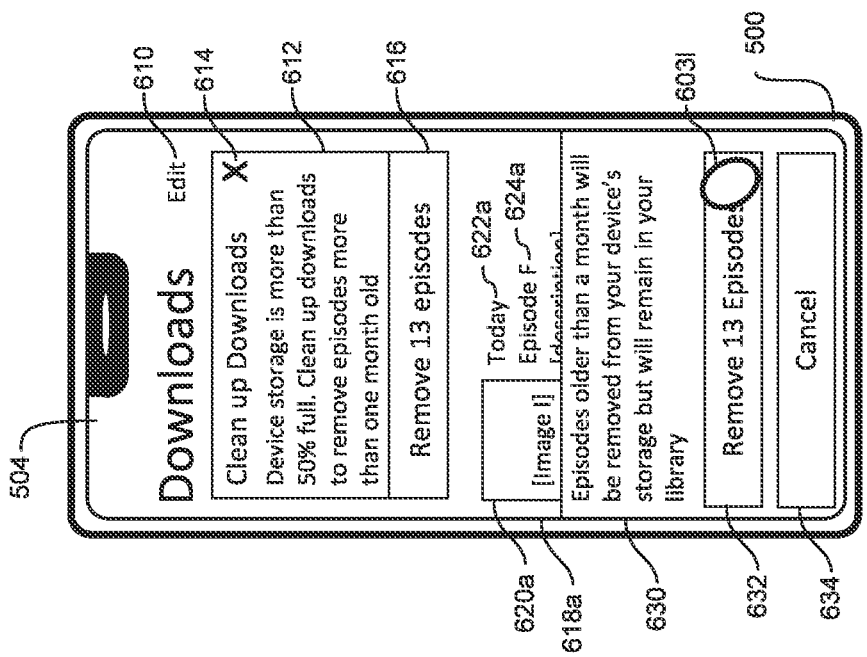
Figure 6K:
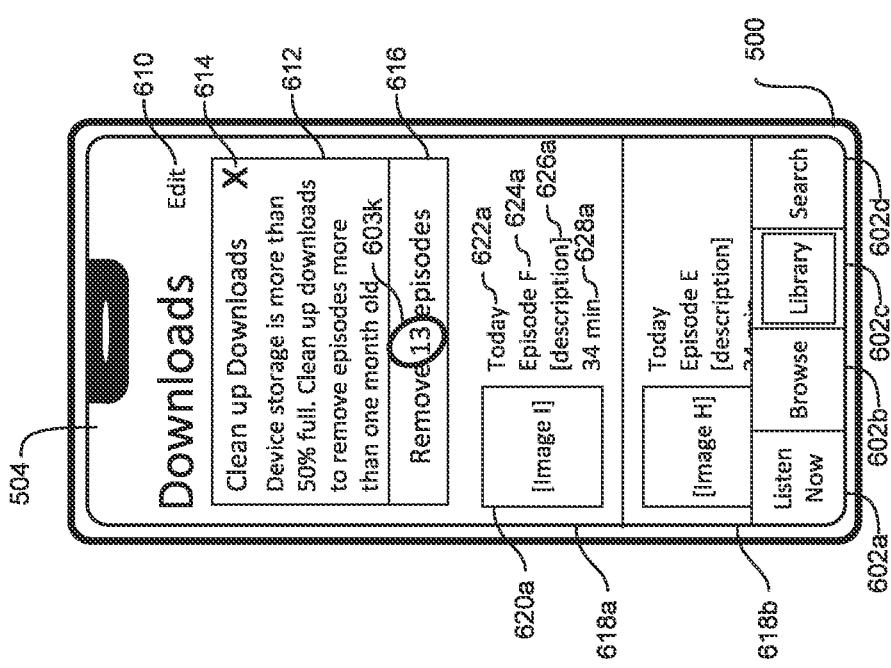
Figure 6R:
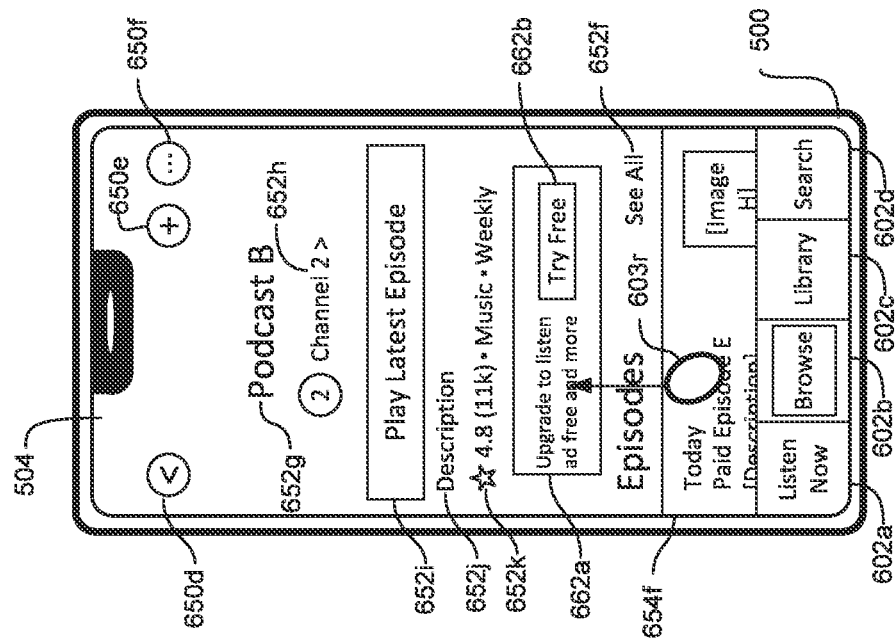
Figure 6Q:
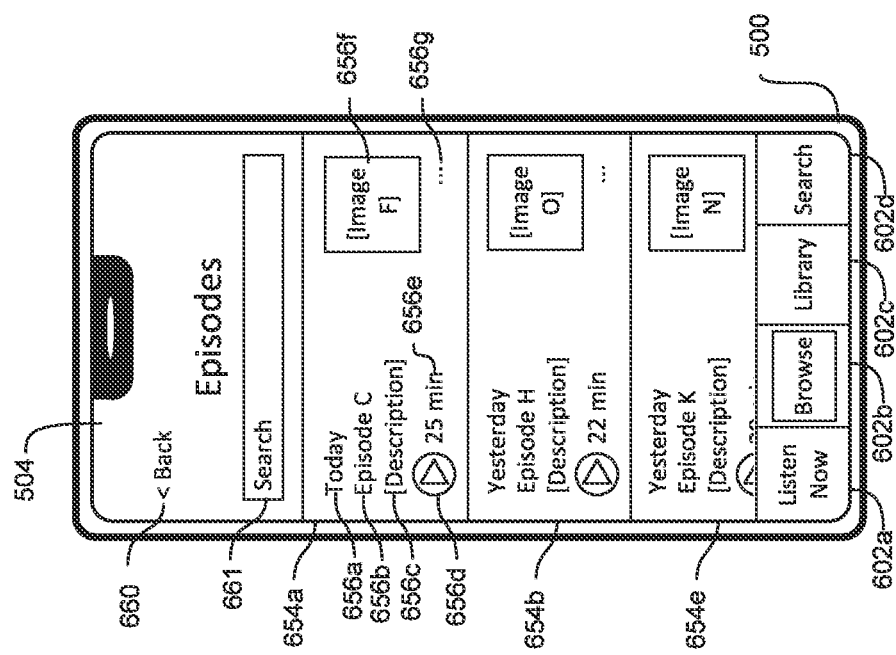
Figure 6T:
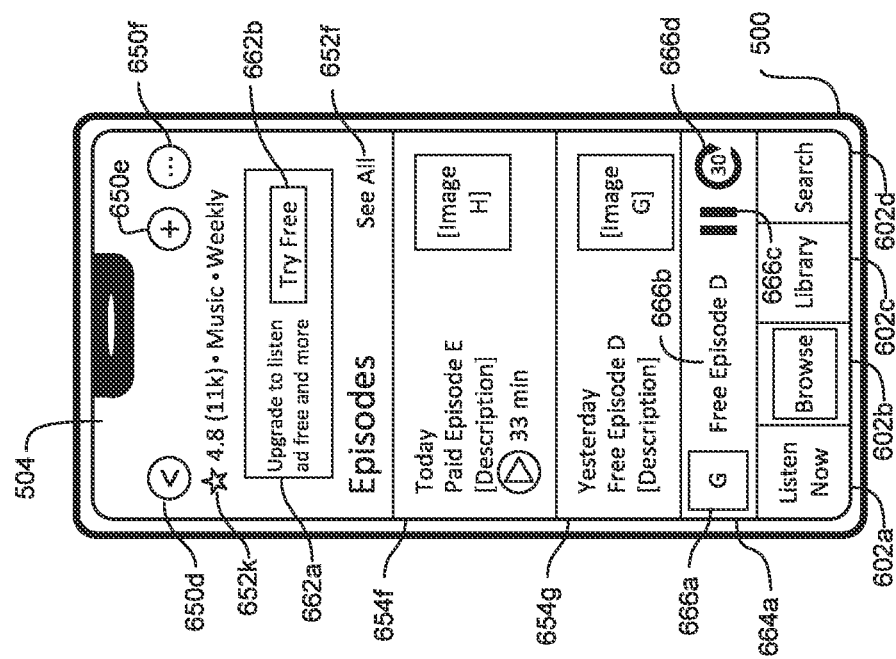
Figure 6S:
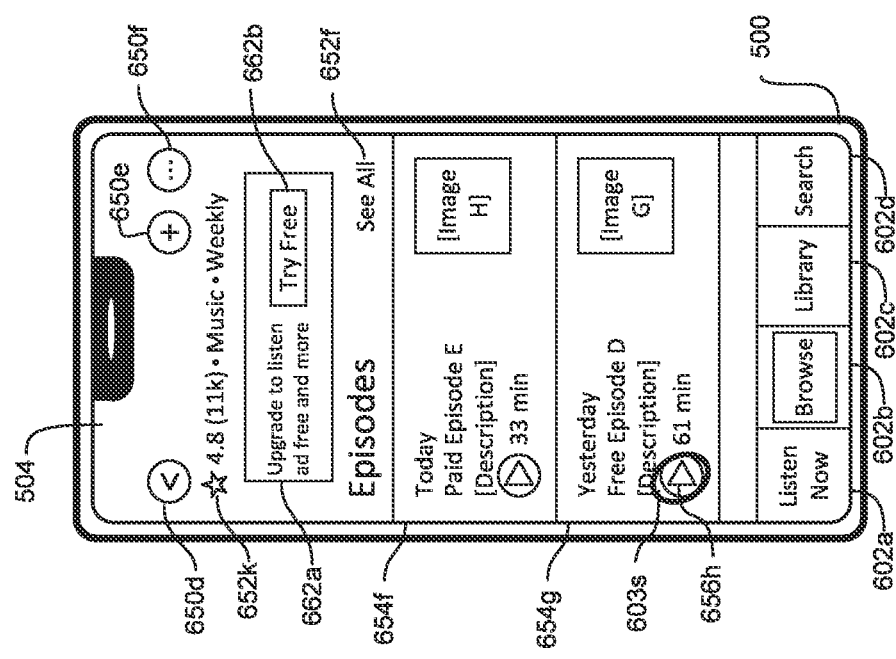
Figure 6V:
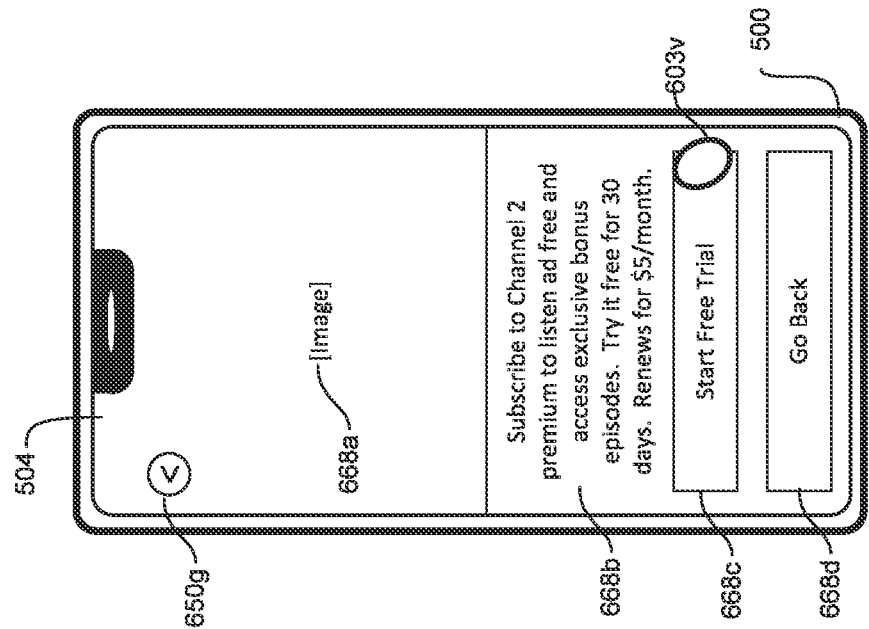
Figure 6U:
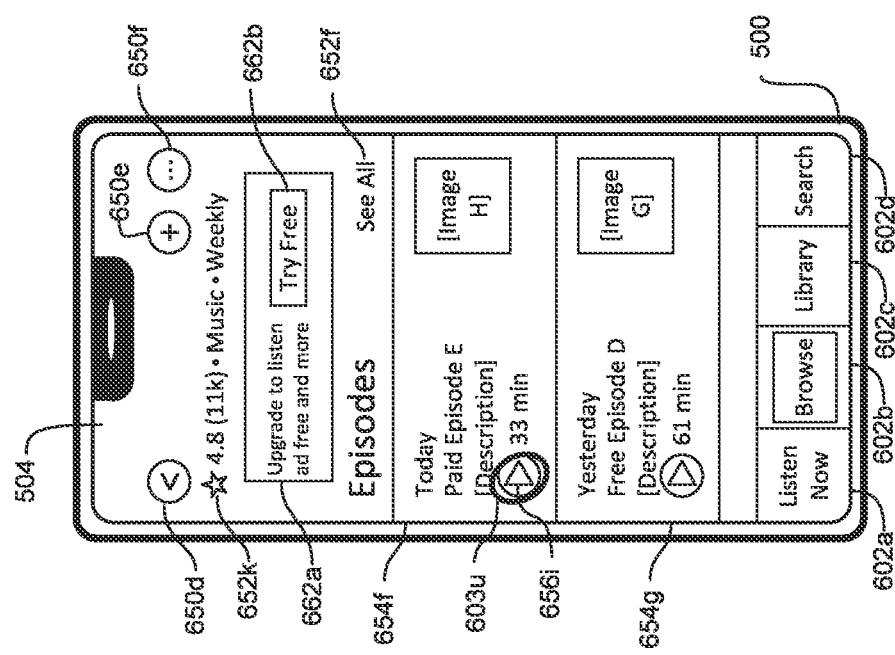
Figure 6X:
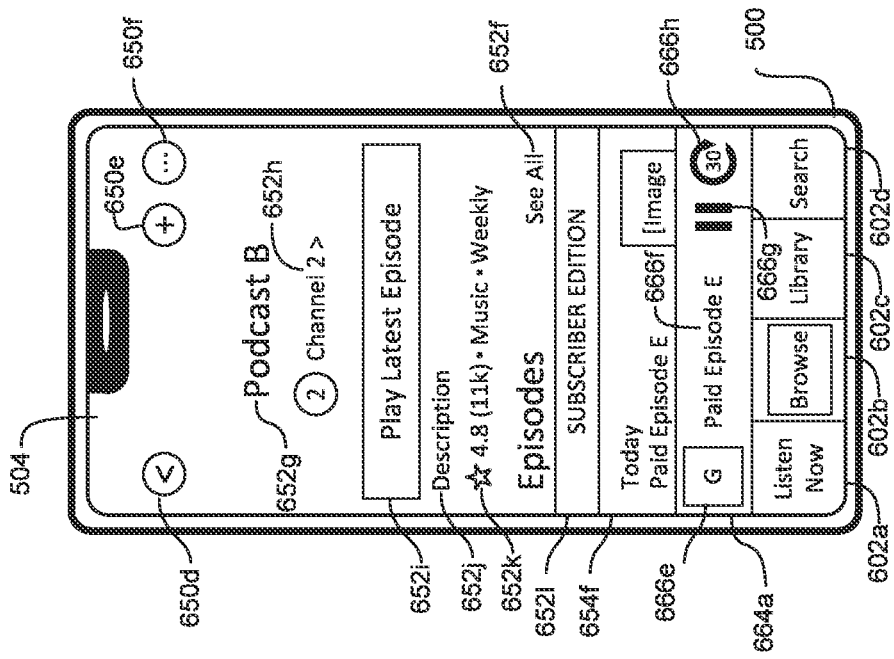
Figure 6W:
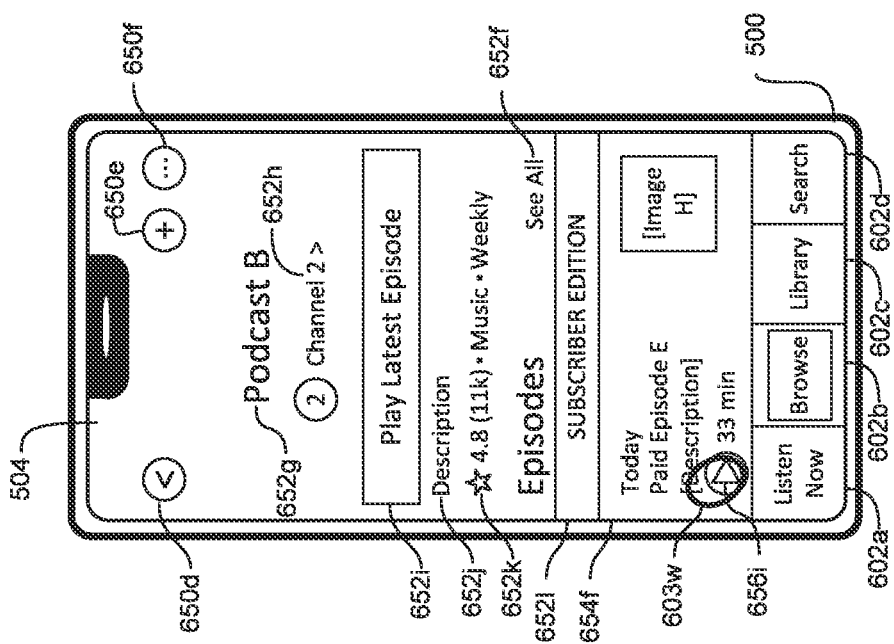
Figure 6Y:
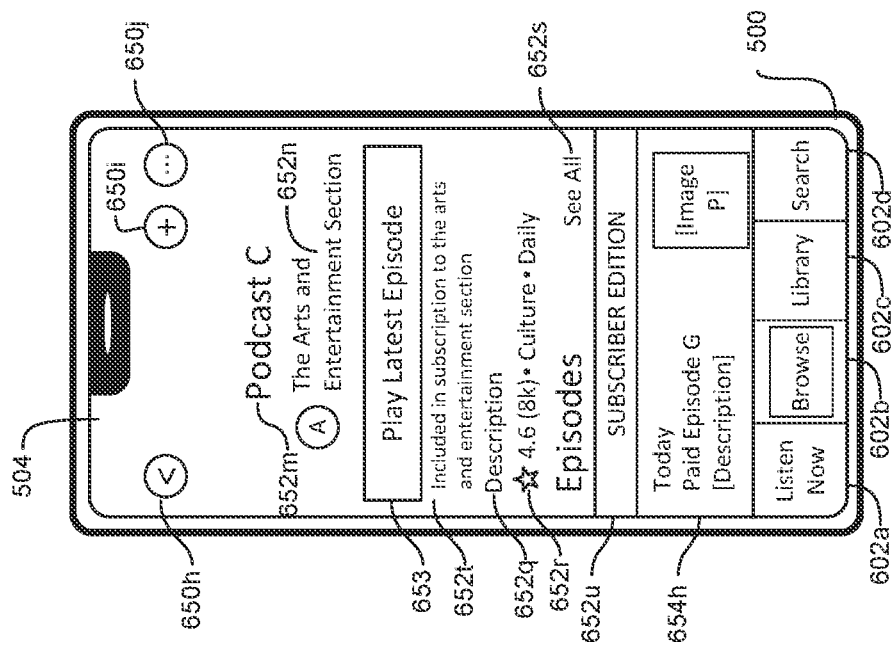
Figure 6Z:
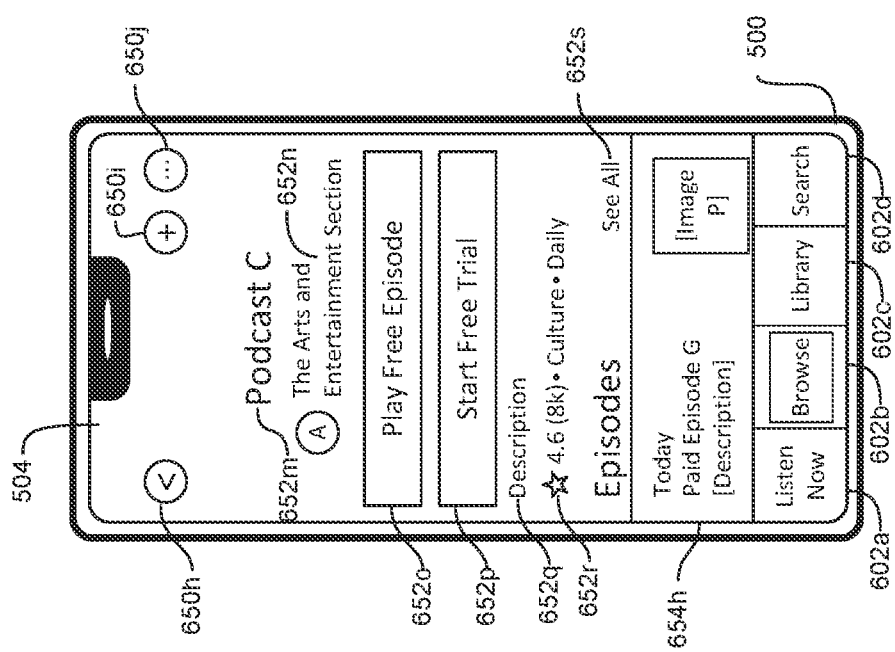
Figure 6B:
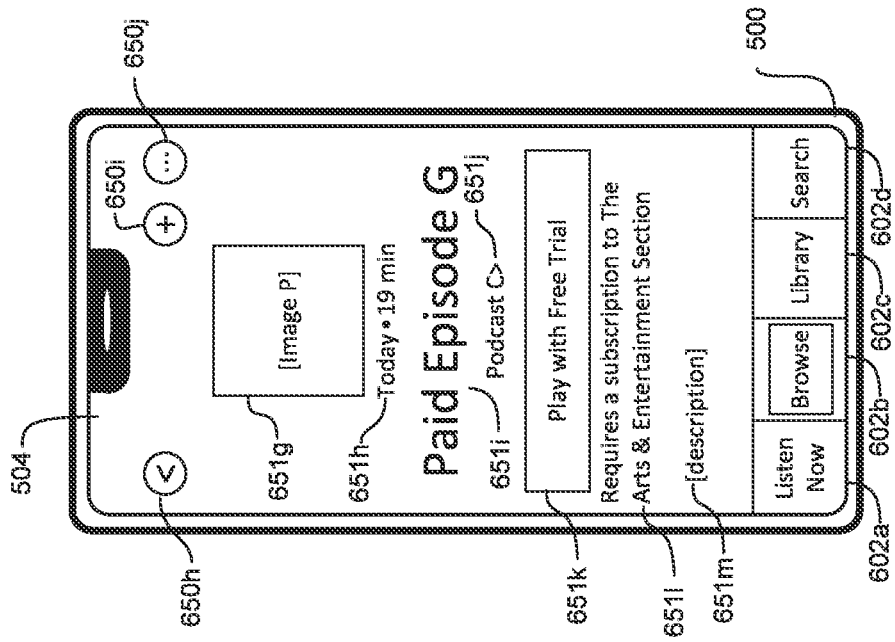
Figure 6A:
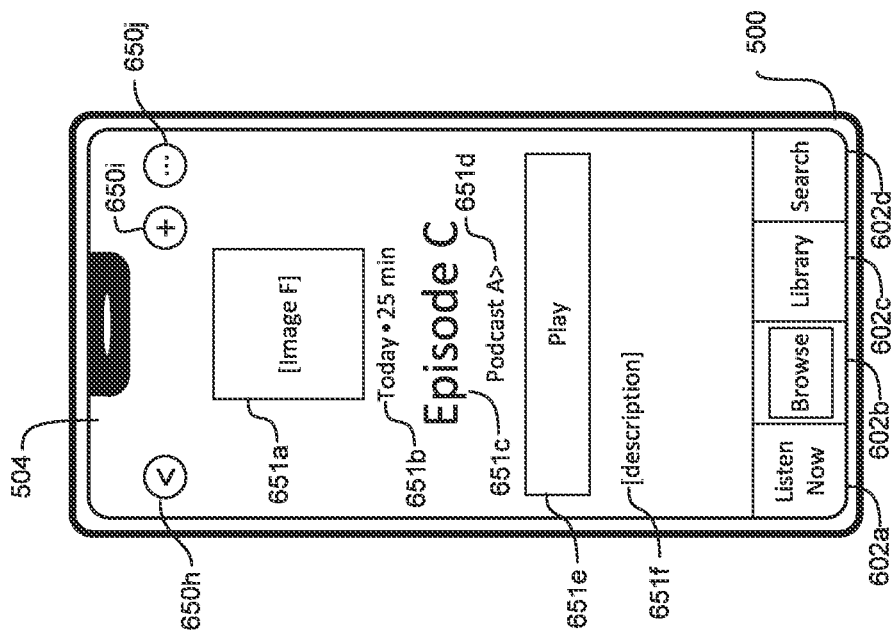
Figure 6D:
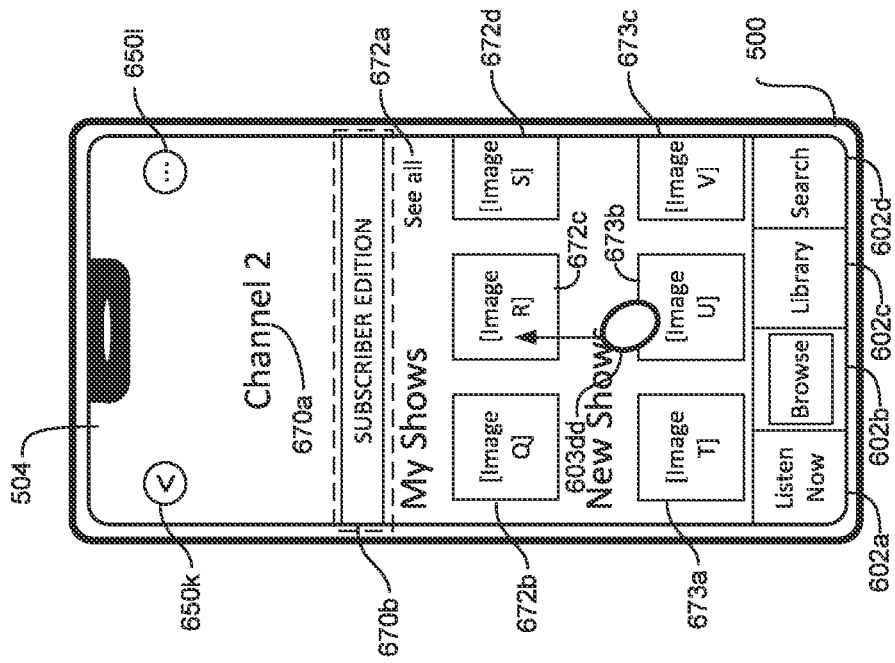
Figure 6C:
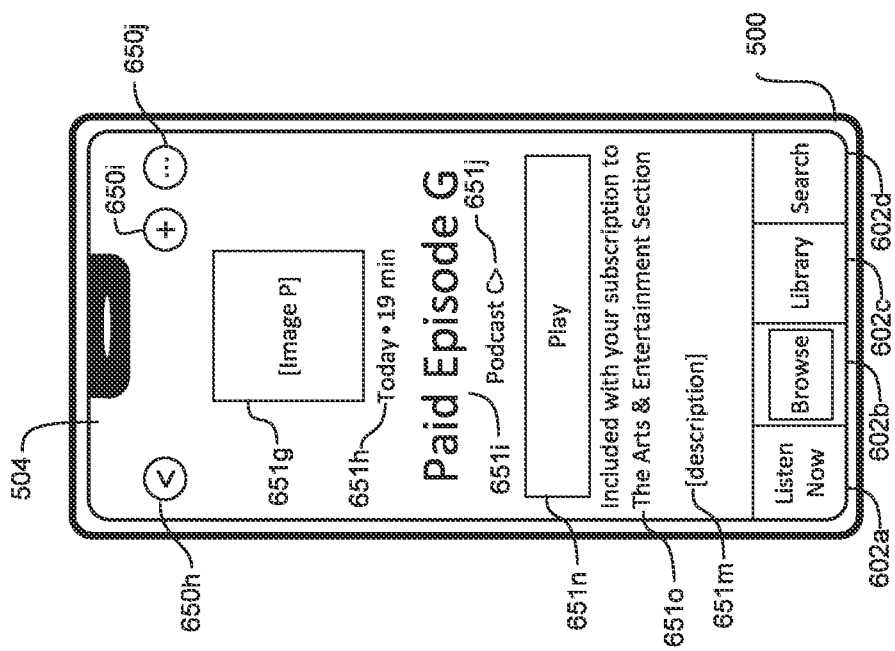
Figures 6E, 6F:
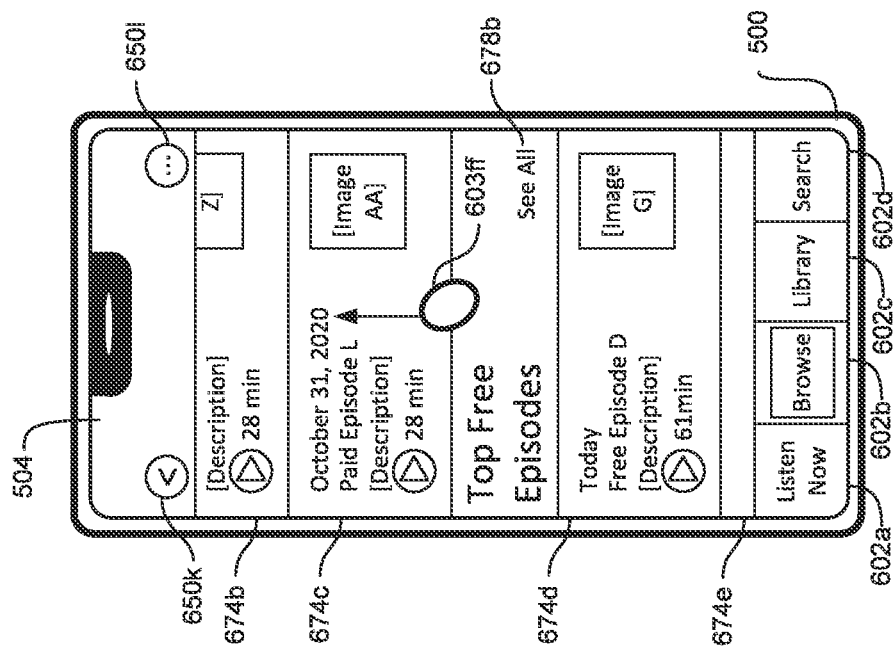
Figure 6H:
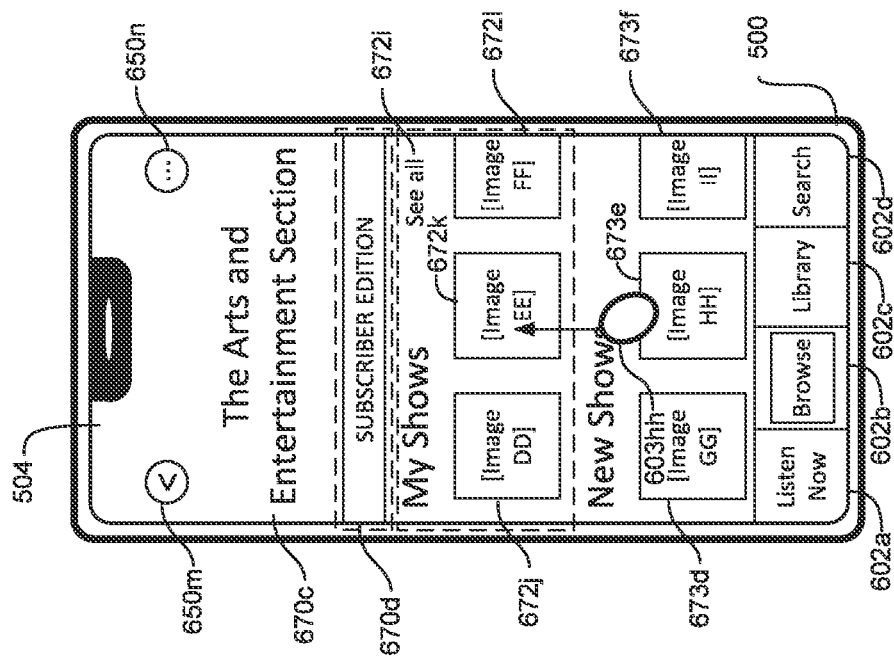
Figure 6G:
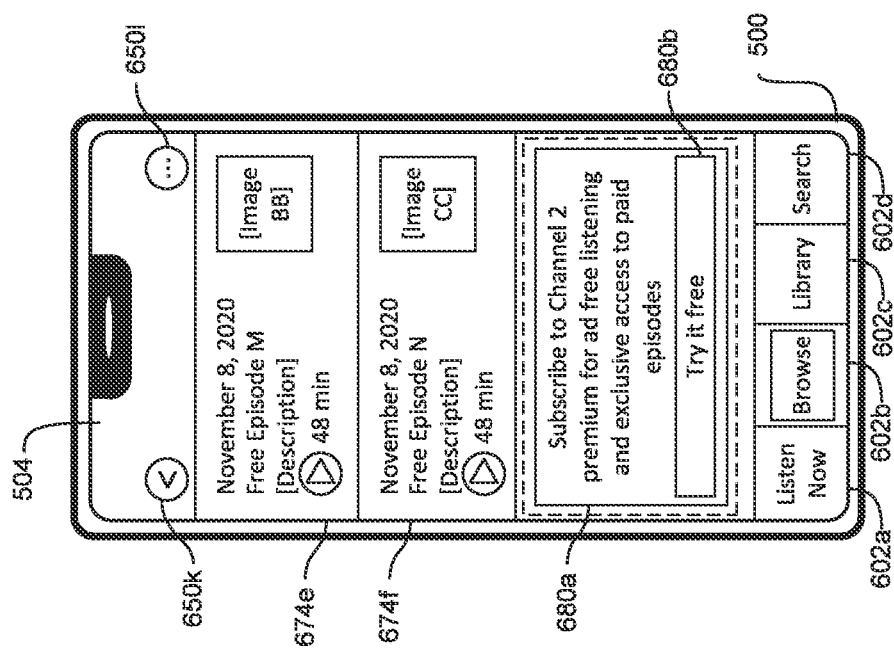
Figure 6J:
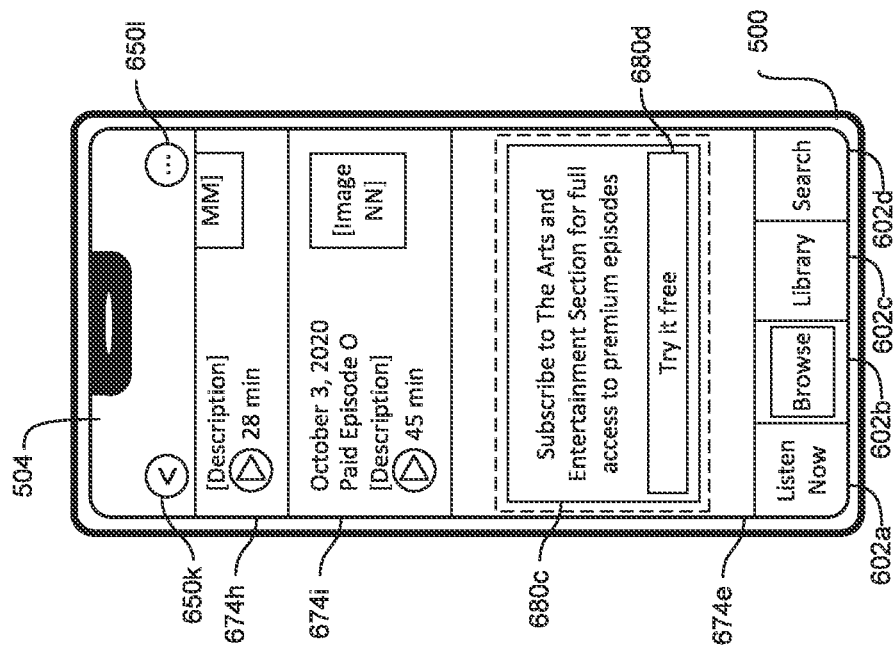
Figure 6I:
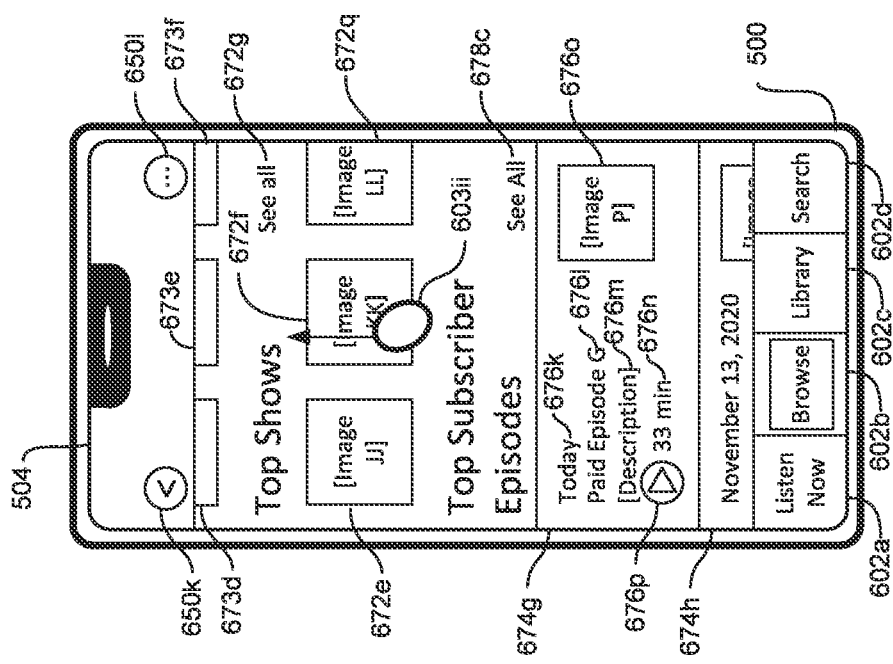
Figure 6L:
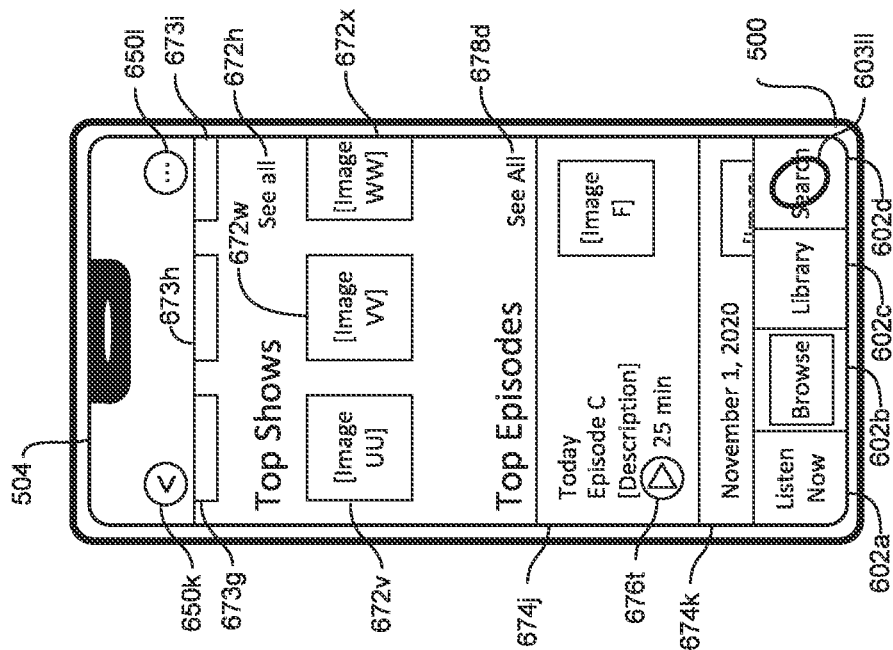
Figure 6K:
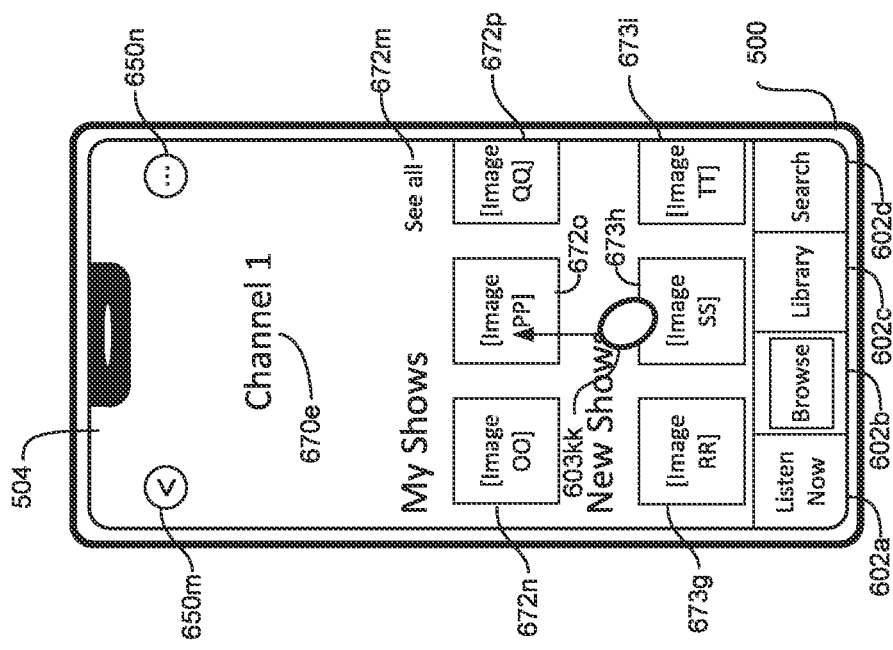
Figure 6N:
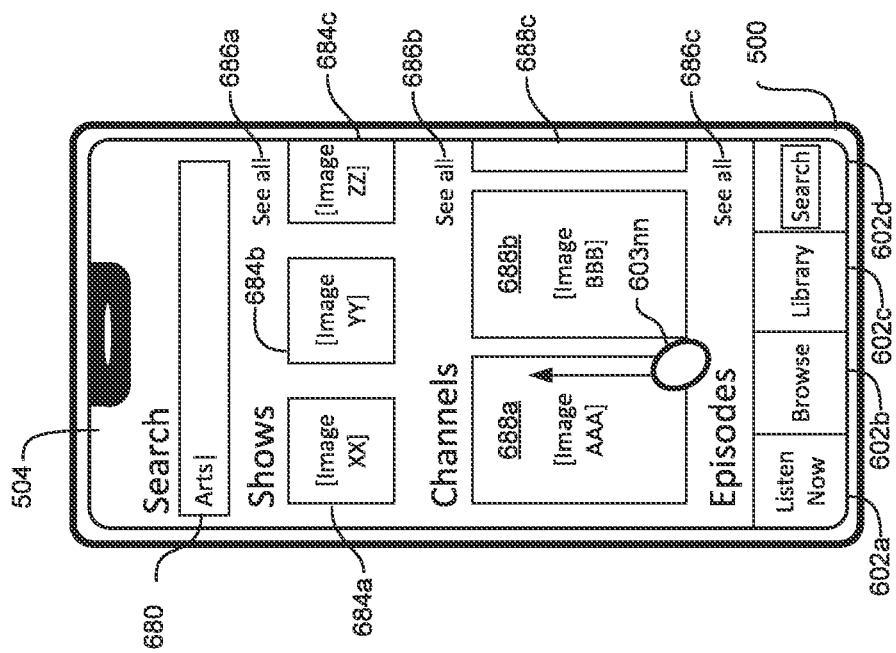
Figure 6M:
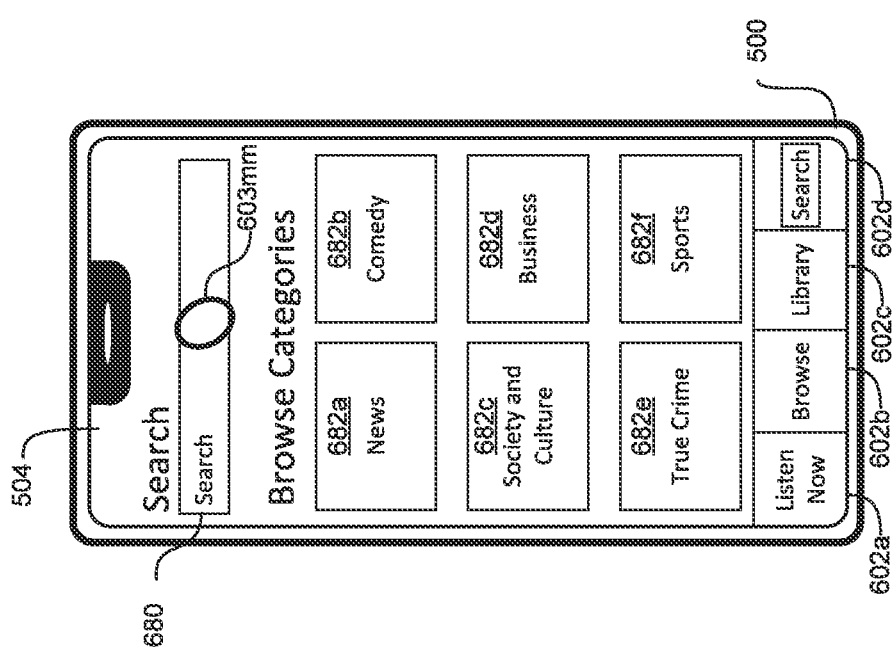
Figure 6O:
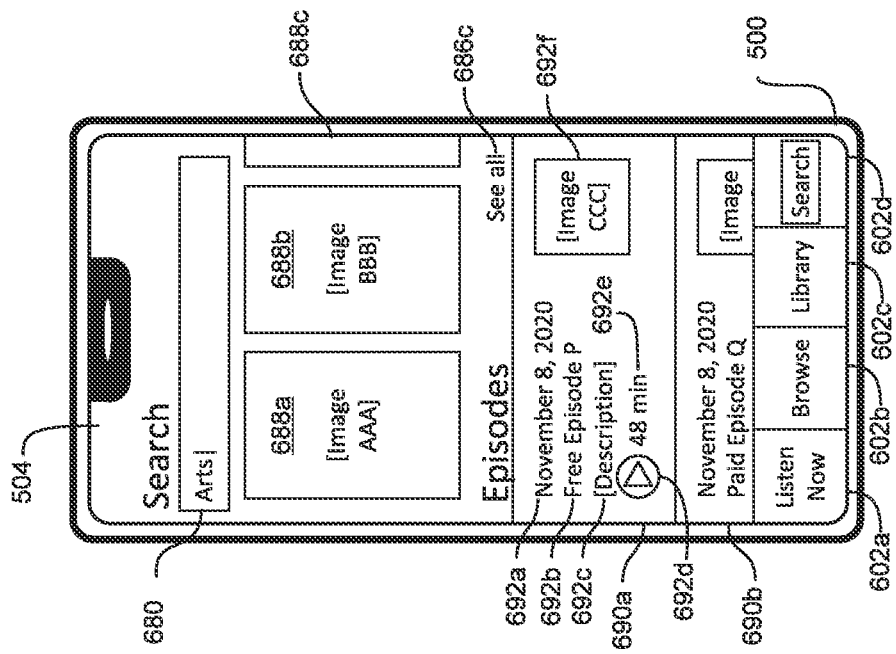

FIGS. 6A-6OO illustrate exemplary ways in which an electronic device presents representations of content and provides access to content according to some embodiments. The embodiments in these figures are used to illustrate the processes described below, including the processes described with reference to FIG. 7. Although FIGS. 6A-6OO illustrate various examples of ways an electronic device is able to perform the processes described below with reference to FIG. 7, it should be understood that these examples are not meant to be limiting, and the electronic device is able to perform one or more processes described below with reference to FIG. 7 in ways not expressly described with reference to FIGS. 6A-6OO.

In FIG. 6A, the electronic device 500 can present an exemplary content browsing user interface. In some embodiments, the content browsing user interface can include representations of content (e.g., audio, video, etc.) that the electronic device can present to the user. For example, representations 604a-604b of recommended items of content can include representations of podcast episodes from podcast series that are followed by the user. In some embodiments, in response to detecting selection of one of the representations 604a-604b, the electronic device 500 can initiate playback of the item of content corresponding to the selected representation. As another example, representations 606a-c can include representations of podcast series published on a channel to which the user is subscribed. In some embodiments, in response to detecting selection of one of the representations 606a-c, the electronic device 500 can present a series page similar to the series pages described below with reference to FIGS. 6O-6Z.

As used herein, a "channel" can be an entity or quantity that includes a collection of content series (e.g., podcast series), such as a production or publishing entity or brand, a "content series" (or "podcast series") can be a collection of episodic content, and an "item of content", "content item", "content episode", or "episode" (or "podcast episode") can be a unit of content that can be presented by the electronic device, including audio and/or video content. As used herein, "following" a particular series of content (e.g., a podcast series or podcast show) can cause the electronic device to add items of content of the series of content (e.g., episodes of the podcast show) to the library of the user and/or the "Up Next" queue shown in FIG. 6A, including representations 604a-b, and "subscribing" to a particular series of content (e.g., a podcast show) or content channel (e.g., podcast channel) can cause the electronic device to collect payment from the user to entitle the user to access content (e.g., podcast episodes) included in the series (e.g., podcast show) or channel. In some embodiments, "following" and "subscribing" actions can be associated with a user account associated with the content application that is currently logged in on the electronic device.

The user interface illustrated in FIG. 6A can further include a selectable representation 608 of the user account of the user of the electronic device and navigation options 602a-d, for example, for navigating to different user interfaces within the content application that is displaying the user interface of FIG. 6A. In some embodiments, in response to detecting selection of the representation 608 of the user account of the user of the electronic device, the electronic device presents a user interface for managing the user account and settings related to the content application. In some embodiments, the user account is associated with the content application without being associated with other services. In some embodiments, the user account is associated with other services (e.g., other content applications, communication accounts, etc.) in addition to the content application. For example, the user interface presented in response to selection of indication 608 can include options to manage paid subscriptions (e.g., to channels, podcast series, etc.), redeem gift cards, add pre-paid funds to the user account, and/or manage notification settings associated with the content application (e.g., notifications when podcast episodes from particular podcast series publish). In some embodiments, the navigation options 602a-d can be selectable to present various different user interfaces for browsing and accessing items of content described herein. For example, the user interface illustrated in FIG. 6A can be accessed by selecting the "Listen Now" option 602a.

In some embodiments, the electronic device can present representations of items of content recommended for user consumption in the "Up Next" queue. In some embodiments, while playing content items from the "Up Next" queue, the electronic device 500 can be configured to play the content items in the "Up Next" queue one after another without express user inputs to play the next item after an item finished playing. In some embodiments, the representations of content items in the "Up Next" queue can include representations of episodes of content included in content series and/or content channels followed by the user. In some embodiments, the user may be following one or more content series and/or content channels that include items of content (e.g., content episodes) to which the user is not entitled to access. For example, a particular podcast series can include free episodes accessible to (e.g., all) users, including users that do not have a paid subscription that provides access to paid content, and paid episodes that are only accessible to users that have a paid subscription that grants access to the paid content. In this example, the user may be able to access the free episodes without being able to access the paid episodes. In some embodiments, the electronic device 500 can forgo including representations of content items to which the user is not entitled to access in the representations of content items recommended for user consumption in the "Up Next" queue. As used herein, a subscription to a content series (e.g., podcast, podcast series, podcast show) can include a paid subscription to a single series of content (e.g., podcast, podcast series, podcast show) or a paid subscription to a channel that includes the series of content according to the above definition of "subscribing". FIGS. 6B-6E illustrate various situations in which the electronic device presents or does not present (e.g., as suggestions) representations of various content episodes based on the status of the user's entitlement to the episodes.

In some embodiments, as shown in FIG. 6B, the electronic device adds a representation 604c of a content episode ("Episode C") to the plurality of representations of content items recommended for user consumption in the "Up Next" queue. The electronic device can present the representation 604c in response to an indication that Episode C has published and/or is available for access. In some embodiments, the electronic device can present representation 604c of Episode C because the user follows the content series that includes Episode C (e.g., "Podcast A") and the user is entitled to access Episode C. Episode C can be a free episode to which (e.g., all) users can access with or without a paid subscription that provides a user to access paid content of Podcast A. In some embodiments, all of the episodes included in Podcast A can be accessed without a paid subscription. In some embodiments, a paid subscription to Podcast A can be available that provides a benefit other than paid bonus episodes, such as ad-free versions of the episodes of Podcast A.

In some embodiments, as shown in FIG. 6C, the electronic device can add a representation 604d of a content episode ("Episode D") to the plurality of representations of content items recommended for user consumption in the "Up Next" queue. The electronic device can present the representation 604d in response to an indication that Episode D has published and/or is available for access. In some embodiments, the electronic device can present representation 604d of Episode D in the "Up Next" queue because the user follows the content series that includes Episode D (e.g., "Podcast B") and the user is entitled to access Episode D. Episode D can be a free episode to which (e.g., all) users are entitled with or without a paid subscription that entitles a user to access paid content of Podcast B. In some embodiments, Podcast B can include one or more episodes that can be accessed by any user regardless of subscription status, and one or more episodes that can only be accessed by users who have a paid subscription to the podcast. Because Episode D is accessible to (e.g., all) users, the electronic device 500 can present the representation 604d of Episode D in the "Up Next" queue regardless of whether or not the user of the electronic device (e.g., the user currently logged in) has a paid subscription to access Podcast B.

In some embodiments, as shown in FIG. 6D, the electronic device can forgo adding a representation of a content episode ("Episode E") to the plurality of representations of content items recommended for user consumption in the "Up Next" queue. In this example, Episode E is only accessible to users with paid subscriptions to Podcast B and the user does not have a paid subscription to Podcast B, so the user is not entitled to access Episode E even though the user is able to access the free episodes of Podcast B. In some embodiments, the electronic device forgoes presenting representations of items of content to which the user is not entitled to access and therefore does not present a representation of Episode E in response to an indication that Episode E has published in the "Up Next" queue, even though representations of free episodes of Podcast B are added to the "Up Next" queue.

In some embodiments, as shown in FIG. 6E, the electronic device can add a representation 604e of Episode E to the plurality of representations of content items recommended for user consumption in the "Up Next" queue while the user is entitled to access Episode E. The electronic device can present the representation 604e in response to an indication that Episode E has published and/or is available for access. In some embodiments, the electronic device can present representation 604e of Episode E in the "Up Next" queue because the user follows the content series that includes Episode E (e.g., "Podcast B") and the user is entitled to access Episode E. Episode E can be a paid episode accessible only to users with a paid subscription to Podcast B. Because Episode E is accessible only to users with a paid subscription to Podcast B and the user has a paid subscription to access Podcast B, the electronic device 500 can present the representation 604e of Episode E.

Thus, as described above with reference to FIGS. 6B-6E, the electronic device 500 can present representations of suggested content items for user consumption to which the user is entitled to access, and can forgo including representations of content items to which the user is not entitled to access in the plurality of representations. When a podcast, to which the user is not subscribed, includes paid content items for which the user has not paid, the "Up Next" queue will not include the paid content items, but may include one or more free content items from the same content series.

In some embodiments, the electronic device 500 can display additional content in the user interface of FIGS. 6A-6E, as will now be described with reference to FIGS. 6E-6I (e.g., in the "Listen Now" page of the user interface). As shown in FIG. 6E, the electronic device 500 can detect movement of contact 603e, which can correspond to a request to scroll the user interface. In response to the input illustrated in FIG. 6E, the electronic device 500 can update the user interface as shown in FIG. 6F.

The electronic device 500 can present the user interface illustrated in FIG. 6F in response to the user's scrolling illustrated in FIG. 6E. In some embodiments, below representations 606a-606c of content series included in Channel A, a channel to which the user recently followed or subscribed, the electronic device 500 can present representations 606d-606f of content series included in Channel 2, another channel to which the user recently followed or subscribed. In some embodiments, in response to detecting selection of one of the representations 606a-f, the electronic device 500 can present a content series page similar to the content series pages described below with reference to FIGS. 6O-6Z. Below representations 606d-606f, the electronic device 500 can present representations 606g-606i of channels to which the user is subscribed or follows. In some embodiments, the representations 606g-i can include indications of the number of content series included in each channel (e.g., in or overlaid with the image of each representation 606g-i). In some embodiments, in response to detecting selection of one of the representations 606g-606i, the electronic device 500 can present a channel page similar to the channel pages described below with reference to FIGS. 6DD-6LL.

As shown in FIG. 6F, the electronic device 500 can detect movement of contact 603f, which can correspond to a request to further scroll the user interface. In response to the input illustrated in FIG. 6F, the electronic device 500 can update the user interface as shown in FIG. 6G.

The electronic device 500 can present the user interface in FIG. 6G in response to the user input illustrated in FIG. 6F. The user interface can include representations 606j-1 of content series recommended to the user (e.g., based on the user's content consumption history). In some embodiments, in response to detecting selection of one of the representations 606j-1, the electronic device 500 can present a series page similar to the series pages described below with reference to FIGS. 6O-6Z. The user interface can further include representations 607a-b of episodes of content recommended to the user (e.g., based on the user's content consumption history). In some embodiments, the recommended episodes can be from content series followed by the user and/or from content series not followed by the user. In some embodiments, in response to detecting selection of one of the representations 607a-b, the electronic device 500 can present an episode page similar to the episode pages described below with reference to FIGS. 6AA-6CC. In some embodiments, in response to detecting selection of one of the representations 607a-b, the electronic device 500 initiates playback of the selected episode. Representation 607a can include an image 609a associated with the episode, a publication date 609b of the episode, the title 609c of the episode, a description 609d of the episode, and the duration 609e of the episode. In some embodiments, representation 607b can include the features corresponding to the features of representation 607a.

As shown in FIG. 6G, the electronic device 500 can detect movement of contact 603g, which can correspond to a request to further scroll the user interface. In response to the input illustrated in FIG. 6G, the electronic device 500 can update the user interface as shown in FIG. 6H.

In some embodiments, the electronic device 500 displays the user interface illustrated in FIG. 6H in response to the input illustrated in FIG. 6G. The user interface can include representations 606m-o of editorial collections recommended to the user (e.g., based on the user's content consumption history). In some embodiments, the collections can be collections of content episodes, collections of content series, and/or collections of channels. In response to detecting selection of one of the representations 606m-o, the electronic device 500 can display a user interface including representations of the content items, series, and/or channels included in the selected collection. The user interface can further include representations 606p-r of content series recommended to the user based on Podcast A. In some embodiments, the electronic device 500 presents recommendations based on Podcast A because the user follows Podcast A and/or because the user has recently and/or frequently and/or previously listened to one or more episodes of Podcast A. Representations 606*p*-*r* can be representations of other content series selected based on Podcast A. For example, the other content series can be content series that are similar to Podcast A, such as by having the same topic, host, genre and/or other characteristic. As another example, the electronic device 500 can recommend the other content series based on Podcast A in accordance with a determination that other users who have played, followed, and/or subscribed to Podcast A have played, followed, and/or subscribed to the other content series. In some embodiments, in response to detecting selection of one of the representations, the electronic device 500 can present a series page similar to the series pages described below with reference to FIGS. 6O-6Z.

As shown in FIG. 6H, the electronic device 500 can detect movement of contact 603*h*, which can correspond to a request to further scroll the user interface. In response to the input illustrated in FIG. 6H, the electronic device 500 can update the user interface as shown in FIG. 6I.

As shown in FIG. 6I, in some embodiments, the electronic device can display representations 606*s*-*t* of channels suggested to the user beneath the representations 606*p*-*r* described above with reference to FIG. 6H. In some embodiments, the representations 606*p*-*r* can include indications of the number of content series included in each channel (e.g., as part of or overlaid with the images of representations 606*p*-*r*). In some embodiments, the channels are suggested based on content consumption history of the user and/or based on the series and/or channels subscribed to or followed by the user. In some embodiments, in response to detecting selection of one of the representations 606*s*-*t* of channels, the electronic device 500 displays a channel page similar to the channel pages described below with reference to FIGS. 6DD-6LL.

As shown in FIG. 6I, the electronic device 500 can detect selection (e.g. with contact 603*i*) of the "Library" navigation option 602*c*. In response to the user's selection in FIG. 6I, the electronic device 500 can display the user interface illustrated in FIG. 6J.

In some embodiments, the electronic device 500 can display the Library user interface illustrated in FIG. 6J. The Library user interface can include navigational options 612*a*-*d* that, when selected, cause the electronic device 500 to present representations of items of content in the user's content library. For example, in response to detecting selection of the "Shows" option 612*a*, the electronic device 500 can present representations of shows (e.g., content series) followed by the user. As another example, in response to detecting selection of the "Saved" option 612*b*, the electronic device 500 can present representations of content items, content series, and/or channels saved by the user. As another example, in response to detecting selection of the "Latest Episodes" option 612*d*, the electronic device 500 can present representations of content items from content series and/or channels followed by the user that were most recently published and/or available for access. It should be understood that, in some embodiments, the navigational options displayed in the Library user interface can differ from the navigational options 612*a*-*d* illustrated in FIG. 6J.

In some embodiments, the Library user interface can further include an option 610 to edit the navigational options 612*a*-*d* displayed in the Library user interface and representations 614*a*-*c* of content series and/or channels recently followed by the user. For example, in response to detecting selection of the "Edit" option 610, the electronic device 500 can present a settings user interface from which the user is able to select navigational options to be presented in the Library user interface. In some embodiments, in response to detecting selection of one of the representations 614*a*-*c*, the electronic device 500 can present a series page similar to the series pages described below with reference to FIGS. 6O-6Z or a channel page similar to the channel pages described below with reference to FIGS. 6DD-6LL.

As shown in FIG. 6J, the electronic device 500 can detect selection (e.g., with contact 603*j*) of the "Downloaded" option 612*c*. In some embodiments, in response to the user's selection in FIG. 6J, the electronic device 500 can display a user interface including representations of content items downloaded to the storage of electronic device 500, as shown in FIG. 6K. In some embodiments, as will be described below with reference to FIGS. 6K-6N, the electronic device 500 can remove downloaded content items from the electronic device's storage on demand or automatically in response to one or more criteria. For example, when the storage space in use on the electronic device 500 exceeds a threshold percentage (e.g., 33%, 40%, 50%, 60%, 75%), the electronic device 500 can remove content items that were published or were stored on the electronic device at least a predetermined time threshold (e.g., 7, 14, 21, 30, 60, etc. days) ago.

In some embodiments, the electronic device 500 can display the user interface in FIG. 6K in response to the user's selection in FIG. 6J. The user interface can include representations 618*a* and 618*b* of content items downloaded to the storage of the electronic device 500. For example, representation 618*a* can include an image 620*a*, publication date 622*a*, title 624*a*, description 626*a*, and duration 628*a* associated with an item of content. In some embodiments, representation 618*b* can include similar elements to the elements of representation 618*b*.

The user interface in FIG. 6K can further include an indication 612 to remove one or more content items from device storage. In some embodiments, the indication 612 can be presented in accordance with a determination that at least a threshold percentage (e.g., 33%, 40%, 50%, 60%, 75%) of device storage (or device storage designated for storage of content items) is in use or in response to one or more other criteria. The indication 612 can include an option 616 to remove a plurality of content items from device storage (e.g., content items that have been published or stored on the device for a threshold period of time (e.g., 7, 14, 21, 30, 60, etc. days)) and an option 614 to cease display of the indication 612 without removing the one or more content items from device storage. In some embodiments, the text of option 616 can include an indication of the number of content items that meet criteria for removal. For example, in FIG. 6K, option 616 indicates that 13 episodes meet removal criteria. As shown in FIG. 6K, the electronic device 500 can detect selection (e.g., with contact 603*k*) of the option 616 to delete the content items that have been published or stored on the electronic device 500 for at least the threshold period of time.

In some embodiments, in response to the user's selection in FIG. 6K, the electronic device 500 can update the user interface as shown in FIG. 6L (e.g., before deleting the content items). In FIG. 6L, for example, the electronic device 500 can display a user interface element 630 requesting confirmation that the one or more content items should be deleted from device storage. In some embodiments, the user interface element 630 can include a selectable option 632 that, when selected, causes the electronic device 500 to delete the one or more content items and a selectable option 634 that, when selected, causes the electronic device 500 to cease display of the user interface element 630 without deleting the one or more content items. In some embodiments, the text of option 632 can include an indication of the number of content items that meet criteria for removal. For example, in FIG. 6L, option 632 indicates that 13 episodes meet removal criteria. As shown in FIG. 6L, the electronic device 500 can detect selection (e.g., with contact 603*l*) of the option 632 to delete the content items. In some embodiments, in response to detecting selection of option 632, the electronic device 500 can delete content items that satisfy the one or more criteria (e.g., the content items have published or been stored on the electronic device for a period of time that exceeds a threshold (e.g., 7, 14, 21, 30, 60, etc. days)) and update the user interface as illustrated in FIG. 6M. In some embodiments, after deleting the content items that satisfy the one or more criteria, the electronic device 500 can cease display of representations of the deleted content items in the user interface illustrated in FIG. 6M.

In some embodiments, as shown in FIG. 6M, the electronic device 500 can update the user interface to include an indication 636 of a setting to automatically delete content items from device storage when the one or more criteria are met (e.g., a predetermined percentage (e.g., 33%, 40%, 50%, 60%, 75%, etc.) of device storage (or designated device storage) is in use and a threshold time (e.g., 7, 14, 21, 30, 60, etc. days) has passed since the one or more content items were published or downloaded to the electronic device 500). The indication 636 can include an option 640 that, when selected, causes the electronic device 500 to present a settings user interface for changing a setting for removing downloads from the electronic device 500 and an option 638 that, when selected, causes the electronic device 500 to cease displaying the indication 636 without presenting the settings user interface or deleting any content items from device storage. In some embodiments, the electronic device 500 can forgo presenting the indication 636 in response to the user input in FIG. 6L in accordance with a determination that the user has previously selected option 638 a predetermined number of times (e.g., 2, 3, 4, 5, etc. times) when the electronic device 500 presented indication 636 previously. In some embodiments, even if the electronic device 500 forgoes presenting indication 636 in response to the input illustrated in FIG. 6L, the electronic device 500 can still remove one or more items of content (e.g., items of content that published or were downloaded a predetermined threshold time (e.g., 7, 14, 21, 30, 60, etc. days) ago) in response to the input illustrated in FIG. 6L.

As shown in FIG. 6M, the electronic device 500 can detect selection of option 640 (e.g., with contact 603*m*). In some embodiments, in response to detecting selection of option 640 in FIG. 6M, the electronic device 500 can present the settings user interface illustrated in FIG. 6N.

FIG. 6N illustrates a settings user interface that can be displayed by the electronic device 500 in response to the user input illustrated in FIG. 6M. In some embodiments, the settings user interface can be a user interface for changing one or more settings for deleting items of content that satisfy one or more criteria (e.g., the items of content published or were downloaded a predetermined threshold time (e.g., 7, 14, 30, 60, etc. days) ago and a predetermined threshold (e.g., 33%, 40%, 50%, 60%, 75%, etc.) of device storage (or designated device storage) is in use).

In some embodiments, the settings user interface includes options 642*a*-*c* to change the conditions in which the electronic device 500 deletes content items satisfying one or more criteria (e.g., content items that published or were downloaded a threshold time (e.g., 7, 14, 30, 60, etc. days) ago). For example, in response to detecting selection of option 642*a*, the electronic device 500 can be configured to forgo automatically deleting items of content or presenting indication 612 illustrated in FIG. 6K. In some embodiments, in response to detecting selection of option 642*b*, the electronic device 500 can be configured to display the indication 612 illustrated in FIG. 6K in response to one or more criteria being satisfied (e.g., a threshold amount (e.g., 33%, 40%, 50%, 60%, 75%) of device storage (or designated device storage) being in use). In some embodiments, in response to detecting selection of option 642*c*, the electronic device 500 can be configured to automatically delete one or more content items that satisfy one or more criteria (e.g., having been published or downloaded to the electronic device 500 a predetermined threshold time (e.g., 7, 14, 30, 60, etc. days) ago) when one or more criteria are met (e.g., a predetermined threshold (e.g., 33%, 40%, 50%, 60%, 75%, etc.) of device storage (or designated device storage) is in use) without further user input (e.g., without displaying indications 612 or 636 and/or requiring user input directed to indications 612 or 636).

As previously described, in some embodiments, the electronic device 500 deletes items of content for which a predetermined threshold time has passed since the items of content were published or downloaded to the electronic device 500. In some embodiments, the electronic device 500 displays options 646*a*-*d* for selecting the threshold time that should be used when determining which items of content should be deleted. In response to detecting selection of one of the options 646*a*-*d*, the electronic device 500 can be configured to use the threshold time corresponding to the selected option 646*a*-*d* to determine which items of content should be deleted as described herein.

In some embodiments, the user interface illustrated in FIG. 6N can further include an option 648 that, when selected, causes the electronic device 500 to delete one or more content items that satisfy one or more criteria (e.g., the threshold time (e.g., 7, 14, 30, 60, etc. days) has passed since the content items published or were downloaded). The user interface can further include an option 644 that, when selected, causes the electronic device 500 to navigate to a settings user interface including one or more other options related to the content browsing and consumption application. Thus, as described above with reference to FIGS. 6K-6N, in some embodiments, the electronic device 500 can be configured to present a prompt to delete one or more content items from device storage and/or automatically delete one or more content items from device storage.

In some embodiments, the electronic device 500 can display user interfaces for browsing and playing content items included in respective content series (e.g., "series pages"). FIGS. 6O-6Z illustrate examples of series pages according to some embodiments of the disclosure.

In some embodiments, the electronic device 500 can present the series page illustrated in FIG. 6O. The series page can be a user interface for browsing and playing content items included in a respective content series (e.g., "Podcast A"). In this example, Podcast A can be a content series for which all items of content included in the series are accessible to (e.g., all) users regardless of whether or not the users have a paid subscription to Podcast A. In some embodiments, no paid subscription for Podcast A is available. In some embodiments, a paid subscription for Podcast A is available that provides a benefit other than access to paid content items, such as a paid subscription that removes advertisements from the content items in the content series.

As shown in FIG. 6O, the series page for Podcast A can include an indication 652a of the name of the content series, an indication 652b of the channel associated with the content series, an option 652c that, when selected, causes the electronic device 500 to play the most recently published content item in the content series, a description 652d of the content series, metadata 652e related to the content series, and a representation 654a of an item of content in the content series. In some embodiments, the channel associated with the content series is the channel that includes the content series (optionally, in addition to one or more other content series). In some embodiments, if the content series is not affiliated with a channel, the series page may not include an indication 652b of the channel. In some embodiments, the series page for Podcast A can further include an option 650a that, when selected, causes the electronic device 500 to navigate to a previous user interface displayed prior to displaying the user interface illustrated in FIG. 6O, an option 650b that, when selected, causes the electronic device 500 to follow the content series, an option 650c that, when selected, causes the electronic device 500 to present options related to the content series, and an option 652f that, when selected, causes the electronic device 500 to display representations of all of the content items in the content series, such as in the user interface illustrated in FIG. 6Q. In some embodiments, the series page illustrated in FIG. 6O may not include representations of all of the content items in the series, even if the user scrolls the user interface down. Thus, in some embodiments, in response to detecting selection of option 652f, the electronic device 500 can present representations of all of the content items in the series including representations of content items not displayed in the user interface illustrated in FIG. 6O. In some embodiments, in response to detecting selection of the indication 652b of the channel associated with the content series, the electronic device 500 can present the channel page described below with reference to FIGS. 6KK-6LL or a different channel page. In some embodiments, the representation 654a of the content items included in the series of content items can include a publication date 656a, title 656b, description 656c, duration 656e, and image 656f associated with the content item and a selectable option 656d that, when selected, causes the electronic device 500 to play the content item. In some embodiments, in response to detecting selection of representation 654a in a region of representation 654a other than the option 656d to play the content item, the electronic device 500 can display the episode page illustrated in FIG. 6AA or a similar episode page.

In some embodiments, as shown in FIG. 6O, the electronic device 500 can detect movement of contact 603o which can correspond to a request to scroll the series page. In response to the user input in FIG. 6O, the electronic device 500 can update the series page as shown in FIG. 6P.

In some embodiments, the electronic device 500 updates the series page as shown in FIG. 6P in response to the user input illustrated in FIG. 6O. In some embodiments, the series page includes additional representations 654c and 654d of content items in the content series beneath the representation 654a of the content item illustrated in FIG. 6O. In some embodiments, representations 654c and 654d can include similar elements to the elements included in representation 654a. The series page can further include a representation 618c of a "top episode" in the content series. In some embodiments, the "top episodes" include episodes that have the most plays and/or downloads across (e.g., all) users of the content application. The representation 618c of the content item in the "Top Episodes" section can include an image 620c, release date 622c, title 624c, description 626c, and duration 628c associated with the content item. In some embodiments, in response to detecting selection of the representation 618c, the electronic device 500 can present an episode page similar to the episode pages described below with reference to FIGS. 6AA-6CC. In some embodiments, the "Top Episodes" section of the episode page can include additional representations of content items similar to representation 618c that correspond to the other top episodes in the content series. In some embodiments, the series page can include additional content to the content described herein.

In some embodiments, the series page can further include an option 658 to view representations of all of the content items in the content series. In some embodiments, the series page illustrated in FIG. 6P may not include representations of all of the content items in the series, even if the user scrolls the user interface down. Thus, in some embodiments, in response to detecting selection of option 658, the electronic device 500 can present representations of all of the content items in the series including representations of content items not displayed in the user interface illustrated in FIG. 6P. In some embodiments, the electronic device 500 may display option 658 illustrated in FIG. 6P or option 652f illustrated in FIG. 6O rather than displaying both options. As shown in FIG. 6P, the electronic device 500 can detect selection (e.g., with contact 603p) of the option 658 to view representations of all of the items of content in the content series. In response to the user's selection in FIG. 6P, the electronic device 500 can display the user interface illustrated in FIG. 6Q, in some embodiments.

In some embodiments, the electronic device 500 displays the user interface illustrated in FIG. 6Q in response to the user input illustrated in FIG. 6P. The user interface can include a search box 661, representations 654a-c of content items in the content series, and a selectable option 660 that, when selected, causes the electronic device 500 to navigate back to the user interface illustrated in FIG. 6Q. In some embodiments, the text entry field 661 can accept text input (e.g., provided via a soft keyboard, voice input, physical keyboard, or other input device) to search the titles, descriptions, and/or transcripts of all of the content items in the series of content. In some embodiments, representation 654a can be the same as representation 654a described previously with reference to FIG. 6O and representations 654b-c can include similar elements to the elements of representation 654a.

As previously described, in some embodiments, one or more content series can include a first subset of content items (e.g., "free content items" or "free episodes") that can be accessed by (e.g., all) users regardless of whether or not they have a paid subscription to the content series and a second subset of content items (e.g., "paid content items" or "paid episodes") only available to users that have a paid subscription to the content series. FIGS. 6R-6X illustrate an exemplary series page of a content series that includes free and paid content items according to some embodiments.

In some embodiments, the electronic device 500 can present the series page illustrated in FIG. 6R. The series page can be a user interface for browsing and playing content items included in a respective content series (e.g., "Podcast B"). In this example, Podcast B can be a content series that includes first one or more items of content that can be accessible to (e.g., all) users regardless of whether or not they have paid subscriptions to Podcast B and second one or more content items that may only be accessible to users that have a paid subscription to Podcast B. In the example illustrated in FIG. 6R, the user of the electronic device 500 does not have a paid subscription to Podcast B while the electronic device 500 displays the series page for Podcast B. In some embodiments, a paid subscription to the channel associated with Podcast B (e.g., "Channel 2") and/or a paid subscription to Podcast B that does not include access to paid content of other content series may be available.

As shown in FIG. 6R, the series page for Podcast B can include a number of elements similar to the elements of the series page for Podcast A illustrated in FIG. 6O. For example, the series page can include an indication 652*g* of the name of the content series, an indication 652*h* of the channel associated with the content series, an option 652*i* that, when selected, causes the electronic device 500 to play the most recently published content item in the content series, a description 652*j* of the content series, metadata 652*k* related to the content series, and a representation 654*f* of an item of content in the content series. In some embodiments, the channel associated with the content series is the channel that includes the content series (optionally, in addition to one or more other content series). In some embodiments, if the content series is not affiliated with a channel, the series page may not include an indication 652*h* of the channel. In some embodiments, the series page for Podcast B can further include an option 650*d* that, when selected, causes the electronic device 500 to navigate to a previous user interface displayed prior to displaying the user interface illustrated in FIG. 6R, an option 650*e* that, when selected, causes the electronic device 500 to follow the content series, an option 650*f* that, when selected, causes the electronic device 500 to present options related to the content series, and an option 652*f* that, when selected, causes the electronic device 500 to display representations of all of the content items in the content series, such as in a user interface similar to the user interface described above with reference to FIG. 6Q. In some embodiments, in response to detecting selection of the indication 652*h* of the channel associated with the content series, the electronic device 500 can present the channel page described below with reference to FIGS. 6DD-6GG or a different channel page. In some embodiments, the representation 654*f* of the content items included in the series of content items can include elements similar to the elements of representation 654*a*. In some embodiments, in response to detecting selection of representation 654*f* in a region of representation 654*f* other than the option to play the content item, the electronic device 500 can display an episode page similar to one or more of the episode pages illustrated in FIGS. 6AA-6CC.

In some embodiments, in addition to elements similar to the elements of the series page illustrated in FIGS. 6O-6P, the series page illustrated in FIG. 6R can include elements specific to a content series that includes both paid and free content. For example, while the user is not yet subscribed to Podcast B, the electronic device 500 can display an indication 662*a* of the availability of a paid subscription to Podcast B in the series user interface. In some embodiments, the indication 662*a* of the paid subscription can include a selectable option 662*b* that, when selected, can cause the electronic device 500 to initiate a process to start a free trial subscription to Podcast B. In some embodiments, instead of an option to initiate a process to start a free trial of the subscription to Podcast B, the electronic device 500 can instead display an option to initiate a process to purchase a subscription to Podcast B (e.g., without a free trial). In some embodiments, the subscription is a subscription to a channel that includes access to paid content of other content series included in the channel. In some embodiments, the subscription is a subscription to a Podcast B that includes access only to the paid content of Podcast B without including access to paid content of other content series.

In some embodiments, as shown in FIG. 6R, the electronic device 500 can detect movement of contact 603*r* which can correspond to a request to scroll the series page. In response to the user input in FIG. 6R, the electronic device 500 can update the series page as shown in FIG. 6S.

In some embodiments, in response to the scrolling input illustrated in FIG. 6R, the electronic device 500 can display the updated series page illustrated in FIG. 6S. In some embodiments, the series page can include a representation 654*g* of another content item in the content series beneath the representation 654*f*. The representation 654*g* of the content item can include elements similar to the elements of representation 654*a* illustrated in FIG. 6O. In the example of FIG. 6S, the representation 654*f* can correspond to a content item (e.g., "Paid Episode E") that is only accessible to users with a paid subscription to Podcast B and representation 654*g* can correspond to a content item that is accessible to (e.g., all) users regardless of whether or not the user has a paid subscription to Podcast B. In some embodiments, as shown in FIG. 6S, there is no visual indication in either representation 654*f* or 654*g* to indicate the paid or free status of the content items. It should be understood that the tiles of the content items "Paid Episode E" and "Free Episode D" in FIG. 6S represent the text titles of the episode, which, in some embodiments, may not indicate the paid or free status of the content episodes. The use of the "Paid" and "Free" labels in the titles of the example content items are for ease of description only, and should not be interpreted as limiting the scope of the disclosure to including "Paid" and "Free" content labels in representations of items of content. As shown in FIG. 6S, the electronic device 500 can detect selection (e.g., with contact 603*s*) of an option 656*h* to initiate playback of Free Episode D. In some embodiments, in response to the user's selection in FIG. 6S, the electronic device 500 can initiate playback of Free Episode D and display a visual indication that Free Episode D is currently playing on the electronic device 500, as shown in FIG. 6T.

In some embodiments, in response to the user's selection in FIG. 6S, the electronic device 500 can display the user interface illustrated in FIG. 6T and initiate playback of Free Episode D. In some embodiments, the electronic device 500 can display an indication 664*a* of playback of Free Episode D. For example, the indication 664*a* can include an image 666*a* corresponding to Free Episode D, an indication 666*d* of the name of Free Episode D, a pause option 666*c*, and an option 666*d* to skip ahead in the content item (e.g., by 30 seconds). In some embodiments, the electronic device 500 can forgo presenting indication 664*a* while playing the content item. In some embodiments, while playing the content item, the electronic device 500 can display an indication that differs from indication 664*a* illustrated in FIG. 6T. In some embodiments, the electronic device 500 initiates playback of Free Episode D in response to the user input illustrated in FIG. 6S because the user is entitled to access Free Episode D even without a paid subscription to Podcast B.

In some embodiments, without a paid subscription to Podcast B, the user can be unentitled to paid content items included in Podcast B and the electronic device 500 can forgo initiating playback of the paid content items in response to a user input corresponding to a request to initiate playback of the paid content items. In FIG. 6U, for example, the electronic device 500 can detect selection (e.g., with contact 603*u*) of an option 656*i* to initiate playback of Paid Episode E while the user does not have a paid subscription to Podcast B. In response to the user's selection in FIG. 6U, the electronic device 500 can present the user interface illustrated in FIG. 6V without initiating playback of Paid Episode E.

In some embodiments, in response to the input illustrated in FIG. 6U, the electronic device 500 can display the user interface illustrated in FIG. 6V. In some embodiments, the user interface in FIG. 6V can be a user interface for initiating a process to subscribe to the paid subscription to Podcast B. The user interface can include an image 668*a* related to the subscription to Podcast B, an indication 668*b* of the subscription to Podcast B, an option 668*c* that, when selected, causes the electronic device 500 to initiate the process to subscribe to the subscription to Podcast B, and options 668*d* and 650*g* to navigate backwards in the user interface (e.g., back to the series page illustrated in FIG. 6U). In some embodiments, image 668*a* can be a still image corresponding to the content series and/or corresponding to the channel of the content series. In some embodiments, image 668*a* can be video content (e.g., including audio content) corresponding to the content series and/or corresponding to the channel of the content series. For example, the video content can be a video advertisement for the paid subscription. In some embodiments, the image 668*a* can include the likeness of or a video of a person associated with the content series and/or the channel of the content series (e.g., a creator, producer, etc.). In some embodiments, the option 668*c* to initiate the process to subscribe to the subscription to Podcast B can be an option to initiate a free trial to the subscription to Podcast B. In some embodiments, the option 668*c* can be an option to purchase the subscription without a free trial. As shown in FIG. 6V, in some embodiments, the electronic device 500 can detect selection (e.g., with contact 603*v*) of the option 668*c* to initiate the process to subscribe to the subscription to Podcast B. In some embodiments, in response to the user's selection in FIG. 6V, the electronic device 500 can initiate the process to subscribe to the subscription to Podcast B, including collecting payment information (e.g., to renew the subscription after the free trial ends) and requesting confirmation before subscribing.

In some embodiments, the electronic device 500 can update the series page in response to the user enrolling in a paid subscription to Podcast B, as shown in FIG. 6W. In some embodiments, the series page illustrated in FIG. 6W can include the same elements as the series page illustrated in FIG. 6R, except for the differences described herein. In some embodiments, instead of including the indication 662*a* of the paid subscription to Podcast B illustrated in FIG. 6R, the user interface in FIG. 6W can include an indication 652*l* that the user has a paid subscription to Podcast B. In some embodiments, the paid subscription can entitle the user to access the paid content items included in the Podcast B content series. In some embodiments, in addition to gaining access to paid content items in the content series, the subscription to Podcast B can include additional benefits, such as the removal of advertisements from free content items in the Podcast B content series. While the user is subscribed to Podcast B, the electronic device 500 can detect selection (e.g., with contact 603*w*) of the option 656*i* to initiate playback of Paid Episode E.

As shown in FIG. 6X, in response to the user's selection in FIG. 6W, the electronic device 500 can display an indication 664*a* of playback of Paid Episode E and can initiate playback of Paid Episode E in some embodiments.

In some embodiments, the indication 664*a* of playback of Paid Episode E can include an image 666*e* associated with Paid Episode E, an indication 666*f* of the title of Paid Episode E, an option 666*g* to pause playback of Paid Episode E, and an option to skip ahead in Paid Episode E (e.g., by 30 seconds). In some embodiments, the electronic device 500 can display an indication of playback that differs from indication 664*a*. In some embodiments, the electronic device 500 can forgo presenting a visual indication of playback of Paid Episode E while playing Paid Episode E.

Thus, in some embodiments, the electronic device 500 can present a series page as described above with reference to FIGS. 6R-6X for a content series that includes both paid and free content items. In some embodiments, the electronic device 500 can present a series page described below with reference to FIGS. 6Y-6Z for a content series that includes paid content only or paid content with only a few (e.g., 1, 2, 3, etc.) free content items.

In some embodiments, while the user is not subscribed to a paid content series, Podcast C, the electronic device 500 can present the series page illustrated in FIG. 6Y associated with Podcast C. As shown in FIG. 6Y, the series page for Podcast C can include a number of elements similar to the elements of the series page for Podcast A illustrated in FIG. 6O and the series page for Podcast B illustrated in FIG. 6R. For example, the series page can include an indication 652*m* of the name of the content series, an indication 652*n* of the channel associated with the content series, a description 652*q* of the content series, metadata 652*r* related to the content series, and a representation 654*h* of an item of content in the content series. In some embodiments, the series page for Podcast C can further include an option 650*h* that, when selected, causes the electronic device 500 to navigate to a previous user interface displayed prior to displaying the user interface illustrated in FIG. 6Y, an option 650*i* that, when selected, causes the electronic device 500 to follow the content series, an option 650*j* that, when selected, causes the electronic device 500 to present options related to the content series, and an option 652*s* that, when selected, causes the electronic device 500 to display representations of all of the content items in the content series, such as in a user interface similar to the user interface described above with reference to FIG. 6Q. In some embodiments, following the content series (e.g., in response to detecting selection of option 650*i*) can cause the electronic device 500 to present content items from the series in the user's library and/or in the "Up Next" queue described above with reference to FIGS. 6A-6E, which can be an action independent from subscribing to the content series. In some embodiments, subscribing to the content series entitles the user to access paid content items from the content series. In some embodiments, in response to detecting selection of the indication 652*n* of the channel associated with the content series, the electronic device 500 can present the channel page described below with reference to FIGS. 6HH-6JJ or a different channel page. In some embodiments, the representation 654*h* of the content items included in the series of content items can include elements similar to the elements of representation 654*a* described above with reference to FIG. 6R. In some embodiments, in response to detecting selection of representation 654*h* in a region of representation 654*h* other than the option to play the content item, the electronic device 500 can display an episode page similar to one or more of the episode pages illustrated in FIGS. 6AA-6CC.

Additionally, in some embodiments, the series page can include an option 652*o* to play a free content item (e.g., a trial content item) of the content series and an option 652*p* to initiate a process to subscribe to Podcast C. In some embodiments, Podcast C can include one or more free episodes (e.g., the season premiere of the content series, a sample episode of the content series, etc.) and, in response to detecting selection of option 652o, the electronic device 500 can initiate playback of the free content item. In some embodiments, Podcast C does not include any free content items and the electronic device 500 can forgo presenting option 652o. In some embodiments, a free trial can be available for the subscription to Podcast C and the electronic device 500 can present an option 652p to initiate a subscription to the free trial to Podcast C. In some embodiments, a free trial is not available and, instead of presenting the option 652p to initiate a free trial, the electronic device 500 can instead present a similar option to purchase a paid subscription to Podcast C.

In some embodiments, while the user is not subscribed to Podcast C, in response to a request to play one of the paid content items included in Podcast C, the electronic device 500 can forgo initiating playback of the content item and can present a user interface similar to the user interface illustrated in FIG. 6V. For example, the electronic device 500 can detect selection of a playback option included in representation 654h (e.g., if the user scrolls the user interface down to reveal the option) similar to option 646i illustrated in FIG. 6U.

In some embodiments, in response to the user obtaining a paid subscription to Podcast C, the electronic device 500 can update the series page as shown in FIG. 6Z. The user interface illustrated in FIG. 6Z can be the same as the user interface illustrated in FIG. 6Y, in some embodiments, except for the differences noted herein. In some embodiments, as illustrated in FIG. 6z, instead of displaying options 652o and 652p, the electronic device 500 can display an option 653 to play the latest episode in the content series and indications 652t and 652u of the user's subscription to Podcast C. In some embodiments, indication 652t can indicate to the user which subscription entitles the user to access paid content items of the content series. For example, as shown in FIG. 6Z, the indication 652t indicates that the user has a subscription to the channel "The Arts and Entertainment Section," which can be the channel that includes the content series. In some embodiments, if the user instead has a subscription to the individual podcast, the electronic device 500 can present an indication of the subscription to the individual podcast. In some embodiments, the electronic device 500 can display one of indications 652t or 652u without displaying both indications. In some embodiments, the electronic device 500 can display an indication of the user's subscription that is different from either of indications 652t and 652u.

In some embodiments, while the user is subscribed to Podcast C, in response to a request to play one of the paid content items included in Podcast C, the electronic device 500 can initiate playback of the content item and can present an indication of playback of the content item similar to indication 664a illustrated in FIG. 6X. For example, the electronic device 500 can detect selection of a playback option included in representation 654h (e.g., if the user scrolls the user interface down to reveal the option) similar to option 646i illustrated in FIG. 6W.

Thus, in some embodiments, the electronic device 500 can present series pages similar to the series pages described above with reference to FIGS. 6R-6Z. In some embodiments, the electronic device 500 can present episode pages that include information about content items available for playback on the electronic device 500. In some embodiments, the episode pages can vary depending on whether or not the content item requires a paid subscription to access and depending on whether or not the user of the electronic device 500 has a paid subscription that entitles the user to access the content item associated with the episode page.

In some embodiments, the electronic device 500 can display an episode page for a free content item illustrated in FIG. 6AA. The episode page can include an image 651a associated with the content item, metadata 651b associated with the content item, the title 651c of the content item, an indication 651d of the content series of the content item, an option 651e to initiate playback of the content item, and a description 651f of the content item. In some embodiments, in response to detecting selection of the indication 651d of the content series of the content item, the electronic device 500 can present the series page illustrated in FIG. 6O or a different series page. In some embodiments, the episode page can further include an option 650h to navigate back to a previously-presented user interface, an option 650i to add the content item to the user's library, and an option 650j to view additional actions associated with the content item. In some embodiments, the episode page presented by an electronic device 500 can differ from the user interface illustrated in FIG. 6AA.

In some embodiments, the electronic device 500 can display an episode page for a paid content item illustrated in FIG. 6BB while the user does not have a subscription to access the paid content item (e.g., a subscription to access the content series or channel of the content item). In some embodiments, the episode page illustrated in FIG. 6BB can include similar elements as the episode page illustrated in FIG. 6AA, with some additional elements noted herein. For example, the episode page can include an image 651g associated with the content item, metadata 651h associated with the content item, the title 651i of the content item, an indication 651j of the content series of the content item, and a description 651m of the content item. In some embodiments, in response to detecting selection of the indication 651j of the content series associated with the content item, the electronic device 500 can present the series page illustrated in FIG. 6Y or a different series page. In some embodiments, the episode page in FIG. 6BB can further include an option 650h to navigate back to a previously-presented user interface, an option 650i to add the content item to the user's library, and an option 650j to view additional actions associated with the content item. The episode page in FIG. 6BB can further include a selectable option 651k that, when selected, causes the electronic device 500 to initiate a process to obtain a subscription to access the content item and an indication 651l of the subscription required to access the content item. In some embodiments, the indication 651l includes an indication of one or more available subscriptions that entitle the user to access the content item, such as a subscription to a channel that includes the content series of the content item and/or a subscription to the content series of the content item itself. For example, in FIG. 6BB, indication 651l can indicate that a subscription to "The Arts and Entertainment Section" channel is required to access the content item because a subscription to "The Arts and Entertainment Section" is available and will entitle the user to access the content item. In some embodiments, if a subscription to the content series of the content item were available, the electronic device 500 could display an indication similar to indication 651l that states "Requires a subscription to Podcast C". In some embodiments, if a subscription to the content series of the content item and a subscription to the channel of the content series of the content item were available, the electronic device 500 could display an indication similar to indication 651*l* that states "Requires a subscription to Podcast C or The Arts and Entertainment Section". In some embodiments, in response to detecting selection of option 651*k*, the electronic device 500 can initiate a process to start a free trial of the subscription. In some embodiments, if no free trial is available, the electronic device 500 can present an option to initiate a process to purchase the subscription that provides access to the content item. In some embodiments, the episode page presented by an electronic device 500 can differ from the user interface illustrated in FIG. 6BB.

In some embodiments, in accordance with a determination that the user obtains a subscription to access the content item associated with the user interface illustrated in FIG. 6BB, the electronic device 500 can update the episode page as shown in FIG. 6CC. In some embodiments, the episode page in FIG. 6CC can be the same as the episode page in FIG. 6BB except for the differences noted herein. In some embodiments, instead of presenting the option 651*k* to initiate a process to subscribe to the subscription to access the content item before playing the content item in FIG. 6BB, the electronic device 500 can present an option 651*n* to initiate playback of the content item without initiating the process to subscribe to the subscription (e.g., because the user is already subscribed). In some embodiments, instead of presenting the indication 651*l* that a subscription is required to access the content item in FIG. 6BB, the electronic device 500 can display an indication 6510 that the user has the subscription needed to access the content item. In some embodiments, the indication 651*o* includes an indication of the subscription the user has that entitles the user to access the content item, such as a subscription to a channel that includes the content series of the content item and/or a subscription to the content series of the content item itself. For example, in FIG. 6CC, indication 6510 can indicate that the user's subscription to "The Arts and Entertainment Section" entitles the user to access the content item. In some embodiments, if the user instead had a subscription to the content series of the content item, the electronic device 500 could display an indication similar to indication 6510 that states "Included with your subscription to Podcast C". In some embodiments, the electronic device 500 can display an episode page that differs from the episode page illustrated in FIG. 6CC.

As will be described below with reference to FIGS. 6DD-6LL, in some embodiments, the electronic device 500 can present channel pages that include representations of the content series (e.g., podcast series, podcast shows) and content items (e.g., podcast episodes) included in various channels.

In some embodiments, the electronic device 500 can display the channel page illustrated in FIG. 6DD. In some embodiments, the channel page can be associated with "Channel 2". In this example, Channel 2 can be a channel that includes paid content and free content. For example, one or more content series included in Channel 2 can include paid and free content items. As another example, Channel 2 can include a mix of content series that include all free content items, content series with all paid content items, and/or content series with a mix of paid and free content items.

In some embodiments, as shown in FIG. 6DD, the channel page for Channel 2 can include an indication 670*a* of the name of channel 2, representations 672*b-d* of content series included in the channel that are followed by the user, and representations 673*a-c* of content series included in the channel sorted by newest (e.g., most recently premiered or most recently updated) to oldest. In some embodiments, in response to detecting selection of one of the representations 672*b-d* or 673*a-c*, the electronic device 500 can present a series page similar to one of the series pages described above with reference to FIGS. 6O-6Z. In some embodiments, the channel page can further include an option 672*a* that, when selected, causes the electronic device 500 to present representations of all content series of Channel 2 that are followed by the user (e.g., in addition to the content series corresponding to representations 672*b-d*). In some embodiments, the channel page in FIG. 6DD can include an indication 670*b* that the user of the electronic device 500 has a paid subscription to Channel 2 if the user indeed has a paid subscription to Channel 2. In some embodiments, if the user does not have a paid subscription to Channel 2, the electronic device 500 does not display the indication 670*b*. In some embodiments, the channel page can further include an option 650*k* to navigate back to the previously-displayed user interface and an option 650*l* to view additional options for the channel (e.g., sharing options, library options, etc.).

As shown in FIG. 6DD, in some embodiments, the electronic device 500 can detect movement of contact 603*dd*, which can correspond to a request to scroll the channel page. In response to the input illustrated in FIG. 6DD, the electronic device 500 can update the channel page as shown in FIG. 6EE.

As shown in FIG. 6EE, in some embodiments, the channel page can further include representations 672*r-t* of top content series (e.g., ranked by number of playbacks, downloads, user ratings, etc. aggregated for (e.g., all) users who consume content with the content application) of Channel 2 and representations 674*a-b* of top paid content items (e.g., ranked by number of playbacks, downloads, etc. aggregated for (e.g., all) users who consume content with the content application). In some embodiments, in response to detecting selection of one of the representations 672*r-t* of content series, the electronic device 500 can present a series page similar to one of the series pages described above with reference to FIGS. 6O-6Z. The channel page can further include a selectable option 672*u* that, when selected, causes the electronic device 500 to present representations of all of the top content series of Channel 2, in addition to the content series corresponding to representations 672*r-t*.

In some embodiments, representation 674*a* of one of the content items on Channel 2 can include a release date 676*a*, title 676*b*, description 676*c*, duration 676*d*, and image 676*e* associated with the content item and an option 676*f* to initiate playback of the content item. In some embodiments, if the user is not entitled to the content item (e.g., the user does not a have a subscription that provides access to the content item), in response to detecting selection of option 676*f*, the electronic device 500 can present a user interface for initiating a process to subscribe to a subscription that entitles the user to access the content item, such as a user interface similar to the user interface illustrated in FIG. 6V. In some embodiments, in response to detecting selection of the representation 674*a* in a region of the representation 674*a* other than the option 676*f* to initiate playback of the content item, the electronic device 500 can present an episode page corresponding to the content item that is similar to one or more of the episode pages described above with reference to FIGS. 6AA-6CC. In some embodiments, the channel page can further include a representation 674*b* of another top content item of Channel 2, which can include elements similar to the elements of representation 674*a*.

As shown in FIG. 6EE, in some embodiments, the electronic device 500 can detect movement of contact 603*ee* which can correspond to a request to further scroll the channel page. In response to the input illustrated in FIG. 6EE, the electronic device 500 can update the channel page as shown in FIG. 6FF.

In some embodiments, as shown in FIG. 6FF, the channel page can include at least one more representation 674*c* of a top paid content item in the channel below representation 674*b*, representations 674*d-e* of top free content items (e.g., ranked by number of playbacks, downloads, etc. aggregated for (e.g., all) users who consume content with the content application) in the channel, and an option 678*b* that, when selected, causes the electronic device 500 to display representations of additional top free content items of the channel. In some embodiments, the representation 674*c* of a top paid content item in the channel and the representation 674*d* of a top free content item in the channel can include similar elements to the elements of representation 674*a* described above with reference to FIG. 6EE. In some embodiments, other than being displayed in different sections of the user interface, the representations 674*d*-674*e* of the top free content items and the representations 674*a-b* of the top paid content items can look the same as each other (e.g., can include the same elements).

As shown in FIG. 6FF, in some embodiments, the electronic device 500 can detect movement of contact 603*ff* which can correspond to a request to further scroll the channel page. In response to the input illustrated in FIG. 6FF, the electronic device 500 can update the channel page as shown in FIG. 6GG.

As shown in FIG. 6GG, in some embodiments, the channel page can further include additional representations 674*e-f* of top free content items in the channel. In some embodiments, representations 674*e-f* can include similar elements to the elements of representation 674*a* described above with reference to FIG. 6EE. In some embodiments, while the user is not subscribed to Channel 2, the channel page can include an indication 680*a* of a subscription that is available to Channel 2 that can entitle the user to access paid content items included in content series of the channel and/or additional benefits (e.g., ad-free listening, early release of episodes, etc.). In some embodiments, the indication 680*a* can include a selectable option 680*b* that, when selected, causes the electronic device 500 to initiate a process to subscribe to the channel. In some embodiments, if a free trial of the subscription is available, initiating the process to subscribe to the channel can initiate a process to start a free trial of the subscription. In some embodiments, if a free trial is not available, the electronic device 500 can present an option to initiate a process to purchase the subscription to the channel. In some embodiments, if the user already has a subscription to Channel 2, the channel page does not include indication 680*a*.

In some embodiments, the electronic device 500 can display a channel page for a channel that only includes paid content items (or only includes series in which all but a few (e.g., 1, 2, 3, etc.) free sample content items require a subscription to access) according to FIGS. 6HH-6JJ. In some embodiments, the channel page illustrated in FIGS. 6HH-6JJ can include some elements similar to the elements of the channel page described above with reference to FIGS. 6DD-6GG, as described below.

In some embodiments, as shown in FIG. 6HH, the channel page for a paid content item channel can include an indication 670*c* of the name of the channel. In the example in FIGS. 6HH-6JJ, the name of the channel can be "The Arts and Entertainment Section". In some embodiments, a respective entity (e.g., a production company, news outlet, media company, publisher, studio, network, etc.) can have a plurality of channels. For example, a newspaper can have multiple channels, such as The Arts and Entertainment Section channel, a Sports channel, a Politics channel, and the like.

In some embodiments, as shown in FIG. 6HH, if the user of the electronic device 500 has a paid subscription to The Arts and Entertainment Section, the channel page can include an indication 670*d* of the user's subscription and representations 672*j*-1 of content series followed by the user. In some embodiments, if the user does not have a paid subscription to The Arts and Entertainment Section, the electronic device 500 can forgo presenting the indication 670*d* of the user's subscription. In some embodiments, if the user does not have a paid subscription to The Arts and Entertainment Section, the user may not be following any content series of The Arts and Entertainment Section, in which case the electronic device 500 may not display representations 672*j*-1 or the option 672*i* to view representations of all of the content series of the channel that are followed by the user. In some embodiments, the channel page can further include representations 673*d-f* of new content series on the channel. In some embodiments, representations 672*j*-1 can be similar to representations 672*b-d* described above with reference to FIG. 6DD and representations 673*j*-1 can be similar to representations 673*a-c* described above with reference to FIG. 6DD. As shown in FIG. 6HH, in some embodiments, the channel page can further include an option 650*m* to navigate back in the user interface to the previously displayed user interface and an option 650*n* to view additional options for the channel (e.g., sharing options, library options, etc.).

As shown in FIG. 6HH, in some embodiments, the electronic device 500 can detect movement of contact 603*hh*, which can correspond to a request to scroll the channel page. In some embodiments, in response to the input illustrated in FIG. 6HH, the electronic device 500 can update the channel page as shown in FIG. 6II.

In some embodiments, as shown in FIG. 6II, the channel page can further include representations 672*e-f* and 672*q* of top content series of the channel (e.g., ranked by number of playbacks, downloads, user ratings, etc. aggregated for (e.g., all) users who consume content with the content application), an option 672*g* to view representations of all of the top content series of the channel in addition to the content series corresponding to representations 672*e-f* and 672*q*, representations 674*g-h* of top paid content items (e.g., ranked by number of playbacks, downloads, etc. aggregated for (e.g., all) users who consume content with the content application) of the channel, and an option 678*c* to view representations of all top paid content items of the channel in addition to the content items corresponding to representations 674*g-h*. In some embodiments, representations 672*e-f* and 672*q* in FIG. 6II can be similar to representations 672*r-t* in FIG. 6EE and representations 674*g-h* in FIG. 6II can be similar to representations 674*a-b* in FIG. 6EE.

As shown in FIG. 6II, in some embodiments, the electronic device 500 can detect movement of contact 603*ii*, which can correspond to a request to further scroll the channel page. In some embodiments, in response to the input illustrated in FIG. 6II, the electronic device 500 can update the channel page as show in FIG. 6JJ.

In some embodiments, as shown in FIG. 6JJ, the channel page can further include an additional representation 674*i* of a top paid content item included in the channel. In some embodiments, the representation 674*i* can include similar elements to the elements of representation 674*a* described above with reference to FIG. 6EE. In some embodiments, if the user does not have a paid subscription to The Arts and Entertainment Section, the channel page can further include an indication 680*c* of the subscription that is available, which can include an option 680*d* to initiate a process to subscribe to the subscription. In some embodiments, representation 680*c* and option 680*d* in FIG. 6JJ can be similar to representation 680*a* and option 680*b* described above with reference to FIG. 6GG. If the user is already subscribed to The Arts and Entertainment Section, the channel page does not include indication 608*c* in some embodiments.

In some embodiments, the electronic device 500 can display a channel page for a channel that only includes free content items according to FIGS. 6KK-6LL. In some embodiments, the channel page illustrated in FIGS. 6KK-6LL can include some elements similar to the elements of the channel pages described above with reference to FIGS. 6DD-6JJ, as described below.

In some embodiments, as shown in FIG. 6KK, the channel page for a free content item channel can include an indication 670*e* of the name of the channel. In the example in FIGS. 6KK-6LL, the name of the channel can be "Channel 1". In some embodiments, the channel page can include representations 672*n-p* of content series included in Channel 1 that are followed by the user that can be similar to representations 672*b-d* described above with reference to FIG. 6DD and an option 672*m* to view representations of all content series of Channel 1 followed by the user. In some embodiments, the channel page can further include representations 673*g-i* of new content series on the channel. In some embodiments, representations 673*g-i* in FIG. 6KK can be similar to representations 673*a-c* described above with reference to FIG. 6DD. As shown in FIG. 6KK, in some embodiments, the channel page can further include an option 650*m* to navigate back in the user interface to the previously displayed user interface and an option 650*n* to view additional options for the channel (e.g., sharing options, library options, etc.).

As shown in FIG. 6KK, in some embodiments, the electronic device 500 can detect movement of contact 603*kk*, which can correspond to a request to further scroll the channel page. In some embodiments, in response to the input illustrated in FIG. 6KK, the electronic device 500 can update the channel page as shown in FIG. 6LL.

In some embodiments, as shown in FIG. 6LL, the channel page can further include representations 672*v-x* of top content series of the channel (e.g., ranked by number of playbacks, downloads, user ratings, etc. aggregated for (e.g., all) users who consume content with the content application), an option 672*h* to view representations of all of the top content series of the channel in addition to the content series corresponding to representations 672*v-x*. In some embodiments, representations 672*v-x* in FIG. 6LL can be similar to representations 672*r-t* in FIG. 6EE. In some embodiments, the channel page can further include representations 674*j-k* of the top episodes (e.g., ranked by the number of playbacks, downloads, etc. aggregated for (e.g., all) users who consume content with the content application). In some embodiments, representations 674*j-k* can include elements similar to the elements of representation 674*a* described above with reference to FIG. 6EE.

Thus, as described above with reference to FIGS. 6DD-6LL, in some embodiments, the electronic device 500 can display channel pages including representations of content items and content series of various channels of the content application. As shown in FIG. 6LL, in some embodiments, the electronic device 500 can detect selection of the "Search" navigation option 602*d*. In response to the user's selection in FIG. 6LL, in some embodiments, the electronic device 500 can present the user interface illustrated in FIG. 6MM.

In some embodiments, the electronic device 500 can present a search user interface according to FIG. 6MM. The search user interface can include a search box 680 and representations 682*a-f* of various categories of content items available for access (e.g., included in the content application). In response to detecting selection of one of the representations 682*a-f* of categories of content items, the electronic device 500 can present representations of content items, content series, and/or channels included in the category. As shown in FIG. 6MM, the electronic device 500 can detect selection (e.g., with contact 603*mm*) of the search box 680, for example. In some embodiments, in response to detecting the selection of search box 680, the electronic device 500 can accept a text entry input (e.g., via voice control, a soft keyboard, a physical keyboard, or another input device) for searching.

In some embodiments, in FIG. 6NN, the electronic device 500 can display the search box 680 including a search term (e.g., "Arts") entered by the user. In some embodiments, the electronic device 500 can display search results corresponding to the user's search term, which can include content items, channels, and/or content series. For example, in FIG. 6NN, the electronic device 500 can display representations 684*a*-684*c* of content series that match the search query and representations 688*a-c* of channels that match the search query, as well as an option 686*a* to view representations of all of the content series matching the query and an option 686*b* to view representations of all of the channels matching the query. In some embodiments, the representations 688*a-c* of the channels can include indications (e.g., within the images of the representations 688*a-c*) of the number of content series included in each channel. In some embodiments, in response to detecting selection of one of the representations 684*a-c* of a content series, the electronic device 500 can display a series page corresponding to the selected representation that can be similar to one or more of the series pages described above with reference to FIGS. 6O-6Z. In some embodiments, in response to detecting selection of one of the representations 688*a-c* of a channel, the electronic device 500 can display a channel page corresponding to the selected representation that can be similar to one or more of the channel pages described above with reference to FIGS. 6DD-6LL.

As shown in FIG. 6NN, in some embodiments, the electronic device 500 can detect movement of contact 603*nn*, which can correspond to a request to scroll the user interface. In response to the input illustrated in FIG. 6NN, the electronic device 500 can update the user interface as shown in FIG. 6OO.

In some embodiments, as shown in FIG. 6OO, the search results can further include representations 690*a*-690*b* of content items that match the search query and an option 686*c* that, when selected, causes the electronic device 500 to present representations of all of the content items that match the search query. The representations 690*a-b* can include representations of all free content items, representations of all paid content items, or a mix of free and paid content items. In some embodiments, representations of free and paid content items are displayed in the same manner without a visual indication of the content items free or paid status. In some embodiments, representation 690*a* can include an indication 692*a* of a release date, an indication 692*b* of a title, a description 692, a duration 692*e*, and an image 692*f* associated with an episode that matches the search query. In some embodiments, the representation 690*a* can further include an option 692*d* that, when selected, causes the electronic device 500 to initiate playback of the content item if the user is entitled to the content item. In some embodiments, if the user is not entitled to the content item, the electronic device 500 can display a user interface for subscribing to a subscription to access the content item that can be similar to the user interface described above with reference to FIG. 6V in response to selection of option 692*d*. In some embodiments, in response to detecting selection of representation 690*a* in a region of representation 690*a* other than option 692*d*, the electronic device 500 can present an episode page corresponding to the content item that can be similar to one or more of the episode pages described above with reference to FIGS. 6AA-6CC.

FIG. 7 is a flow diagram illustrating a method of presenting representations of content and providing access to content in accordance with some embodiments of the disclosure. The method 700 is optionally performed at an electronic device such as device 100, device 300, device 500 as described above with reference to FIGS. 1A-1B, 2-3, 4A-4B and 5A-5H. Some operations in method 700 are, optionally combined and/or order of some operations is, optionally, changed.

As described below, the method 700 provides ways in which an electronic device presents user interfaces for browsing and presenting content. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed at an electronic device in communication with a display generation component and one or more input devices (e.g., a mobile device (e.g., a tablet, a smartphone, a media player), a computer (e.g., a desktop computer, a laptop computer), or a wearable device (e.g., a watch, a head-mounted device). In some embodiments, the display generation component is a display integrated with the electronic device (optionally a touch screen display) and/or an external display such as a monitor, projector, television, etc.).

In some embodiments, such as in FIG. 6A the electronic device displays (702), via the display generation component, a user interface that includes a plurality of representations (e.g., 604*a-b*) of suggested content items from a first collection of content items and a second collection of content items, the second collection of content items containing content items of a first type and content items of a second type (704). In some embodiments, the content items are audio content items (e.g., music, podcasts, audiobooks, etc.). In some embodiments, the first collection and second collection of content items are series of content items. For example, the first collection of content items are podcast episodes from a first podcast show and the second collection of content items are podcast episodes from a second podcast show. In some embodiments, the plurality of representations of suggested content items include items of content from collections of content to which the user is subscribed in order of the release date of all of the items of content in the plurality of representations of suggested content. In some embodiments, the plurality of representations of suggested content is limited to a threshold number (e.g., 5, 10, 15, 20, 30, 40, etc. items of content) and as new items of content are added, the oldest items of content in the plurality of representations of suggested content are removed. In some embodiments, each respective item of content is removed from the plurality of representations of suggested content when the user plays the entire content of the respective item of content. In some embodiments, the representations of suggested content items are selectable to initiate playback of the selected suggested content item. In some embodiments, the electronic device automatically adds items of content from collections that the user follows to a library of content of the electronic device and/or to the plurality of representations of suggested content items. In some embodiments, all items of content in a first respective collection of content items are accessible via a free subscription (or without a subscription), some items of content in a second respective collection of content items are accessible via a free subscription (or without a subscription) and some items of content in the second respective collection of content items are only available via a paid subscription, and all items of content in a third respective collection of content items are only available via a paid subscription. In some embodiments, the electronic device is able to enroll in paid subscriptions to single collections of content items (e.g., podcast series) or to a bundled collection of collections of content items (e.g., provided by a channel or a producer of the collections of content items in the bundled collection). For example, when a user subscribes to a podcast, the electronic device automatically saves episodes of the podcast to the user's podcast library when each episode of the podcast is released and/or adds those episodes to the list of suggested episodes. In some embodiments, when a user is subscribed via a free subscription to a quantity (e.g., a collection of content items, a collection of collections of content items, etc.) that includes content items that are accessible for free, the user is optionally referred to as "following" the quantity. In some embodiments, when a user is subscribed via a paid subscription to a quantity (e.g., a collection of content items, a collection of collections of content items, etc.), the user is optionally referred to as "subscribed" to the quantity.

In some embodiments, such as in FIG. 6B, in accordance with a determination that a first content item from the first collection of content items satisfies one or more criteria (e.g., the item of content is recently released, the user is subscribed to the collection of content items, the user has listened to an item of content in the collection of content items prior to the content item), the plurality of representations of content items includes a first representation (e.g., 604*c*) of the first content item from the first collection of content items (706). In some embodiments, the first content item included in the first collection of content items is the first type of content (e.g., an item of content that is accessible to (e.g., all) users irrespective of whether or not the users have a paid subscription to the first collection of content items). For example, the first content item included in the first collection of content items is a free episode of a podcast series. In some embodiments, the first content item included in the first collection of content items is the second type of content that the user has access to (e.g., a paid item of content to which the user of the electronic device is entitled). For example, the user of the electronic device has a paid subscription to the first collection of content items and the first content item included in the first collection of content items is a paid episode of a podcast series.

In some embodiments, such as in FIG. 6C, in accordance with a determination that a first content item of the first type (e.g., the first type of content items is content items that are available to (e.g., all) users for free, independent of whether or not the users have a paid subscription to the collection that includes the first content item) from the second collection of content item satisfies the one or more criteria (e.g., the item of content is recently released, the user is subscribed to the collection of content items, the user has listened to an item of content in the collection of content items prior to the content item), the plurality of representations of content items includes a first representation (e.g., 604*d*) of the first content item from the second collection of content items (e.g., independent of any additional determination that the user is entitled to the first content item of the first type) (706). In some embodiments, the plurality of representations of content items includes a representation of the first content item of the first type included in the second collection of content items irrespective of whether or not the user has a paid subscription to the second collection of content items. For example, the first content item of the first type included in the second collection of content items is a free episode of a podcast series that includes free episodes and paid episodes.

In some embodiments, such as in FIG. 6E, in accordance with a determination that a second content item of a second type (e.g., the second type of content items is content items that are available only to users with a paid subscription to the collection that includes the second content item) from the second collection of content items satisfies the one or more criteria (708) (e.g., the item of content is recently released, the user is subscribed to the collection of content items, the user has listened to an item of content in the collection of content items prior to the content item), in accordance with a determination that the user is entitled to access the second content item of the second type (e.g., the user has a subscription that enables the user to access the second type of content item in the second collection of content items), the plurality of representations of content items includes a second representation (e.g., 604*e*) of the second content item from the second collection of content items (710). In some embodiments, while the user has a paid subscription to the second collection of content items that entitles the user to access paid items of content in the second collection, the electronic device includes a representation of the second content item in the plurality of representations of suggested content. For example, while a user has a paid subscription to a podcast series, the electronic device includes representations of paid episodes of the podcast in the plurality of representations of suggested content.

In some embodiments, such as in FIG. 6D, in accordance with a determination that a second content item of a second type (e.g., the second type of content items is content items that are available only to users with a paid subscription to the collection that includes the second content item) from the second collection of content items satisfies the one or more criteria (708) (e.g., the item of content is recently released, the user is subscribed to the collection of content items, the user has listened to an item of content in the collection of content items prior to the content item), in accordance with a determination that the user is not entitled to access the second content item of the second type (e.g., the user does not have the subscription that enables the user to access the second type of content item in the second collection of content items), the plurality of representations of content items does not include the second representation of the second content item from the second collection of content items (712). In some embodiments, while the user does not have a paid subscription to the second collection of content items that entitles the user to access paid items of content in the second collection (e.g., the user is "following" the second collection of content items without having a paid subscription to the second collection of content items), the electronic device does not include a representation of the second content item in the plurality of representations of suggested content. For example, while a user does not have a paid subscription to a podcast series, the electronic device does not include representations of paid episodes of the podcast in the plurality of representations of suggested content but does include representations of free episodes of the podcast in the plurality of representations. In some embodiments, the representations of content items included in the plurality of representations of content items are selectable to initiate playback of the content item corresponding to the selected representation. In some embodiments, the first type of content items are content items that are available for free. In some embodiments, a user is able to access content items of the first type without a subscription to the second collection of content items or with a free subscription to (e.g., "following") the second collection of content items. In some embodiments, the second type of content items are content items that are only available to users that have a paid subscription to the collection of content items associated with the content items. For example, the second collection of content items is a podcast series that includes a subset of free episodes accessible to (e.g., all) users irrespective of whether the users have a paid subscription to the podcast series and a subset of paid episodes accessible only to users that have a paid subscription to the podcast series.

The above-described manner of forgoing including representations of items of content to which the user is not entitled in the plurality of representations of recommended items of content provides an efficient way of locating items of content to which the user has access, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 6Y, a third collection of content items includes content items of the second type and does not include content items of the first type (e.g., all of the content items in the third collection of content items require a paid subscription to the third collection of content items to be accessible to the user). In some embodiments, a user is not able to "follow" (e.g., via a free subscription) the third collection of content items, because the third collection of content items does not include any content items that are available without a paid subscription.

In some embodiments, such as in FIG. 6E, in accordance with a determination that a first content item of the second type from the third collection of content items satisfies the one or more criteria (e.g., the item of content is recently released, the user has listened to an item of content in the collection of content items prior to the content item), in accordance with a determination that the user is entitled to access the third collection of content items (e.g., the user has a paid subscription to the third collection of content items), the plurality of representations of content items includes a first representation (e.g., 604*e*) of the first content item from the third collection of content items (e.g., the electronic device displays recommended content from the third collection of content items in the plurality of representations if the user has a paid subscription to the third collection of content items. In some embodiments, the first representation of the first content item is selectable to initiate playback of the first content item included in the third collection of content items.

In some embodiments, such as in FIG. 6D, in accordance with a determination that a first content item of the second type from the third collection of content items satisfies the one or more criteria (e.g., the item of content is recently released, the user has listened to an item of content in the collection of content items prior to the content item), in accordance with a determination that the user is not entitled to access the third collection of content items (e.g., the user does not have a paid subscription to the third collection of content items), the plurality of representations (e.g., 604d-604c) of content items does not include the first representation of the first content item from the third collection of content items (e.g., the electronic device does not display recommended content from the third collection of content items in the plurality of representations if the user does not have a paid subscription to the third collection of content items). In some embodiments, if a content item from a collection of content items that includes content items of the first type and does not include content items of the second type (e.g., all of the content items in the collection of content items are available without a paid subscription to the collection of content items) satisfies the one or more criteria, the electronic device does display recommended content from that collection of content items in the plurality of representations.

The above-described manner of forgoing including representations of items of content to which the user is not entitled in the plurality of representations of recommended items of content provides an efficient way of locating items of content to which the user has access, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, such as in FIG. 6S, the electronic device displays, via the display generation component, a user interface for the second collection of content items. In some embodiments, a user interface for the second collection of content items that includes one or more of the title/name of the second collection of content items, a description of the second collection of content items, and representations of content items included in the second collection of content items that are selectable to initiate playback of the selected content item.

In some embodiments, such as in FIG. 6S, the user interface for the second collection of content items includes a respective plurality of representations (e.g., 654f-654g) of the content items from the second collection of content items including a first respective representation (e.g., 654g) of a first respective content item of the first type and a second respective representation (e.g., 654f) of a second respective content item of the second type from the second collection of content items. In some embodiments, the user interface includes an episode list for the second collection of content items that includes representations of the episodes included in the second collection of content items. In some embodiments, the episode list includes one or more episodes that are available without a paid subscription to the second collection of content items, and one or more episodes that are available only with a paid subscription to the second collection of content items. In some embodiments, the episodes in the list of episodes are selectable to initiate playback of the selected episode, if the user is entitled to access the selected episode.

In some embodiments, such as in FIG. 6S, each representation (e.g., 654f-g) of a content item is displayed without a visual indication regarding whether the user is entitled to access the content item. For example, in some embodiments, the episodes in the list of episodes are not displayed differently depending on whether the user is entitled to access those episodes (e.g., episodes that the user is entitled to access (e.g., for free) are displayed in the same manner as episodes that the user is not entitled to access). In some embodiments, episodes of the first and second type in the list of episodes are displayed with one or more of: title/name information for the episode, a description of the episode, artwork for the episode, length of the episode, and a selectable option that is selectable to initiate playback of the selected episode. In some embodiments, episodes of the first and second type in the list of episodes are not displayed with any badges or other indication that the user can/cannot access the respective episodes.

The above-described manner of displaying entitled and unentitled content items in the same manner provides consistent user interaction with the system, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently, while reducing errors in usage.

In some embodiments, the user is entitled to access the second content item of the second type via a subscription to the second collection of content items, such as in FIG. 6Z, except via a subscription to Podcast C rather than a subscription to The Arts and Entertainment Section channel. For example, the user has a paid subscription to the second collection of content items, which gives the user entitlement to access the content items of the second type included in the second collection of content items.

The above-described manner of providing entitlement to content via a subscription to the collection of content items of which the content is a part provides a quick and efficient manner of providing entitlement to multiple items of content, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the user is entitled to access the second content item of the second type via a subscription to a respective plurality of collections of content items which includes the second collection of content items, such as in FIG. 6Z (e.g., via the subscription to The Arts and Entertainment Section channel). For example, the user has a paid subscription to a particular collection of multiple collections of content items (e.g., a "channel" that includes a plurality of collections of content items). In some embodiments, the user does not otherwise have an individual subscription to the second collection of content items itself, but rather only has a subscription to the respective plurality of collections of content items. In some embodiments, a subscription to the respective plurality of collection of content items (e.g., "channel") gives the user entitlement to access the content items of the second type included in the plurality of collections of content items included in the subscribed-to channel. In some embodiments, the user would have access to the content items of the first type included in the plurality of collections of content items included in the channel (if any) without a paid subscription to the channel (e.g., if the user were merely "following" the channel rather than being subscribed to the channel).

The above-described manner of providing entitlement to content via a subscription to a channel provides a quick and efficient manner of providing entitlement to multiple collections of content items, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIGS. 6BB-6CC, the electronic device 500 displays, via the display generation component, a respective user interface associated with a respective content item included in a respective collection of content items (e.g., a user interface dedicated to a particular episode included in a podcast (e.g., a collection of episodes). The user interface optionally includes information about the episode such as one or more of the date of release/availability of the episode, an image associated with the episode, a description of the episode and/or a playback option that is selectable to initiate playback of the episode. In some embodiments, the respective content item is a content item of the second type.

In some embodiments, such as in FIG. 6CC, in accordance with a determination that the user is entitled to access the respective content item (e.g., the user has a paid subscription to the podcast and/or to a channel (e.g., a collection of podcasts) that includes the podcast), the respective user interface includes a visual indication (e.g., 651o) of a respective subscription that provides the entitlement of the user to access the respective content item (e.g., the visual indication is displayed in association with (e.g., below, above, adjacent to, etc.) the playback option, and the indication provides a textual description of the subscription via which the user has entitlement to access the episode). For example, the textual indication recites "Included with subscription to Podcast A" where the episode is an episode in Podcast A.

In some embodiments, such as in FIG. 6BB, in accordance with a determination that the user is not entitled to access the respective content item (e.g., the user does not have a paid subscription to the podcast and/or to a channel (e.g., a collection of podcasts) that includes the podcast), the respective user interface includes a visual indication (e.g., 651*l*) that a subscription is required to access the respective content item (e.g., the visual indication is displayed in association with (e.g., below, above, adjacent to, etc.) the playback option (e.g., in the same location in the user interface as the indication that indicates entitlement, when applicable, and the indication provides a textual description of the subscription required to access the episode. For example, the textual indication recites "Requires a subscription to Podcast A" where the episode is an episode in Podcast A).

The above-described manner of providing a visual indication related to entitlement provides a quick and efficient manner of conveying entitlement and/or a requirement for entitlement, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in accordance with a determination that the user is entitled to access the respective content item via a subscription to the respective collection of content items (e.g., the user is subscribed directly to the podcast that includes the episode, rather than being subscribed to the channel that includes the podcast that includes the episode), the visual indication of the respective subscription is a visual indication of the subscription to the respective collection of content items, such as an indication similar to indication 651o in FIG. 6CC, except indicating a subscription to Podcast C instead of indicating a subscription to The Arts and Entertainment Section channel (e.g., the visual indication includes text that recites "Included with subscription to Podcast A" where the episode is an episode in Podcast A).

In some embodiments, such as in FIG. 6CC, in accordance with a determination that the user is entitled to access the respective content item via a subscription to a respective plurality of collections of content items (e.g., the user is subscribed to a channel that includes that podcast that includes the episode in question, rather than being directly subscribed to the podcast that includes the episode in question), including the respective collection of content items, the visual indication (e.g., 651o) of the respective subscription is a visual indication of the subscription to the respective plurality of collections of content items (e.g., different from the visual indication of the subscription to the respective collection of content items. For example, the visual indication includes text that recites "Included with subscription to Channel A" where the episode is an episode in Podcast A, and Podcast A is one of multiple podcasts included in Channel A).

The above-described manner of providing a visual indication of subscription to the collection of content items or the higher level collections of collections of content items provides a quick and efficient manner of conveying the exact manner in which the user has entitlement to the content item, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIGS. 6Y-6Z, the electronic device 500 displays, via the display generation component, a respective user interface associated with a respective collection of content items (e.g., a user interface dedicated to the collection of content items (e.g., as opposed to a user interface dedicated to a particular content item in the collection of content item)). In some embodiments, the user interface includes information about the collection of content items such as one or more of the name/title of the collection of content items, information about the creators of the collection of content items, an image associated with the collection of content items, a description of the collection of content items, and/or a listing of content items included in the collection of content items that are selectable to initiate playback of the selected content item in the collection of content items. In some embodiments, the respective collection of content items includes at least one content item of the second type. In some embodiments, the respective collection of content items includes only content items of the second type, and no content items of the first type.

In some embodiments, such as in FIG. 6Z, in accordance with a determination that the user is entitled to access at least one content item of the second type included in the respective collection of content items (e.g., the user is subscribed to the respective collection of content items, and/or the user is subscribed to a channel that includes that respective collection of content items), the respective user interface includes a respective visual indication (e.g., 652*u*) that the user is entitled to access at least one content item of the second type included in the respective collection of content items (e.g., a badge or other visual indication that indicates subscription/entitlement, such as a badge that indicates "Subscriber Edition") In some embodiments, the visual indication is displayed right above the list of content items included in the respective collection of content items (e.g., below the description of the respective collection of content items).

In some embodiments, such as in FIG. 6Y, in accordance with a determination that the user is not entitled to access at least one content item of the second type included in the respective collection of content items (e.g., the user is not subscribed to the respective collection of content items, and/or the user is not subscribed to a channel that includes that respective collection of content items), the respective user interface does not include the respective visual indication (e.g., indication 652*u* in FIG. 6Z).

The above-described manner of providing a visual indication of subscription to the collection of content items provides a quick and efficient manner of conveying whether the user has entitlement to access the respective collection of content items, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently (e.g., by avoiding unnecessary inputs provided by the user for subscribing to the respective collection of content items when the user is already subscribed, or avoiding unnecessary inputs provided by the user for accessing content items when the user is not subscribed).

In some embodiments, the electronic device 500 displays, via the display generation component, a respective representation (e.g., 654*f*) of a respective content item included in a respective collection of content items (e.g., in a list of episodes/content items in a user interface dedicated to the respective collection of content items, or as a suggested content item in a user interface not dedicated to the respective collection of content items), wherein the respective content item is a content item of the second type.

In some embodiments, such as in FIG. 6U, while displaying the respective representation (e.g., 654*f*) of the respective content item, detecting, via the one or more input devices, an input corresponding to selection of the respective representation (e.g., 654*f*) of the respective content item (e.g., a tap input detected at a location corresponding to the respective representation).

In some embodiments, in response to detecting the input corresponding to the selection of the respective representation (e.g., 654*f* in FIG. 6U), in accordance with a determination that the user is not entitled to access the respective content item (e.g., the user does not have a subscription to the respective collection of content items or to a channel including the respective collection of content items), the electronic device 500 displays, via the display generation component, a respective user interface that includes playing content (e.g., 668*a*) of a person associated with the respective content item, such as in FIG. 6V (e.g., without playing the respective content item). For example, the user interface displayed when the user is not entitled to access the respective content item includes audio and/or video of a creator, participant, etc. of the respective collection of content items in which the person is providing reasons that the user should subscribe to the respective collection of content items and/or a channel that includes the respective collection of content items. In some embodiments, the respective user interface includes a selectable option that is selectable to initiate a process to subscribe to the respective collection of content items and/or a channel that includes the respective collection of content items. In some embodiments, if the user is entitled to access the respective content item, the electronic device initiates playback of the respective content item without displaying the respective user interface.

The above-described manner of displaying the respective user interface provides a quick and efficient manner of providing information to the user about the respective collection of content items when not entitled and/or a means of obtaining entitlement, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently (e.g., by avoiding the need for additional input from the user to access the provided information about the respective collection of content items).

In some embodiments, such as in FIG. 6R, the electronic device 500 displays, via the display generation component, a respective user interface associated with a respective collection of content items that includes content items of the first type and content items of the second type (e.g., a user interface dedicated to the collection of content items (e.g., as opposed to a user interface dedicated to a particular content item in the collection of content item)). In some embodiments, the user interface includes information about the collection of content items such as one or more of the name/title of the collection of content items, information about the creators of the collection of content items, an image associated with the collection of content items, a description of the collection of content items, and/or a listing of content items included in the collection of content items that are selectable to initiate playback of the selected content item in the collection of content items.

In some embodiments, such as in FIG. 6R, the respective user interface includes a first selectable option (e.g., 650*e*) that is selectable to automatically provide the user with information about the content items of the first type included in the respective collection of content items without providing the user with access to the content items of the second type included in the respective collection of content items (e.g., via a free subscription to the respective collection of content items). For example, because the respective collection of content items includes content items of the first type, the user is able to "follow" the respective collection of content items such that information about content items of the first type that become available in the respective collection of content items will be displayed by the electronic device when those content items become available (e.g., in a list of suggested content items, such as the in the plurality of representations of suggested content items). In some embodiments, when the user "follows" the respective collection of content items without a paid subscription to the respective collection of content items, the electronic device will not display information (e.g., in a list of suggested content items, such as the in the plurality of representations of suggested content items) about content items of the second type included in the respective collection of content items when those content items become available.

In some embodiments, such as in FIG. 6R, the respective user interface includes a second selectable option (e.g., 662*b*), separate from the first selectable option (e.g., 650*e*), that is selectable to initiate a process to automatically provide the user with information about the content items of the first type included in the respective collection of content items and provide the user with access to the content items of the second type included in the respective collection of content items (e.g., via a paid subscription to the respective collection of content items). For example, when the user is subscribed to the respective collection of content items via a paid subscription, the electronic device displays information about both content items of the first type and the second type that become available in the respective collection of content items when those content items become available (e.g., in a list of suggested content items, such as the in the plurality of representations of suggested content items). In some embodiments, if the respective collection of content items included only content items of the first type and no content items of the second type, the respective user interface would include the first selectable option but not the second selectable option. In some embodiments, if the respective collection of content items included only content items of the second type and no content items of the first type, the respective user interface would include the second selectable option but not the first selectable option.

The above-described manner of including different selectable options in the respective user interface provides a quick and efficient manner of obtaining the appropriate level of access to the respective collection of content items, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIG. 6Q, the electronic device 500 displays, via the display generation component, a respective user interface associated with a respective collection of content items (e.g., a user interface dedicated to the collection of content items (e.g., as opposed to a user interface dedicated to a particular content item in the collection of content item)). In some embodiments, the user interface includes information about the collection of content items such as one or more of the name/title of the collection of content items, information about the creators of the collection of content items, an image associated with the collection of content items, a description of the collection of content items, and/or a listing of content items included in the collection of content items that are selectable to initiate playback of the selected content item in the collection of content items. In some embodiments, such as in FIG. 6Q the respective user interface includes a user interface element (e.g., 661) for initiating a process to search through the content items included in the collection of content items (e.g., without searching through content items included in other collections of content items). For example, in some embodiments the respective user interface includes a selectable option that is displayed in association with (e.g., right below, right above, adjacent to, etc.) the listing of content items included in the respective collection of content items.

In some embodiments, the listing of content items initially displays a predetermined number of content items included in the respective collection of content items, less than the total number of content items included in the respective collection of content items (e.g., displays the most recent 3, 5, 10, 20, 30 content items in the respective collection of content items). In some embodiments, in response to detecting selection of the selectable option, the electronic device displays a listing of content items that includes the initially displayed content items and content items that were not initially displayed (e.g., all of the content items). In some embodiments, the electronic device displays above this updated listing of content items a search bar for searching the updated listing of content items. In some embodiments, the electronic device displays above this updated listing of content items one or more selectable options for filtering the updated listing of content items based on one or more criteria (e.g., length of content item, release date of content item, whether the user is entitled to access the content item, etc.).

The above-described manner of searching through content items in the collection of content items provides a quick and efficient manner of locating content items of interest in the respective collection of content items without obtaining search results from other collections of content items, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIG. 6EE, the electronic device 500 displays, via the display generation component, a respective user interface associated with a respective plurality of collections of content items (e.g., a user interface dedicated to a channel or collection of collections of content items). In some embodiments, the respective user interface for the channel includes one or more selectable representations of collections of content items within the channel that the user has "followed" or to which the user has subscribed (e.g., selectable to display user interfaces dedicated to the selected collection of content items, as previously described), one or more selectable representations of collections of content items within the channel that are recently added to the channel (e.g., selectable to display user interfaces dedicated to the selected collection of content items, as previously described), one or more selectable representations of collections of content items within the channel that are currently popular (e.g., selectable to display user interfaces dedicated to the selected collection of content items, as previously described), and/or one or more selectable representations of content items within one or more collections of content items that are included in the channel (e.g., selectable to display user interfaces dedicated to the selected content items, as previously described, and/or selectable to initiate playback of the selected content item). In some embodiments, such as in FIG. 6EE, the respective user interface includes one or more representations (e.g., 672*r-t*) of suggested content items from one or more collections of content items included in the respective plurality of collections of content items, and does not include one or more representations of suggested content items from one or more collections of content items not included in the respective plurality of collections of content items. In some embodiments, the representations of suggested content items are selectable to display user interfaces dedicated to the selected collection of content items, as previously described.

The above-described manner of including representations of collections of content items within the channel provides a quick and efficient manner of locating and/or accessing collections of content items within the channel, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIG. 6FF, in accordance with a determination that the respective plurality of collections of content items includes one or more content items of the second type (e.g., one or more of the collections of content items within the channel include at least one content item to which access is provided via a paid subscription to the channel and/or the appropriate collection of content items. In some embodiments, the plurality of collections of content items include at least one content item of the first type), the respective user interface includes one or more representations (e.g., 674d-e) of suggested content items of the first type from the respective plurality of collections of content items. For example, the user interface includes selectable representations of content items that are accessible by the user without a paid subscription to the channel or the appropriate collection of content items (e.g., the collection(s) of content items in which those content item(s) are included). In some embodiments, the representations of free content items are the top (e.g., most popular) free episodes included in the collections of content items that are included in the channel. In some embodiments, the representations of free content items are selectable to initiate playback of the selected content item and/or display a user interface dedicated to the selected content item, as previously described.

The above-described manner of including representations of free content items within the channel provides a quick and efficient manner of locating and/or accessing content items from collections of content items within the channel even when the user is not subscribed to the channel and/or the collections of content items within the channel, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIG. 6EE, in accordance with a determination that the respective plurality of collections of content items includes one or more content items of the second type (e.g., one or more of the collections of content items within the channel include at least one content item to which access is provided via a paid subscription to the channel and/or the appropriate collection of content items. In some embodiments, the plurality of collections of content items include at least one content item of the first type. In some embodiments, the plurality of collections of content items do not include at least one content item of the first type), the respective user interface includes one or more representations of suggested content items of the second type from the respective plurality of collections of content items. For example, the user interface includes selectable representations of content items that are accessible by the user only with a paid subscription to the channel or the appropriate collection of content items (e.g., the collection(s) of content items in which those content item(s) are included). In some embodiments, the representations of paid content items are the top (e.g., most popular) paid episodes included in the collections of content items that are included in the channel. In some embodiments, the representations of paid content items are selectable to initiate playback of the selected content item and/or display a user interface dedicated to the selected content item, as previously described. The above-described manner of including representations of paid content items within the channel provides a quick and efficient manner of locating and/or accessing content items from collections of content items within the channel that require subscription, which quickly and efficiently conveys what will be provided with a paid subscription, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIG. 6NN, the electronic device 500 receives, via the one or more input devices, a respective input corresponding to a request to search through a plurality of collections of content items accessible via the electronic device (e.g., via a search user interface/search text field within a podcast application. In some embodiments, the search corresponds to text entered into the search text field).

In some embodiments, in response to receiving the respective input, the electronic device 500 displays, such as in FIG. 6NN, via the display generation component, search results corresponding to the respective input (e.g., a listing of search results related to the entered text in the text field. In some embodiments, the search results are displayed in the search user interface).

In some embodiments, such as in FIG. 6OO, the search results include one or more representations (e.g., 690a-690b) of one or more content items included in one or more collections of content items that are associated with the request to search through the plurality of collections of content items accessible via the electronic device (e.g., representations of content items (e.g., episodes of podcasts) that are selectable to initiate playback of the selected content item and/or display a user interface dedicated to the selected content item, as previously described). For example, if the search included a search for "golf," the representations of content items are optionally representations of content items that are related to "golf".

In some embodiments, such as in FIG. 6NN, the search results include one or more representations (e.g., 688a-c) of one or more collections of content items that are associated with the request to search through the plurality of collections of content items accessible via the electronic device (e.g., representations of channels (e.g., collections of podcasts) that are selectable to display a user interface dedicated to the selected channel, as previously described). For example, if the search included a search for "golf," the representations of channels are optionally representations of channels that are related to "golf". In some embodiments, the representations of channels include indications of the number of collections of content items included in those channels (e.g., a representation of channel A that includes an indication of the number of collections of content items included in channel A, and a representation of channel B that includes an indication of the number of collections of content items included in channel B).

The above-described manner of including representations of channels in search results provides a quick and efficient manner of locating and/or accessing relevant channels, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIG. 6K, the electronic device displays a respective user interface associated with one or more collections of content items (e.g., displaying a user interface that includes representations of content items (e.g., from a plurality of collections of content items) that have been downloaded to storage associated with the electronic device, such as a library user interface on the electronic device). In some embodiments, the representations of content items are selectable to initiate playback of the selected content item and/or display a user interface dedicated to the selected content item, as previously described.

In some embodiments, such as in FIG. 6K, while displaying the respective user interface associated with one or more collections of content items, in accordance with a determination that one or more criteria are satisfied (e.g., a threshold amount of storage space (e.g., 40%, 50%, 60%, etc.) on the device is in use to store files), the electronic device 500 displays, in the respective user interface (e.g., above the listing of content items that have been downloaded to the storage associated with the electronic device), a first selectable option (e.g., 616) that is selectable to initiate a process to remove one or more content items in the one or more collections of content items from storage associated with the electronic device. For example, the selectable option is selectable to initiate deletion, from the storage, of one or more content items that have been downloaded to the storage that satisfy certain criteria (e.g., were downloaded longer than a threshold time (e.g., 5, 20, 15, 30, 45, 60 days) before a current time, were published longer than a threshold time (e.g., 5, 10, 15, 20, 30, 45, 60, etc. days) before a current time, have already been played to completion, etc.). In some embodiments, when the content item(s) are deleted from the storage, the electronic device also ceases to display the representations of those content item(s) in the listing of content items.

The above-described manner of providing the selectable option within the respective user interface provides a quick and efficient manner of deleting content items from storage, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIG. 6M, after detecting selection of the first selectable option and initiating the process to remove the one or more content items from the storage associated with the electronic device (e.g., immediately after, or at some later time during which the electronic device displays the respective user interface again (e.g., after having ceased displaying it)), in accordance with a determination that one or more second criteria are satisfied (e.g., the user has dismissed the second selectable option that is selectable to initiate a process for automatically removing content items less than a threshold number of times (e.g., 1, 2, 3, 4, 5, 6, 7, etc. times), the electronic device is not presently configured to automatically delete content items, etc.), the electronic device 500 displays, in the respective user interface, a second selectable option (e.g., 640) that is selectable to initiate a process for automatically (e.g., without subsequent user input for doing so) removing one or more content items in the one or more collections of content items from the storage associated with the electronic device. For example, the second selection option is selectable to display a user interface from which various settings for automatically deleting (e.g., without the need for further user input in response to which the content items would be deleted), in the future, content items from the storage. In some embodiments, once the process has been configured by the user, the electronic device automatically deletes (e.g., without user input) one or more content items from the storage that match certain criteria (e.g., at intervals configurable by the user and/or based on criteria configurable by the user). In some embodiments, the settings that are configurable include: a threshold time (e.g., 7, 14, 21, 28, 30, 31, 60, etc. days) since a respective episode has been downloaded before the episode should be removed from device storage and/or a threshold time (e.g., 7, 14, 21, 28, 30, 31, 60, etc. days) since a respective episode has published before the episode should be removed from device storage.

The above-described manner of providing the selectable option within the respective user interface provides a quick and efficient manner of configuring automatic deletion of content items from storage, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIG. 7 are, optionally, implemented by components depicted in FIGS. 1A-1B. For example, displaying operation 702 is, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to present content of relevance to the user. The present disclosure contemplates that in some instances, this gathered data may include personal information data that uniquely identifies or can be used to identify a specific person. Such personal information data can include demographic data, location-based data, online identifiers, telephone numbers, e-mail addresses, home addresses, data or records relating to a user's health or level of fitness (e.g., vital signs measurements, medication information, exercise information), date of birth, or any other personal information).

The present disclosure recognizes that the use of such personal information data, in the present technology, can be used to the benefit of users. For example, accessing the content consumption history of the user enables the electronic device to recommend additional content to the user for consumption. Accordingly, use of such personal information enables users to discover content items for consumption. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. For example, users can restrict sharing of their content consumption history when interacting with content browsing and consumption applications.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, users can block sharing of content consumption history or other personal information while interacting with content browsing and consumption applications.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at an electronic device in communication with a display generation component and one or more input devices:
displaying, via the display generation component, a user interface that includes a plurality of representations of suggested content items from a first collection of content items and a second collection of content items, the second collection of content items containing content items of a first type and content items of a second type, wherein:
in accordance with a determination that a first content item from the first collection of content items satisfies one or more criteria including a criterion that is satisfied when a user account logged into the electronic device follows the first collection of content items, the plurality of representations of content items includes a first representation of the first content item from the first collection of content items,
in accordance with a determination that a first content item of the first type from the second collection of content item satisfies the one or more criteria including a criterion that is satisfied when the user account logged into the electronic device follows the second collection of content items, the plurality of representations of content items includes a first representation of the first content item from the second collection of content items, and in accordance with a determination that a second content item of the second type from the second collection of content items satisfies the one or more criteria including the criterion that is satisfied when the user account logged into the electronic device follows the second collection of content items:
- in accordance with a determination that the user is entitled to access the second content item of the second type, the plurality of representations of content items includes a second representation of the second content item from the second collection of content items; and
- in accordance with a determination that the user is not entitled to access the second content item of the second type, the plurality of representations of content items does not include the second representation of the second content item from the second collection of content items.

2. The method of claim 1, wherein:
a third collection of content items includes content items of the second type and does not include content items of the first type, and
in accordance with a determination that a first content item of the second type from the third collection of content items satisfies the one or more criteria:
- in accordance with a determination that the user is entitled to access the third collection of content items, the plurality of representations of content items includes a first representation of the first content item from the third collection of content items, and
- in accordance with a determination that the user is not entitled to access the third collection of content items, the plurality of representations of content items does not include the first representation of the first content item from the third collection of content items.

3. The method of claim 1, further comprising:
displaying, via the display generation component, the user interface for the second collection of content items, wherein:
- the user interface for the second collection of content items includes a respective plurality of representations of the content items from the second collection of content items including a first respective representation of a first respective content item of the first type and a second respective representation of a second respective content item of the second type from the second collection of content items, and
- each representation of a content item is displayed without a visual indication regarding whether the user is entitled to access the content item.

4. The method of claim 1, wherein the user is entitled to access the second content item of the second type via a subscription to a respective plurality of collections of content items which includes the second collection of content items.

5. The method of claim 1, further comprising:
displaying, via the display generation component, a respective user interface associated with a respective content item included in a respective collection of content items, wherein:
- in accordance with a determination that the user is entitled to access the respective content item, the respective user interface includes a visual indication of a respective subscription that provides the entitlement of the user to access the respective content item, and
- in accordance with a determination that the user is not entitled to access the respective content item, the respective user interface includes a visual indication that a subscription is required to access the respective content item.

6. The method of claim 5, wherein:
in accordance with a determination that the user is entitled to access the respective content item via a subscription to the respective collection of content items, the visual indication of the respective subscription is a visual indication of the subscription to the respective collection of content items, and
in accordance with a determination that the user is entitled to access the respective in accordance with a determination that the user is entitled to access the respective content item via a subscription to a respective plurality of collections of content items, including the respective collection of content items, the visual indication of the respective subscription is a visual indication of the subscription to the respective plurality of collections of content items.

7. The method of claim 1, further comprising:
displaying, via the display generation component, a respective user interface associated with a respective collection of content items, wherein:
- in accordance with a determination that the user is entitled to access at least one content item of the second type included in the respective collection of content items, the respective user interface includes a respective visual indication that the user is entitled to access at least one content item of the second type included in the respective collection of content items, and
- in accordance with a determination that the user is not entitled to access at least one content item of the second type included in the respective collection of content items, the respective user interface does not include the respective visual indication.

8. The method of claim 1, further comprising:
displaying, via the display generation component, a respective representation of a respective content item included in a respective collection of content items, wherein the respective content item is a content item of the second type;
while displaying the respective representation of the respective content item, detecting, via the one or more input devices, an input corresponding to selection of the respective representation of the respective content item; and
in response to detecting the input corresponding to the selection of the respective representation:
- in accordance with a determination that the user is not entitled to access the respective content item, displaying, via the display generation component, a respective user interface that includes playing content of a person associated with the respective content item.

9. The method of claim 1, further comprising:
displaying, via the display generation component, a respective user interface associated with a respective collection of content items that includes content items of the first type and content items of the second type, wherein the respective user interface includes:

a first selectable option that is selectable to automatically provide the user with information about the content items of the first type included in the respective collection of content items without providing the user with access to the content items of the second type included in the respective collection of content items; and a second selectable option, separate from the first selectable option, that is selectable to initiate a process to automatically provide the user with information about the content items of the first type included in the respective collection of content items and provide the user with access to the content items of the second type included in the respective collection of content items.

10. The method of claim 1, further comprising:
displaying, via the display generation component, a respective user interface associated with a respective collection of content items, wherein the respective user interface includes a user interface element for initiating a process to search through the content items included in the collection of content items.

11. The method of claim 1, further comprising:
displaying, via the display generation component, a respective user interface associated with a respective plurality of collections of content items, wherein the respective user interface includes one or more representations of suggested content items from one or more collections of content items included in the respective plurality of collections of content items, and does not include one or more representations of suggested content items from one or more collections of content items not included in the respective plurality of collections of content items.

12. The method of claim 11, wherein:
in accordance with a determination that the respective plurality of collections of content items includes one or more content items of the second type, the respective user interface includes one or more representations of suggested content items of the first type from the respective plurality of collections of content items.

13. The method of claim 11, wherein:
in accordance with a determination that the respective plurality of collections of content items includes one or more content items of the second type, the respective user interface includes one or more representations of suggested content items of the second type from the respective plurality of collections of content items.

14. The method of claim 1, further comprising:
receiving, via the one or more input devices, a respective input corresponding to a request to search through a plurality of collections of content items accessible via the electronic device; and in response to receiving the respective input, displaying, via the display generation component, search results corresponding to the respective input, including:
one or more representations of one or more content items included in one or more collections of content items that are associated with the request to search through the plurality of collections of content items accessible via the electronic device; and
one or more representations of one or more collections of content items that are associated with the request to search through the plurality of collections of content items accessible via the electronic device.

15. The method of claim 1, further comprising:
while displaying a respective user interface associated with one or more collections of content items:
in accordance with a determination that one or more criteria are satisfied, displaying, in the respective user interface, a first selectable option that is selectable to initiate a process to remove one or more content items in the one or more collections of content items from storage associated with the electronic device.

16. The method of claim 15, further comprising:
after detecting selection of the first selectable option and initiating the process to remove the one or more content items from the storage associated with the electronic device:
in accordance with a determination that one or more second criteria are satisfied, displaying, in the respective user interface, a second selectable option that is selectable to initiate a process for automatically removing one or more content items in the one or more collections of content items from the storage associated with the electronic device.

17. An electronic device, comprising:
one or more processors;
memory; and
one or more programs, wherein the one or more programs are stored in the memory and configured to be executed by the one or more processors, the one or more programs including instructions for:
displaying, via a display generation component, a user interface that includes a plurality of representations of suggested content items from a first collection of content items and a second collection of content items, the second collection of content items containing content items of a first type and content items of a second type, wherein:
in accordance with a determination that a first content item from the first collection of content items satisfies one or more criteria including a criterion that is satisfied when a user account logged into the electronic device follows the first collection of content items, the plurality of representations of content items includes a first representation of the first content item from the first collection of content items, in accordance with a determination that a first content item of the first type from the second collection of content item satisfies the one or more criteria including a criterion that is satisfied when the user account logged into the electronic device follows the second collection of content items, the plurality of representations of content items includes a first representation of the first content item from the second collection of content items, and in accordance with a determination that a second content item of the second type from the second collection of content items satisfies the one or more criteria including the criterion that is satisfied when the user account logged into the electronic device follows the second collection of content items:
in accordance with a determination that the user is entitled to access the second content item of the second type, the plurality of representations of content items includes a second representation of the second content item from the second collection of content items; and in accordance with a determination that the user is not entitled to access the second content item of the second type, the plurality of representations of content items does not include the second representation of the second content item from the second collection of content items.

18. A non-transitory computer readable storage medium storing one or more programs, the one or more programs comprising instructions, which when executed by one or more processors of an electronic device, cause the electronic device to perform a method comprising:

displaying, via a display generation component, a user interface that includes a plurality of representations of suggested content items from a first collection of content items and a second collection of content items, the second collection of content items containing content items of a first type and content items of a second type, wherein:

in accordance with a determination that a first content item from the first collection of content items satisfies one or more criteria including a criterion that is satisfied when a user account logged into the electronic device follows the first collection of content items, the plurality of representations of content items includes a first representation of the first content item from the first collection of content items, in accordance with a determination that a first content item of the first type from the second collection of content item satisfies the one or more criteria including a criterion that is satisfied when the user account logged into the electronic device follows the second collection of content items, the plurality of representations of content items includes a first representation of the first content item from the second collection of content items, and in accordance with a determination that a second content item of the second type from the second collection of content items satisfies the one or more criteria including the criterion that is satisfied when the user account logged into the electronic device follows the second collection of content items:

in accordance with a determination that the user is entitled to access the second content item of the second type, the plurality of representations of content items includes a second representation of the second content item from the second collection of content items; and in accordance with a determination that the user is not entitled to access the second content item of the second type, the plurality of representations of content items does not include the second representation of the second content item from the second collection of content items.

19. The electronic device of claim 17, wherein:

a third collection of content items includes content items of the second type and does not include content items of the first type, and in accordance with a determination that a first content item of the second type from the third collection of content items satisfies the one or more criteria:

in accordance with a determination that the user is entitled to access the third collection of content items, the plurality of representations of content items includes a first representation of the first content item from the third collection of content items, and in accordance with a determination that the user is not entitled to access the third collection of content items, the plurality of representations of content items does not include the first representation of the first content item from the third collection of content items.

20. The electronic device of claim 17, wherein the one or more programs further include instructions for:

displaying, via the display generation component, a user interface for the second collection of content items, wherein:

the user interface for the second collection of content items includes a respective plurality of representations of the content items from the second collection of content items including a first respective representation of a first respective content item of the first type and a second respective representation of a second respective content item of the second type from the second collection of content items, and each representation of a content item is displayed without a visual indication regarding whether the user is entitled to access the content item.

21. The electronic device of claim 17, wherein the user is entitled to access the second content item of the second type via a subscription to the second collection of content items.

22. The electronic device of claim 17, wherein the user is entitled to access the second content item of the second type via a subscription to a respective plurality of collections of content items which includes the second collection of content items.

23. The electronic device of claim 17, wherein the one or more programs further include instructions for:

displaying, via the display generation component, a respective user interface associated with a respective content item included in a respective collection of content items, wherein:

in accordance with a determination that the user is entitled to access the respective content item, the respective user interface includes a visual indication of a respective subscription that provides the entitlement of the user to access the respective content item, and in accordance with a determination that the user is not entitled to access the respective content item, the respective user interface includes a visual indication that a subscription is required to access the respective content item.

24. The electronic device of claim 23, wherein:

in accordance with a determination that the user is entitled to access the respective content item via a subscription to the respective collection of content items, the visual indication of the respective subscription is a visual indication of the subscription to the respective collection of content items, and in accordance with a determination that the user is entitled to access the respective content item via a subscription to a respective plurality of collections of content items, including the respective collection of content items, the visual indication of the respective subscription is a visual indication of the subscription to the respective plurality of collections of content items.

25. The electronic device of claim 17, wherein the one or more programs further include instructions for:
displaying, via the display generation component, a respective user interface associated with a respective collection of content items, wherein:
in accordance with a determination that the user is entitled to access at least one content item of the second type included in the respective collection of content items, the respective user interface includes a respective visual indication that the user is entitled to access at least one content item of the second type included in the respective collection of content items, and
in accordance with a determination that the user is not entitled to access at least one content item of the second type included in the respective collection of content items, the respective user interface does not include the respective visual indication.

26. The electronic device of claim 17, wherein the one or more programs further include instructions for:
displaying, via the display generation component, a respective representation of a respective content item included in a respective collection of content items, wherein the respective content item is a content item of the second type;
while displaying the respective representation of the respective content item, detecting, via one or more input devices, an input corresponding to selection of the respective representation of the respective content item; and
in response to detecting the input corresponding to the selection of the respective representation:
in accordance with a determination that the user is not entitled to access the respective content item, displaying, via the display generation component, a respective user interface that includes playing content of a person associated with the respective content item.

27. The electronic device of claim 17, wherein the one or more programs further include instructions for:
displaying, via the display generation component, a respective user interface associated with a respective collection of content items that includes content items of the first type and content items of the second type, wherein the respective user interface includes:
a first selectable option that is selectable to automatically provide the user with information about the content items of the first type included in the respective collection of content items without providing the user with access to the content items of the second type included in the respective collection of content items; and
a second selectable option, separate from the first selectable option, that is selectable to initiate a process to automatically provide the user with information about the content items of the first type included in the respective collection of content items and provide the user with access to the content items of the second type included in the respective collection of content items.

28. The electronic device of claim 17, wherein the one or more programs further include instructions for:
displaying, via the display generation component, a respective user interface associated with a respective collection of content items, wherein the respective user interface includes a user interface element for initiating a process to search through the content items included in the collection of content items.

29. The electronic device of claim 17, wherein the one or more programs further include instructions for:
displaying, via the display generation component, a respective user interface associated with a respective plurality of collections of content items, wherein the respective user interface includes one or more representations of suggested content items from one or more collections of content items included in the respective plurality of collections of content items, and does not include one or more representations of suggested content items from one or more collections of content items not included in the respective plurality of collections of content items.

30. The electronic device of claim 29, wherein:
in accordance with a determination that the respective plurality of collections of content items includes one or more content items of the second type, the respective user interface includes one or more representations of suggested content items of the first type from the respective plurality of collections of content items.

31. The electronic device of claim 29, wherein:
in accordance with a determination that the respective plurality of collections of content items includes one or more content items of the second type, the respective user interface includes one or more representations of suggested content items of the second type from the respective plurality of collections of content items.

32. The electronic device of claim 29, wherein the one or more programs further include instructions for:
receiving, via one or more input devices, a respective input corresponding to a request to search through a plurality of collections of content items accessible via the electronic device; and
in response to receiving the respective input, displaying, via the display generation component, search results corresponding to the respective input, including:
one or more representations of one or more content items included in one or more collections of content items that are associated with the request to search through the plurality of collections of content items accessible via the electronic device; and
one or more representations of one or more collections of content items that are associated with the request to search through the plurality of collections of content items accessible via the electronic device.

33. The electronic device of claim 17, wherein the one or more programs further include instructions for:
while displaying a respective user interface associated with one or more collections of content items:
in accordance with a determination that one or more criteria are satisfied, displaying, in the respective user interface, a first selectable option that is selectable to initiate a process to remove one or more content items in the one or more collections of content items from storage associated with the electronic device.

34. The electronic device of claim 33, wherein the one or more programs further include instructions for:
after detecting selection of the first selectable option and initiating the process to remove the one or more content items from storage associated with the electronic device:
in accordance with a determination that one or more second criteria are satisfied, displaying, in the respective user interface, a second selectable option that is selectable to initiate a process for automatically removing one or more content items in the one or more collections of content items from the storage associated with the electronic device.

35. The non-transitory computer readable storage medium of claim 18, wherein:
    a third collection of content items includes content items of the second type and does not include content items of the first type, and
    in accordance with a determination that a first content item of the second type from the third collection of content items satisfies the one or more criteria:
        in accordance with a determination that the user is entitled to access the third collection of content items, the plurality of representations of content items includes a first representation of the first content item from the third collection of content items, and
        in accordance with a determination that the user is not entitled to access the third collection of content items, the plurality of representations of content items does not include the first representation of the first content item from the third collection of content items.

36. The non-transitory computer readable storage medium of claim 18, wherein the method further comprises:
    displaying, via the display generation component, a user interface for the second collection of content items, wherein:
        the user interface for the second collection of content items includes a respective plurality of representations of the content items from the second collection of content items including a first respective representation of a first respective content item of the first type and a second respective representation of a second respective content item of the second type from the second collection of content items, and
        each representation of a content item is displayed without a visual indication regarding whether the user is entitled to access the content item.

37. The non-transitory computer readable storage medium of claim 18, wherein the user is entitled to access the second content item of the second type via a subscription to the second collection of content items.

38. The non-transitory computer readable storage medium of claim 18, wherein the user is entitled to access the second content item of the second type via a subscription to a respective plurality of collections of content items which includes the second collection of content items.

39. The non-transitory computer readable storage medium of claim 18, wherein the method further comprises:
    displaying, via the display generation component, a respective user interface associated with a respective content item included in a respective collection of content items, wherein:
        in accordance with a determination that the user is entitled to access the respective content item, the respective user interface includes a visual indication of a respective subscription that provides the entitlement of the user to access the respective content item, and
        in accordance with a determination that the user is not entitled to access the respective content item, the respective user interface includes a visual indication that a subscription is required to access the respective content item.

40. The non-transitory computer readable storage medium of claim 39, wherein:
    in accordance with a determination that the user is entitled to access the respective content item via a subscription to the respective collection of content items, the visual indication of the respective subscription is a visual indication of the subscription to the respective collection of content items, and
    in accordance with a determination that the user is entitled to access the respective content item via a subscription to a respective plurality of collections of content items, including the respective collection of content items, the visual indication of the respective subscription is a visual indication of the subscription to the respective plurality of collections of content items.

41. The non-transitory computer readable storage medium of claim 18, wherein the method further comprises:
    displaying, via the display generation component, a respective user interface associated with a respective collection of content items, wherein:
        in accordance with a determination that the user is entitled to access at least one content item of the second type included in the respective collection of content items, the respective user interface includes a respective visual indication that the user is entitled to access at least one content item of the second type included in the respective collection of content items, and
        in accordance with a determination that the user is not entitled to access at least one content item of the second type included in the respective collection of content items, the respective user interface does not include the respective visual indication.

42. The non-transitory computer readable storage medium of claim 18, wherein the method further comprises:
    displaying, via the display generation component, a respective representation of a respective content item included in a respective collection of content items, wherein the respective content item is a content item of the second type;
    while displaying the respective representation of the respective content item, detecting, via one or more input devices, an input corresponding to selection of the respective representation of the respective content item; and
    in response to detecting the input corresponding to the selection of the respective representation:
        in accordance with a determination that the user is not entitled to access the respective content item, displaying, via the display generation component, a respective user interface that includes playing content of a person associated with the respective content item.

43. The non-transitory computer readable storage medium of claim 18, wherein the method further comprises:
    displaying, via the display generation component, a respective user interface associated with a respective collection of content items that includes content items of the first type and content items of the second type, wherein the respective user interface includes:
        a first selectable option that is selectable to automatically provide the user with information about the content items of the first type included in the respective collection of content items without providing the user with access to the content items of the second type included in the respective collection of content items; and a second selectable option, separate from the first selectable option, that is selectable to initiate a process to automatically provide the user with information about the content items of the first type included in the respective collection of content items and provide the user with access to the content items of the second type included in the respective collection of content items.

44. The non-transitory computer readable storage medium of claim 18, wherein the method further comprises:
displaying, via the display generation component, a respective user interface associated with a respective collection of content items, wherein the respective user interface includes a user interface element for initiating a process to search through the content items included in the collection of content items.

45. The non-transitory computer readable storage medium of claim 18, wherein the method further comprises:
displaying, via the display generation component, a respective user interface associated with a respective plurality of collections of content items, wherein the respective user interface includes one or more representations of suggested content items from one or more collections of content items included in the respective plurality of collections of content items, and does not include one or more representations of suggested content items from one or more collections of content items not included in the respective plurality of collections of content items.

46. The non-transitory computer readable storage medium of claim 45, wherein:
in accordance with a determination that the respective plurality of collections of content items includes one or more content items of the second type, the respective user interface includes one or more representations of suggested content items of the first type from the respective plurality of collections of content items.

47. The non-transitory computer readable storage medium of claim 45, wherein:
in accordance with a determination that the respective plurality of collections of content items includes one or more content items of the second type, the respective user interface includes one or more representations of suggested content items of the second type from the respective plurality of collections of content items.

48. The non-transitory computer readable storage medium of claim 45, wherein the method further comprises:
receiving, via one or more input devices, a respective input corresponding to a request to search through a plurality of collections of content items accessible via the electronic device; and
in response to receiving the respective input, displaying, via the display generation component, search results corresponding to the respective input, including:
one or more representations of one or more content items included in one or more collections of content items that are associated with the request to search through the plurality of collections of content items accessible via the electronic device; and
one or more representations of one or more collections of content items that are associated with the request to search through the plurality of collections of content items accessible via the electronic device.

49. The non-transitory computer readable storage medium of claim 18, wherein the method further comprises:
while displaying a respective user interface associated with one or more collections of content items:
in accordance with a determination that one or more criteria are satisfied, displaying, in the respective user interface, a first selectable option that is selectable to initiate a process to remove one or more content items in the one or more collections of content items from storage associated with the electronic device.

50. The non-transitory computer readable storage medium of claim 49, wherein the method further comprises:
after detecting selection of the first selectable option and initiating the process to remove the one or more content items from storage associated with the electronic device:
in accordance with a determination that one or more second criteria are satisfied, displaying, in the respective user interface, a second selectable option that is selectable to initiate a process for automatically removing one or more content items in the one or more collections of content items from the storage associated with the electronic device.

\* \* \* \* \*

UNITED STATES PATENT AND TRADEMARK OFFICE
CERTIFICATE OF CORRECTION

PATENT NO. : 11,720,229 B2
APPLICATION NO. : 17/457901
DATED : August 8, 2023
INVENTOR(S) : Uli M. Schöberl It is certified that error appears in the above-identified patent and that said Letters Patent is hereby corrected as shown below:

In the Claims

In Column 72, Lines 17-19, in Claim 6, delete "in accordance with a determination that the user is entitled to access the respective in accordance with a determination that the user is entitled to access the respective" and insert --in accordance with a determination that the user is entitled to access the respective--.

Signed and Sealed this
Third Day of October, 2023

Katherine Kelly Vidal
*Director of the United States Patent and Trademark Office*